United States Patent
Cahoy et al.

(10) Patent No.: US 10,899,479 B2
(45) Date of Patent: Jan. 26, 2021

(54) SHAPE MEMORY ALLOY (SMA) HINGE APPARATUS, AND SYSTEMS AND METHODS EMPLOYING SAME

(71) Applicant: Massachusetts Institute of Technology, Cambridge, MA (US)

(72) Inventors: Kerri Lynn Cahoy, Lexington, MA (US); Christian Alexander Haughwout, Clinton, CT (US); Derek C. Barnes, Cambridge, MA (US); Maxim Oleg Khatsenko, San Diego, CA (US); James R. Clark, Cambridge, MA (US)

(73) Assignee: Massachusetts INSTITUTE of technology, Cambridge, MA (US)

( * ) Notice: Subject to any disclaimer, the term of this patent is extended or adjusted under 35 U.S.C. 154(b) by 346 days.

(21) Appl. No.: 16/005,487

(22) Filed: Jun. 11, 2018

(65) Prior Publication Data
US 2020/0108951 A1    Apr. 9, 2020

Related U.S. Application Data

(60) Provisional application No. 62/517,228, filed on Jun. 9, 2017.

(51) Int. Cl.
*B64G 1/22* (2006.01)
*B64G 1/44* (2006.01)
(Continued)

(52) U.S. Cl.
CPC ............. *B64G 1/222* (2013.01); *B64G 1/44* (2013.01); *B64G 1/66* (2013.01); *E05D 1/02* (2013.01); *F03G 7/065* (2013.01); *E05Y 2900/50* (2013.01)

(58) Field of Classification Search
CPC .. B64G 1/222; B64G 1/44; B64G 1/66; E05D 1/02; F03G 7/065; E05Y 2900/50
See application file for complete search history.

(56) References Cited

U.S. PATENT DOCUMENTS

| 4,761,955 | A   |   | 8/1988 | Bloch |
|-----------|-----|---|--------|-------|
| 6,175,989 | B1  | * | 1/2001 | Carpenter ............. B64G 1/222 136/245 |

(Continued)

OTHER PUBLICATIONS

"Using Shape-Memory Alloys to Enhance Small Satellite Reliability," http://www.aerospace.org/news/highlights/using-shape-memory-alloys-to-enhance-smallsatellite-,reliability/, Nov. 8, 2017, 3 pages.
(Continued)

*Primary Examiner* — Rodney A Bonnette
(74) *Attorney, Agent, or Firm* — Smith Baluch LLP

(57) ABSTRACT

A controllable shape memory alloy (SMA) hinge apparatus comprises multiple SMA elements to effect a first angle of rotation and a second angle of rotation between a first object and a second object. In one example, respective SMA elements are independently activated by Joule heating to rotate the first object and/or the second object. SMA elements undergo a three-dimensional transformation, and a pair of elements may undergo antagonistic transformations so as to provide for a multiple-use bidirectional non-continuous rotary actuator. SMA elements may be trained to achieve different angles of rotations between the objects (e.g., zero degrees and 90 degrees). In some examples, the first object may be a spacecraft (e.g., a satellite) and the second object may be a deployable structure (e.g., a robotic appendage, a deployable solar panel, a deployable aperture, a deployable mirror, a deployable radiator, and at least one actuator to steer an antenna dish).

44 Claims, 54 Drawing Sheets

(51) Int. Cl.
B64G 1/66 (2006.01)
E05D 1/02 (2006.01)
F03G 7/06 (2006.01)

(56) References Cited

U.S. PATENT DOCUMENTS

| 7,354,033 | B1* | 4/2008 | Murphey | B64G 1/222 |
|---|---|---|---|---|
| | | | | 267/151 |
| 2002/0194702 | A1* | 12/2002 | Hinkley | E05D 1/02 |
| | | | | 16/260 |
| 2018/0142729 | A1* | 5/2018 | Lee | B64G 1/222 |

OTHER PUBLICATIONS

Abadie, J. et al., "Modeling of a new SMA micro-actuator for active endoscopy application," https://hal.archives-ouvertes.fr/hal-00380883, May 2009, 9 pages.
Behl, M. et al., "Shape-memory polymers," Material Today, vol. 10, No. 4, pp. 20-28, Apr. 2007.
Bennett, M., "CubeSat Technology, Current State-of-the-Art and Future Needs," Oct. 29, 2012, 13 pages.
Birman, V., "Review of mechanics of shape memory alloy structures," Appl Mech Rev, vol. 50, No. 11, Part 1, pp. 629-646, 1997.
Boldea, I. et al., "Linear Electric Actuators and Generators," IEEE, pp. MA1-1.1-MA1-1.5, 1997.
Brinson, L. C. et al., "Deformation of Shape Memory Alloys Due to Thermo-Induced Transformation," Journal of Intelligent Material Systems and Structures, vol. 7, pp. 97-107, 1996.
Brinson, L. C. et al., "Finite Element Analysis of the Behavior of Shape Memory Alloys and Their Applications," Int. J. Solids Structures, vol. 30, No. 23, pp. 3261-3280, 1993.
Brinson, L. C. et al., "Simplifications and Comparisons of Shape Memory Alloy Constitutive Models," Journal of Intelligent Material Systems and Structures, vol. 7, pp. 108-111, 1996.
Brinson, L. C., "One-Dimensional Constitutive Behavior of Shape Memory Alloys: Thermomechanical Derivation with Non-Constant Material Functions and Redefined Internal Variable," Journal of Intelligent Material Systems and Structures, vol. 4, pp. 229-242, 1993.
Carpenter, B. F. et al., "Shape Memory Actuated Gimbal," SPIE, vol. 2447, pp. 91-101, 1995; http://proceedings.spiedigitallibrary.org/ downloaded on Mar. 15, 2017.
Champagne, J. et al., "CubeSat Image Resolution Capabilities with Deployable Optics and Current Imaging Technology," Slide Presentation, 28th Annual AIAA/USA Conference on Small Satellites, 2014, 20 pages.
Clark, C. et al., "Off-the-Shelf, Deployable Solar Panels for CubeSats," Slide Presentation, Clyde Space Ltd., Apr. 24, 2012, 28 pages.
De Weck, O. et al., "Multifunctionality in Parabolic RF Antenna Design Based on SMA Actuated Radiation Pattern Shaping," American Institute of Aeronautics and Astronautics, Inc., downloaded on Apr. 20, 2017; http://arc.aiaa.org; DOI: 10.2514/6., pp. 1998-4813, 1998.
Dhanalakshmi, K. et al., "Experimental Study on Vibration Control of Shape Memory Alloy Actuated Flexible Beam," International Journal on Smart Sensing and Intelligent Systems, vol. 3, No. 2, pp. 156-175, 2010.
Dupont™ Kapton®, Summary of Properties, Jan. 2017, 20 pages.
Fahali, M. et al., "Tribot, a Multi-Modal Locomotive Origami Robot: Construction and Control," https://pdfs.semanticscholar.org/6da8/cb722e774b9b99530b3b47c9cb77d169c82d.pdf, Sep. 2015, 7 pages.
Firouzeh, A. et al., "Robogami: A Fully Integrated Low-Profile Robotic Origami," Journal of Mechanisms and Robotics, vol. 7, pp. 021009-1-021009-8, May 2015.
Firouzeh, A. et al., "Sensor and actuator integrated low-profile robotic Origami," 2013 IEEE/RSJ International Conference on Intelligent Robots and Systems (IROS), Nov. 3-7, 2013, 8 pages.
Firouzeh, A. et al., An under-actuated origami gripper with adjustable stiffness joints for multiple grasp modes, Smart Mater. Struct.; https://doi.org/10.1088/1361-665X/aa67fd, 2017, 18 pages.
Gabriel, K. J. et al., "A Micro Rotary Actuator Using Shape Memory Alloys," Sensors and Actuators, vol. 15, pp. 95-102, 1988.
Georges, T. et al., "Characterization and design of antagonistic shape memory alloy actuators," Smart Mater. Struct., vol. 21, 035010, http://dx.doi.org/10.1088/0964-1726/21/3/035010, 2012, 8 pages.
Guo, Z. et al., "Design and control of a novel compliant differential shape memory alloy actuator," Sensors and Actuators A, vol. 225, pp. 71-80, 2015.
Hartl, D., J. et al., "Aerospace applications of shape memory alloys," Proc. IMechE, vol. 221, pp. 535-552, 2007.
Hodgson, D. E. et al., "Shape Memory Alloys," ASM Handbook, vol. 2: Properties and Selection: Nonferrous Alloys and Special-Purpose Materials, pp. 897-902, 1990.
Huang, W., "On the selection of shape memory alloys for actuators," Materials and Design, 23, pp. 11-19, 2002.
Huber, J. E. et al., "The selection of mechanical actuators based on performance indices," Proc. R. Soc. Lond. A, vol. 453, pp. 2185-2205, 1997.
Ianagui, A. et al., "Modeling and control of an Antagonistic Shape Memory Alloy Actuator," ABCM Symposium Series in Mechatronics, vol. 5, Section VIII—Sensors & Actuators, pp. 1268-1277, 2012.
Ikuta, K., "Micro/Miniature Shape Memory Alloy Actuators," Conference on Robotics and Automation, IEEE, http://dx.doi.org/10.1109/ROBOT.1990.126323, 1990, 6 pages.
Ishihara, H. et al., "Micro Mechatronics and Micro Actuators," IEEE/ASME Transactions on Mechatronics, vol. 1, No. 1, pp. 68-79, 1996.
Jardine, A. P. et al., "Shape Memory Alloy TiNi Actuators for Twist Control of Smart Wing Designs," SPIE, vol. 2717; https://www.spiedigitallibrary.org/conference-proceedings-of-spie?SSO=1, pp. 160-165, 1996.
Ko, J. et al., "Fuzzy PWM-PID control of cocontracting antagonistic shape memory alloy muscle pairs in an artificial finger," Mechatronics, vol. 21, pp. 1190-1202, 2011.
Koh, J. et al., "Self-Folding Origami Using Torsion Shape Memory Alloy Wire Actuators," Proceedings of the ASME 2014 International Design Engineering Technical Conferences & Computers and Information in Engineering Conference, Aug. 17-20, 2014, 7 pages.
Kohl, M. et al., "SMA microgripper with integrated antagonism," Sensor and Actuators, vol. 83, pp. 208-213, 2000.
Kuribayashi, K., "Millimeter Size Joint Actuator Using Shape Memory Alloy," Conference on Micro Electro Mechanical Systems, IEEE, http://dx.doi.org/10.1109/MEMSYS.1989.77978, 1989, 6 pages.
Lan, C. -C. et al., "Optimal design of rotary manipulators using shape memory alloy wire actuated flexures," Sensors and Actuators A, vol. 153, pp. 258-266, 2009.
Le, T. S. et al., "Antagonistic Shape Memory Alloy Actuators in Soft Robotics," Solid State Phenomena, vol. 251, pp. 126-132, 2016.
Liang, C. et al., "Design of Shape Memory Alloy Actuators," Journal of Mechanical Design, vol. 114, pp. 223-230, 1992.
Liang, C. et al., "One-Dimensional Thermomechanical Constitutive Relations for Shape Memory Materials," Journal of Intelligent Material Systems and Structures, vol. 8, pp. 285-302, 1997.
Liu, Y. et al., "Shape memory polymers and their composites in aerospace applications: a review," Smart Mater. Struct., 23, 023001, 2014, 22 pages; http://dx.doi.org/10.1088/0964-1726/23/2/023001.
Moallem, M. et al., "Tracking Control of an Antagonistic Shape Memory Alloy Actuator Pair," IEEE Transactions on Control Systems Technology, vol. 17, No. 1, pp. 184-190, 2009.
Morris, E. et al., "The State of the Art of Origami-Inspired Products: A Review," Proceedings of the ASME 2016 International Design Engineering Conferences and Computers and Information in Engineering Conference, Aug. 21-24, 2016, 14 pages.
Moses, J. D. "An Overview of the NASA/Science Mission Directorate CubeSat Activities," Aug. 2016, 7 pages.
Nespoli, A. et al., "Rotational mini-actuator activated by two antagonist shape memory alloy wires," Physics Procedia, vol. 10, pp. 182-188, 2010.

(56) References Cited

OTHER PUBLICATIONS

Nespoli, A. et al., "The high potential of shape memory alloys in developing miniature mechanical devices: A review on shape memory alloy mini-actuators," Sensors and Actuators A: Physical, vol. 158, pp. 149-160, 2010.
Passaretti, M. et al., "Development of a Solar Array Device Assembly for CubeSat," Proceedings of the 40$^{th}$ Aerospace Mechanisms Symposium, NASA Kennedy Space Center, pp. 445-453, May 12-14, 2010.
picoRelease™ Low-SWaP Release Mechanism for SmallSat Deployables, Product Brochure, http://www.tethers.com, Aug. 2014, 1 page.
Pierce, D. et al., "NASA Perspectives on Cubesat Technology and Highlighted Activities," Slide Presentation, 14$^{th}$ Meeting of the NASA Small Bodies Assessment Group, Jan. 27-29, 2016, 27 pages.
Popov, P. et al., "A 3-D constitutive model for shape memory alloys incorporating pseudoelasticity and detwinning of self-accommodated martensite," International Journal of Plasticity, vol. 23, pp. 1679-1720, 2007.
Puig-Suari, J. et al., Deployment of CubeSat Constellations Utilizing Current Launch Opportunities, 27$^{th}$ Annual AIAA/USU Conference on Small Satellites, SC13-V-5, Aug. 2013, 7 pages.
Puig-Suari, J. et al., Deployment of CubeSat Constellations Utilizing Current Launch Opportunities, 27$^{th}$ Annual AIAA/USU Conference on Small Satellites, Aug. 2013, 18 pages.
Ratna, D. et al., "Recent advances in shape memory polymers and composites: a review," J Mater Sci, vol. 43, pp. 254-269, 2008.
Robertson, S. W. et al., "Mechanical fatigue and fracture of Nitinol," International Materials Reviews, vol. 57, No. 1, pp. 1-36, 2012.
Rodrigue, H. et al., "An Overview of Shape Memory Alloy-Coupled Actuators and Robots," Soft Robotics, vol. 4, No. 1, pp. 3-15, 2017.
Rowen, D. et al., "3-Axis Attitude Determination and Control of the AeroCube-4 CubeSats," Aug. 10, 2013, 35 pages.
Sadiq, H. et al., "The effects of heat treatment on the recovery stresses of shape memory alloys," Smart Mater. Structur., vol. 19, 035021; http://dx.doi.org/10.1088/0964-1726/19/3/035021, 2010, 7 pages.
Santoni, F. et al., "An innovative deployable solar panel system for Cubesats," Acta Astronautica, 95, pp. 210-217, 2014.
Seelecke, S., "Shape memory alloy actuators in smart structures: Modeling and simulation," Appl Mech Rev, vol. 57, No. 1, pp. 23-46, 2004.
Shim, J. -E. et al., "A smart soft actuator using a single shape memory alloy for twisting actuation," Smart Mater. Struct. 24, 125033, 2015, 10 pages; http://dx.doi.org/10.1088/0964-1726/24/12/125033.
Shin, B. H. et al., "A modular torsional actuator using shape memory alloy wiree," Journal of Intelligent Material Systems and Structures, vol. 27, No. 12, pp. 1658-1665, 2016.
Sofla, A. Y. N. et al., "An Antagonistic Flexural Unit Cell for Design of Shape Morphing Structures," Proceedings of IMECE04, 2004 ASME International Mechanical Engineering Congress and Exposition, Nov. 13-20, 2004, 9 pages.
Sofla, A. Y. N. et al., "Cyclic degradation of antagonistic shape memory actuated structures," Smart Mater. Struct., vol. 17, 025014, 2008, 6 pages.
Sofla, A. Y. N. et al., "Two-way Antagonistic Shape Actuation Based on the One-Way Shape Memory Effect," Journal of Intelligent Material Systems and Structures, vol. 19, pp. 1017-1027, 2008.
Sofla, A. Y. N. et al., "Two-way Antagonistic Shape Actuation Based on the One-way Shape Memory Effect," Journal of Intelligent Material Systems and Structures, first published Jan. 24, 2008; doi:10.1177/1045389X07083026, 12 pages.
Tabrizi, V. A. et al., "Nonlinear Position Control of Antagonistic Shape Memory Alloy Actuators," Proceedings of the 2007 American Control Conference, Jul. 11-13, 2007, 6 pages.
Tobushi, H. et al., "Torsional deformation and rotary driving characteristics of SMA thin strip," Arch. Mech., vol. 61, No. 3-4, pp. 241-257, 2009.
Wang, T. -M. et al., "An Accurately Controlled Antagonistic Shape Memory Alloy Actuator with Self-Sensing," Sensors, vol. 12, pp. 7682-7700, 2012.
Yuan, H. et al., "A review of rotary actuators based on shape memory alloys," Journal of Intelligent Material Systems and Structures, https://doi.dox.org/10.1177/1045389X16682848, 2017, 23 pages.
Zhakypov, Z. et al., Modeling, Characterization and Control of a Novel Torsional Shape Memory Alloy (SMA) Actuator, IEEE Robotics and Automation Magazine, vol. 23, No. 3, pp. 65-74, 2016.

* cited by examiner

| Group - Number | Driver | Requirement | Verification |
|---|---|---|---|
| Performance - 1 | ConOps | FLAPS shall deploy four 3U drag surfaces/solar panels from the short edge on the -Z side of the FLARE CubeSat | Ground Testing |
| Performance - 2 | ConOps | FLAPS shall move between the open, half-open, and closed positions upon active command, equaling at least $\pi/2$ rads of rotary motion | Ground Testing |
| Performance - 3 | ADCS | FLAPS shall be able to deliver a torque of less than 1.0 mNm when activating, and may deliver more | Analysis with Ground Testing |
| Performance - 4 | Power Generation | FLAPS shall not deflect more than 5° about any of the axes normal to the deployable structure | Analysis with Ground Testing |
| Size - 5 | CDS | FLAPS shall stow within 6.5 mm normal to the 3U face of the CubeSat | Ground Testing |
| Weight - 6 | Mass Budget | Each FLAP, excluding the electronics and deployable structure, shall have a mass of less than 20 grams | Ground Testing |
| Power - 7 | Power Budget | Each FLAP shall utilize less than 0.5 W of Power and consume less than 0.25 Whr of total electrical energy per operation | Analysis with Validated Model |
| Fatigue - 8 | ConOps and CDS | Each FLAP shall operate for at least 1,000 activation cycles without creating orbital debris | Analysis |
| Environment - 9 | ConOps and CDS | FLAPS shall satisfy all requirements in the space vacuum environment with CubeSat bus temperatures ranging from -30° to to 70° C | Analysis with Validated Model |

*FIG. 4*

| Design Parameter | Risk | Countermeasure |
|---|---|---|
| Fatique Life | Stowage within a small volume plus a large rotation range causes excessive strain of the SMA element | Use a thinner element, apply less pre-strain, or limit rotation range |
| Heating Method | Selecting an SMA element with large cross-section may disallow Joule heating | Select a smaller cross-section or use an external heater |
| Activation Power | Attempting to reduce the torque below 1 mNm by slowly heating the SMA element leads to excessive heat losses | Use a smaller SMA element so quick Joule heating is possible |
| Dynamic Stability | Small SMA elements cause the actuator to have low stiffness and low resonant frequency, complicating control of the host CubeSat | Use a larger SMA element or implement disturbance rejection on the host |
| Manufacturing and Assembly | Cylindrical elements such as wires are difficult to mount without expensive and time-consuming matching techniques such as press-fits | Use rectangular elements such as flat wires or sheets |

FIG. 12

| Variable | Units | Value |
|---|---|---|
| Diameter, $D$ | mm | 1 |
| Length, $L$ | mm | 10 |
| Activation temperature, $T_{SMA}$ | K | 350 |
| Spacecraft temperature, $T_{sc}$ | K | 250 |
| Maximum current, $I$ | A | 8 |
| Thermal conductivity, $k$ | $\frac{W}{mm^2\,K}$ | $10 \times 10^{-3}$ |
| Electrical resistivity, $\rho_e$ | $\Omega\,mm$ | $100 \times 10^{-5}$ |
| Density, $\rho_d$ | $\frac{g}{mm^3}$ | $6500 \times 10^{-3}$ |
| Specific heat, $c_p$ | $\frac{J}{g\,K}$ | 8.50 |
| Latent heat of transformation, $c_t$ | $\frac{J}{g}$ | 24.0 |

FIG. 13

| Element, Architecture | Radius (mm) or Twist (rad/mm) | Moment or Torque (mNm) |
|---|---|---|
| Rectangular, Bending | 2.5 mm | 4.0 |
| Cylindrical, Bending | 25 mm | 30 |
| Rectangular, Torsion | 0.005 rad/mm | 0.076 |
| Cylindrical, Torsion | 0.04 rad/mm | 22 |

FIG. 14

| Trade | Bending, Rectangular | Torsion, Cylindrical |
|---|---|---|
| Activation Simplicity | X | X |
| Range of Motion-to-Volume | X | |
| Torque-to-Volume | | X |
| Manufacturing and Assembly | X | |
| Disturbance Stiffness | X | |
| Chosen Element | X | |

*FIG. 15*

| Property | Variable | Units | Value |
|---|---|---|---|
| Density | $\rho_d$ | $\frac{g}{mm^3}$ | $6.45 \times 10^{-3}$ |
| Specific Heat | $c_p$ | $\frac{J}{gK}$ | $0.84$ |
| Latent Heat of Transformation | $c_t$ | $\frac{J}{g}$ | $24.2$ |
| Thermal Conductivity, Austenite | $k_a$ | $\frac{W}{mmK}$ | $18 \times 10^{-3}$ |
| Thermal Conductivity, Martensite | $k_m$ | $\frac{W}{mmK}$ | $8.6 \times 10^{-3}$ |
| Electrical Resistivity, Austenite | $\rho_{c,a}$ | $\Omega\,mm$ | $100 \times 10^{-5}$ |
| Electrical Resistivity, Martensite | $\rho_{c,m}$ | $\Omega\,mm$ | $80 \times 10^{-5}$ |
| Stephan-Boltzmann constant | $\sigma_{sb}$ | $\frac{W}{mm^2 K^4}$ | $5.67 \times 10^{-14}$ |
| Emissivity | $\varepsilon$ | - | $0.50$ |
| Maximum Current | $I_{max}$ | $A$ | $8$ |
| Minimum Spacecraft Temperature | $T_{sc,min}$ | $K$ | $243$ |
| Maximum Spacecraft Temperature | $T_{sc,max}$ | $K$ | $343$ |
| SMA Activation Temperature | $T_{activate}$ | $K$ | $373$ |
| Maximum SMA Temperature | $T_{max}$ | $K$ | $500$ |
| Annealing SMA Temperature [?] | $T_{anneal}$ | $K$ | $750$ |

FIG. 22

| Case | Property | Variable |
|---|---|---|
| Heat Up | Thermal Conductivity | $k_a$ |
| Heat Up | Electrical Resistivity | $\rho_{e,m}$ |
| Heat Up | Spacecraft Temperature | $T_{sc,min}$ |
| Cool Down | Thermal Conductivity | $k_m$ |
| Cool Down | Electrical Resistivity | - |
| Cool Down | Spacecraft Temperature | $T_{sc,max}$ |

*FIG. 23*

| Component | Quantity |
|---|---|
| SMA Elements, 32 x 6 x 0.1 mm$^3$ | 2 |
| M3 Bolts, Ultra Low Head | 4 |
| M3 Nuts, Thin | 4 |
| PTFE Washers, 0.75 mm thick | 4 or 8 |
| Wired Connections, Guage 22 | 2 or 4 |
| Deployable Structure | 1 |
| Annealing Jig | 1 |

FIG. 29

| Variable | Units | Value |
|---|---|---|
| $M_f$ | K | 282.2 |
| $M_s$ | K | 291.6 |
| $A_s$ | K | 307.7 |
| $A_f$ | K | 322.2 |
| $E_m$ | MPa | 26,300 |
| $E_a$ | MPa | 67,000 |
| $C_m$ | MPa/K | 8.0 |
| $C_a$ | MPa/K | 13.8 |
| $\sigma_s^{cr}$ | MPa | 100 |
| $\sigma_f^{cr}$ | MPa | 170 |
| $\varepsilon_L$ | - | 0.067 |

*FIG. 34*

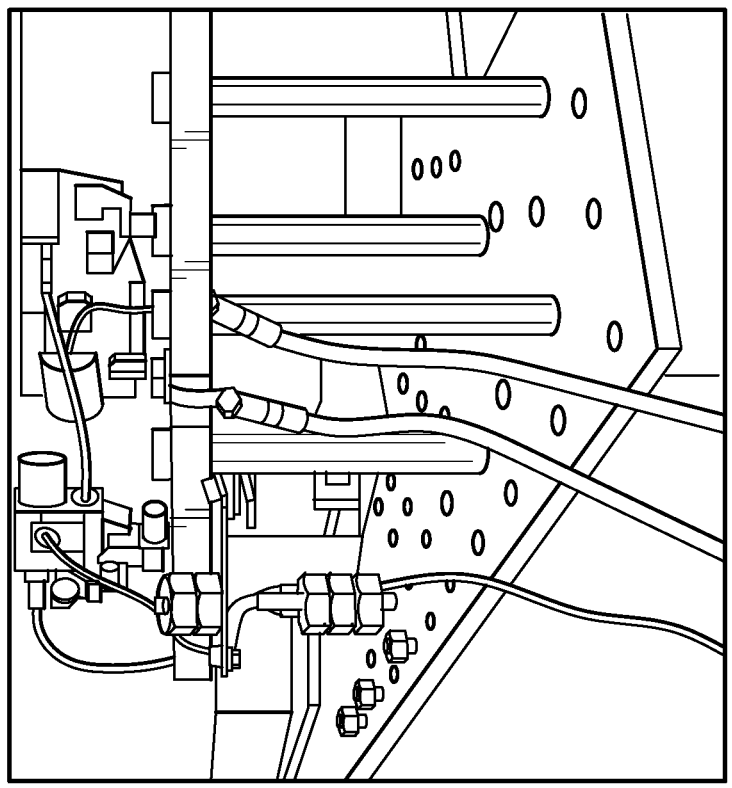
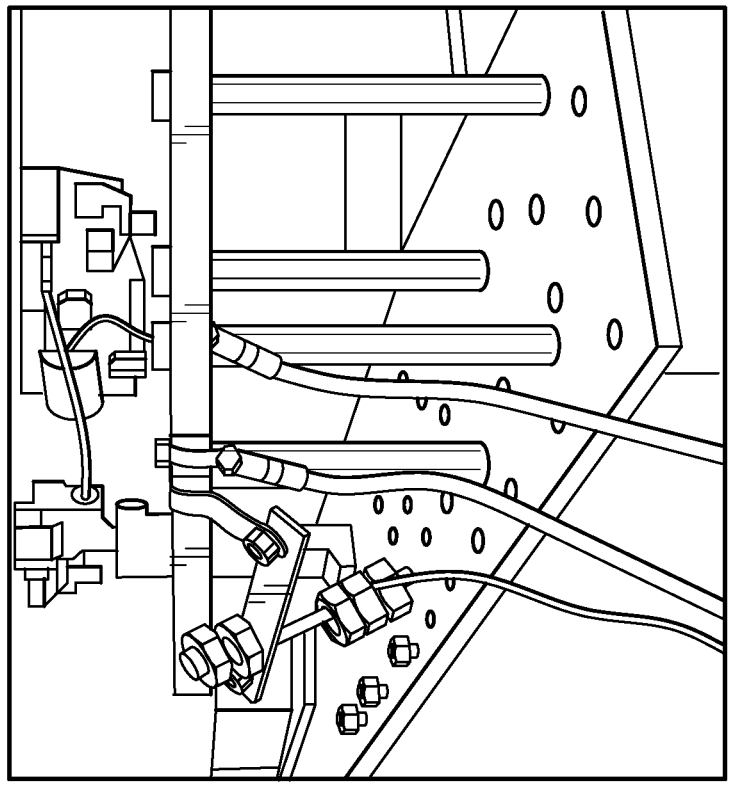
FIG. 39B
FIG. 39A

| Current (A) | $m_{test}$ (g) | Calculated Moment (mNm) | Measured Temperature (°C) |
|---|---|---|---|
| 1.0 | N/A | N/A | 25 |
| 2.0 | 15.5 | 3.0 | 30 |
| 3.0 | 18.6 | 3.6 | 40 |
| 4.0 | 21.9 | 4.3 | 50 |
| 5.0 | 21.9 | 4.3 | 75 |
| 6.0 | 21.9 | 4.3 | 100 |

FIG. 40

| Variable | Stowage Element | Deployment Element |
|---|---|---|
| Dimensions (mm³) | 20 × 5.8 × 0.1 | 20 × 6.5 × 0.1 |
| Measured Current (A) | 3.06 | 3.06 |
| Measured Voltage (mV) | 180 | 160 |
| Calculated Resistance (mΩ) | 59 | 52 |
| Calculated Power (W) | 0.56 | 0.49 |
| Predicted Resistance (mΩ) | 34 | 31 |
| Predicted Power (W) | 0.31 | 0.29 |

| Element | Position '1' | Position '2' | Position '3' |
|---|---|---|---|
| Stowage Element (°C) | 60 | 95 | 80 |
| Deployment Element (°C) | 60 | 85 | 70 |
| Predicted Temperature (°C) | - | 113 | - |

FIG. 46

SHAPE MEMORY ALLOY (SMA) HINGE APPARATUS, AND SYSTEMS AND METHODS EMPLOYING SAME

CROSS-REFERENCE TO RELATED PATENT APPLICATION(S)

This application claims priority, under 35 U.S.C. § 119(e), to U.S. Application No. 62/517,228, which was filed on Jun. 9, 2017, and is incorporated herein by reference in its entirety.

GOVERNMENT SUPPORT

The invention was made with Government support under Grant No. FA9453-16-D-0004 awarded by the Air Force Research Laboratory. The Government has certain rights in the invention.

BACKGROUND

CubeSats are a class of miniaturized satellites configured to provide capabilities, such as remote sensing or communication, that can augment, or in some instances, replace the capabilities provided by larger satellites. Compared to conventional satellites, CubeSats can be manufactured using lower cost components, e.g., commercially off the shelf parts. The smaller size and weight also enable CubeSats to be deployed by standardized deployers or as a secondary payload on a launch vehicle, which can substantially reduce the cost of deployment.

Although CubeSats can offer functional advantages and cost benefits over larger satellites, CubeSats are typically unable to move deployable structures, e.g., solar panels, once deployed due to the compact form factor limiting the integration of actuators. This can lead to undesirable variations in power generation as the solar cells on the CubeSat may be inadequately oriented towards the Sun during portions of their orbit. Data transfer rates between the CubeSat and another satellite or ground station can also be affected, particularly for communication systems, e.g., laser communication, that rely upon fine pointing for operation.

CubeSats may also be unable to effectively correct for orbital drag and other effects that can alter the orientation of respective CubeSats in a deployed constellation of multiple satellites, particularly in Low Earth Orbit (LEO). More specifically, maintaining desired orbital phasing of a LEO cubesat constellation is a persistent problem from a mission and systems design perspective. Orbital drag and other effects have the tendency to disperse small spacecraft over their anticipated operational lifetimes, and some form of active orbital management is needed to maintain the geometry of a constellation. Nanosatellite propulsion systems are commercially available and can provide a method of adjusting orbital spacing but are expensive, have demanding size, weight, and power requirements, and often necessitate additional safety reviews prior to integration. Differential drag increasing or decreasing a spacecraft's drag coefficient has been used to address this need either by rotating the spacecraft to present a face with a smaller cross-section area or by using a mechanism to deploy and retract solar arrays to achieve the same objective. The first approach has been extensively demonstrated, but complicates the satellites' mission by requiring bus pointing that may interrupt mission objectives. The second approach has been successfully demonstrated through the use of an electric motor and reel. Unfortunately, this approach is space inefficient and requires additional moving parts beyond the solar panels themselves which complicates design and operations.

In sum, actuation systems, such as electrospray, cold gas, magnetorquers, reaction wheels, or chemical monopropellant systems, can be used to move a deployable structure on a satellite. However, these systems can be expensive, complex, heavy, and provide a limited number of uses. Furthermore, these systems can cause undesirable motion of the main satellite body, which can affect the performance of other subsystems. Single-use actuation mechanisms, such as a spring-loaded latch, a burn-through wire, a shape-memory alloy latch, are typically used on CubeSats to release a deployable structure, but cannot be used to adjust the position or orientation of the deployable structure. Multi-use actuation mechanisms, such as an electric stepper motor spool, is not commonly used on CubeSat systems due to their size, weight, and complexity.

Electrostatic actuators do not provide sufficient force and/or torque and requires prohibitively high electrical power for operation. Piezoelectric and magnetorestrictive alloys can produce sufficient force and/or torque, but require prohibitively high voltages and/or magnetic fields for operation and typically support low strains, limiting their range of motion. Optical actuators can tolerate only low strain and requires a separate light source, resulting in greater system complexity. Hydraulic and pneumatic actuators can provide sufficient strain and power density, but utilize pressurized fluids, resulting in greater system complexity. Miniaturized electromagnetic motors typically include bearings and/or other support structures, increasing the size, weight, and complexity of the motor. Shape memory alloys (SMA) have also been used as actuators, but are typically used in combination with a bearing system to produce various axes of motion. For CubeSat systems, SMA actuators are typically limited as single-use actuation mechanisms to release a deployable structure.

SUMMARY

As noted above, over a decade of continuing CubeSat technology improvements are driving the wide adoption of CubeSats for research and commercial missions. However, the Inventors have recognized and appreciated that resource constraints onboard CubeSats limit their ability to support multi-use actuators. In particular, the Inventors have recognized and appreciated that there is a need for a multi-use rotary actuator that can be actively commanded to different angles, with advantageous applications for CubeSats such as differential drag management, increased power generation, and reconfigurable deployable structures.

In view of the foregoing, the present disclosure is directed to inventive implementations of a shape memory alloy (SMA) hinge apparatus (also referred to herein more generally as an "actuator"), and various systems incorporating such a hinge apparatus and methods relating to same.

Regarding SMA elements that are employed in hinge apparatus and actuators according to the present disclosure, SMAs exploit a reversible transition between to material phases, namely between the "austenite" and "martensite" metallic phases, to "remember" a prior shape. At low temperature, the SMA is in its martensite phase and is easily deformed. Upon heating, the SMA transitions to its austenite phase and recovers the shape it occupied when last in the austenite phase. In some examples, the required heating of an SMA element can be accomplished by running an electrical current through the element, referred to herein as "Joule heating." The austenite phase shape of an SMA element can be trained into a wide variety of shapes by holding the SMA element rigidly in a particular shape and heating it beyond the martensite-austenite transition temperature. Two SMA elements can be placed side by side, each programmed or trained to a different shape, to create an effective actuator that moves smoothly and efficiently between two positions to provide bidirectional rotary motion, in some cases as much as 100,000 or more times without experiencing significant degradation.

In sum, one example implementation of the inventive concepts disclosed herein is directed to a controllable shape memory alloy (SMA) hinge apparatus comprising a plurality of SMA elements to effect at least a first angle of rotation and a second angle of rotation, about an axis of rotation, between a first object and a second object. The plurality of SMA elements includes a first SMA element, activated by first Joule heating, to adjust at least one of the first object and the second object to the first angle of rotation about the axis of rotation, and a second SMA element, activated by second Joule heating, to adjust the at least one of the first object and the second object to the second angle of rotation about the axis of rotation.

In one aspect, one or both of the first SMA element and the second SMA element, when activated by Joule heating, undergoes a three-dimensional transformation to rotate the first object and/or the second object. The respective SMA elements may undergo antagonistic three-dimensional transformations, and a given three-dimensional transformation may be a bending transformation or a torsion transformation. In another aspect, the hinge apparatus is a multiple-use bidirectional non-continuous rotary actuator and does not include a bearing. The respective SMA elements may be trained in various manners to achieve respective different angles of rotations between the first and second objects (e.g., zero degrees and 90 degrees). In example implementations, the SMA elements may be nitinol, and may be formed as SMA wires, SMA rectangular sheets, or SMA coils, for example.

In some examples, the hinge apparatus further comprises a first electrical energy source (e.g., a voltage source or a current source), coupled to the first SMA element, to provide a first current to the first SMA element and thereby provide the first Joule heating to the first SMA element based on the first current, and a second electrical energy source, coupled to the second SMA element, to provide a second current to the second SMA element, independently of the first current provided to the first SMA element, and thereby provide the second Joule heating to the second SMA element based on the second current.

In some examples, the first object to which the hinge apparatus is coupled may be a spacecraft (e.g., a satellite) and the second object to which the hinge apparatus is coupled may be a deployable structure (e.g., a robotic appendage, a deployable solar panel, a deployable aperture, a deployable mirror, a deployable radiator, and at least one actuator to steer an antenna dish).

In another inventive example, a method is described for rotating a first object relative to a second object, about an axis of rotation, to have at least a first angle of rotation between the first object and the second object and a second angle of rotation between the first object and the second object. The method comprises: A) passing a first current through a first shape memory alloy (SMA) element coupled to the first object and the second object to activate the first SMA element and thereby rotate at least one of the first object and the second object about the axis of rotation to the first angle of rotation; and B) passing a second current through a second SMA element coupled to the first object and the second object to activate the second SMA element and thereby rotate the at least one of the first object and the second object about the axis of rotation to the second angle of rotation.

In one aspect of this method, in A) the first SMA element undergoes a first three-dimensional transformation to rotate the at least one of the first object and the second object to the first angle of rotation about the axis of rotation, and in B), the second SMA element undergoes a second three-dimensional transformation to rotate the at least one of the first object and the second object to the second angle of rotation about the axis of rotation. In another aspect, the first three-dimensional transformation and the second three-dimensional transformation are antagonistic transformations. In another aspect, at least one of the first three-dimensional transformation and the second three-dimensional transformation includes a bending transformation. In yet another aspect, at least one of the first three-dimensional transformation and the second three-dimensional transformation includes a torsion transformation.

The foregoing method may further comprise independently passing the first current through the first SMA element and the second current through the second SMA element so as to bi-directionally rotate the at least one of the first object and the second object multiple times about the axis of rotation. The method also may comprise training the first SMA element to attain the first angle of rotation, and training the second SMA element to attain the second angle of rotation. In one example, the first object is a spacecraft and the second object is a deployable structure, and the method comprises independently passing the first current through the first SMA element and the second current through the second SMA element so as to bi-directionally rotate the deployable structure with respect to the spacecraft about the axis of rotation. In one aspect, the deployable structure is a drag surface, and the method comprises deploying and stowing the drag surface so as to adjust a ram area of the spacecraft. In another aspect, the deployable structure is a solar panel, and the method comprises rotating the solar panel to facilitate power generation by the solar panel.

Another inventive implementation example relates to a spacecraft hinge assembly, comprising: at least a first shape memory alloy (SMA) element and a second SMA element, each SMA element programmed to a different deployment angle of rotation between a spacecraft and a deployable structure; a first step-down converter, coupled to the first SMA element, to provide a first current to the first SMA element and thereby heat the first SMA element based on the first current; and a second step-down converter, coupled to the second SMA element, to provide a second current to the second SMA element, independently of the first current provided to the first SMA element, and thereby heat the second SMA element based on the second current. In one aspect, the first step-down converter measures the first current and a first voltage across the first SMA element to thereby reveal a first temperature of the first SMA element, and the second step-down converter measures the second current and a second voltage across the second SMA element to thereby reveal a second temperature of the second SMA element. Each of the first SMA element and the second SMA element may comprise nitinol.

The spacecraft hinge assembly may be employed with a spacecraft such as a satellite, and examples of deployable structures to which the hinge assembly may be coupled include a robotic appendage, a deployable solar panel, a deployable aperture, a deployable mirror, a deployable radiator, and at least one actuator to steer an antenna dish. More specifically, in one example the SMA hinge assembly (or "actuator") may be used in a CubeSat satellite, in which the respective SMA elements are configured in an antagonistic configuration to apply a positive and a negative torque, respectively, when heated. In this manner, the SMA elements can rotate the deployable member in a bidirectional manner. For example, the first SMA element is activated to apply a torque to rotate the deployable member while the second SMA element remains passive. A driver is coupled to the first SMA element and the second SMA element to supply current to each SMA element to induce Joule heating, thus actuating the position of the deployable member.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 4 is a table detailing various requirements and a verification plan for the exemplary SMA hinge apparatus.

FIG. 12 is a table that summarizes various risks and countermeasures for the trade study concepts.

FIG. 13 is a table detailing the geometric and thermophysical properties for a theoretical SMA wire used in the initial thermal feasibility studies.

FIG. 14 is a table comparing the recovery moments and torques for different concepts in the trade studies.

FIG. 15 is a table summarizing the trade study regarding the use of a rectangular bending or cylindrical torsion architecture.

FIG. 22 is a table detailing exemplary thermophysical properties of nitinol.

FIG. 23 shows the thermophysical properties used to determine upper limit estimates for the heat up and cool down processes.

FIG. 29 shows the bill of materials for the prototype SMA hinge apparatus.

FIG. 34 is a table detailing the typical $Ni_{55}Ti$ properties used in the SMA actuator prototype.

FIG. 39A shows the experiment used to measure the recovery moment of the SMA actuator. The SMA actuator mechanism before activation is shown.

FIG. 39B shows the SMA actuator mechanism from FIG. 39A after activation.

FIG. 40 is a table detailing the results of bending moment measurements as a function of electrical current for the stowage SMA element during activation.

FIG. 46 is a table detailing the results of temperature measurements during activation in the lab with 6 A. The measured and predicted values are presented.

DETAILED DESCRIPTION

Following below are more detailed descriptions of various concepts related to, and embodiments of, inventive shape memory alloy (SMA) hinge apparatus, and systems and methods relating to same. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Spacecraft Context for Inventive SMA Actuator/Hinge Apparatus

Figure 1:
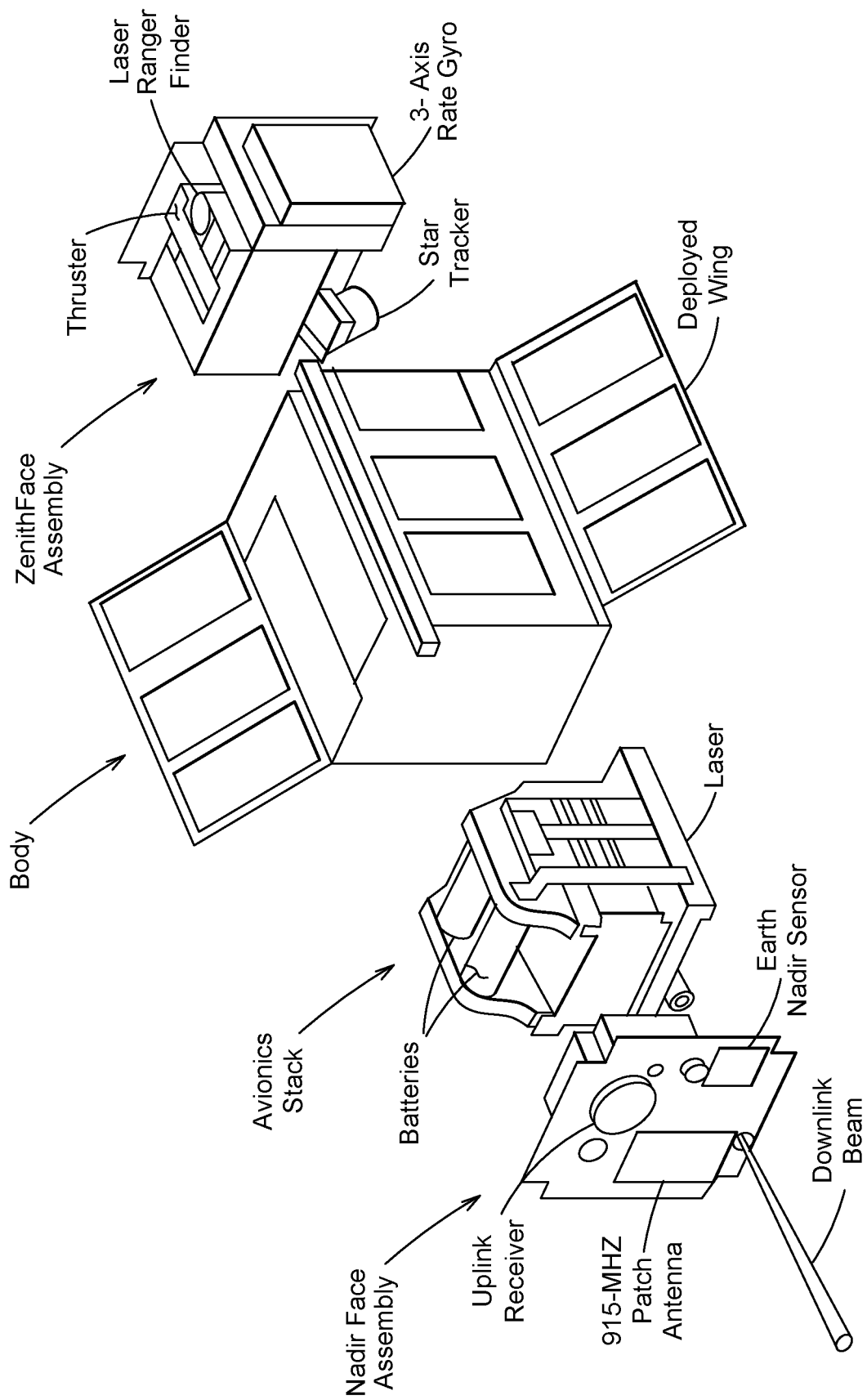
FIG. 1 shows the subsystems and layout of a conventional CubeSat.

CubeSats are a class of miniaturized satellites configured to provide capabilities, such as remote sensing or communication, that can augment, or in some instances, replace the capabilities provided by larger satellites. An exemplary CubeSat is shown in FIG. 1. The size and weight of CubeSats are standardized in multiples of 1U, where 1U corresponds to a 10 by 10 by 10 $cm^3$ cubic volume and a mass up to 1.33 kg. For larger CubeSats, e.g., 6U or 12U CubeSats, the mass limit can be increased up to 2 kg per 1U. Compared to conventional satellites, CubeSats can be manufactured using lower cost components, e.g., commercially off the shelf parts. The smaller size and weight also enable CubeSats to be deployed by standardized deployers or as a secondary payload on a launch vehicle, which can substantially reduce the cost of deployment. Furthermore, multiple CubeSats can be deployed during a single launch and configured to operate in tandem to provide greater areal coverage of the Earth.

Although CubeSats can offer functional advantages and cost benefits over larger satellites, the compact form factor of CubeSats limited their ability to support moveable deployable structures, e.g., solar cells. As a result, once CubeSats are launched, adjustments to the orientation of the CubeSat and/or the deployable structures on the CubeSat is limited. This can lead to undesirable variations in power generation as the solar cells on the CubeSat may be inadequately oriented towards the Sun during portions of their orbit. Data transfer rates between the CubeSat and another satellite or ground station can also be affected, particularly for communication systems, e.g., laser communication, that rely upon fine pointing for operation. CubeSats may also be unable to correct for orbital drag and other effects that can alter the orientation of CubeSats, particularly in Low Earth Orbit (LEO).

Actuation systems such as electrospray, cold gas, magnetorquers, reaction wheels, or chemical monopropellant systems can be used to maneuver the CubeSat, but at greater cost, complexity, and mass. Furthermore, actuation systems that rely upon a propellant for maneuverability can be limited by the finite amount of fuel onboard the CubeSat. Differential drag management techniques can also be used in lieu of propulsion systems where the drag coefficient of the CubeSat can be altered by rotating the CubeSat or deploying and retracting solar arrays to change the cross section of the CubeSat such that the orientation of the CubeSat can be adjusted during orbit. However, rotating the entire CubeSat can affect the performance of other subsystems sensitive to the orientation of the CubeSat, e.g., communication systems. Solar arrays that can be deployed or retracted can also utilize substantial volume on the CubeSat and may include additional moving parts, increasing system complexity, cost, and can even shorten the operational lifetime of the CubeSat.

Supplementary actuators configured to substantially adjust only the deployable structure on the CubeSat can also be used to augment actuation systems, such as those described above. For example, single-use actuation mechanisms have been used as deployment mechanisms on CubeSats. Single-use actuation mechanisms can be based on a spring-loaded system restrained by a hold down mechanism, such as a burn-through wire, meltable Dyneema (nylon) cords, and shape memory alloy single-use actuators. Once the hold down mechanism is activated, the spring can deploy and maintain the position of a structure, e.g., a solar panel, antennas, and booms. However, once the structure is deployed, the orientation and position of the structure typically remains fixed with respect to the main body of the CubeSat. Furthermore, the single-use actuation mechanism is typically configured for a specific mission and does not provide a means for active control during or after activation.

Multi-use actuation mechanisms can allow for controllable actuation of deployable structures during the operational lifetime of the CubeSat. In some instances, electric stepper motor spools can be configured as a rotary actuator that applies a torque to drive the deployment of a structure, e.g., a solar panel. One or more electric stepper motor spools can be coupled to gimbals that allow a deployed structure to be rotated along one or more degrees of freedom. However, despite the potential benefits, multi-use actuation mechanisms presently are not commonly used in CubeSats due to their size, weight, and complexity.

Figure 2:
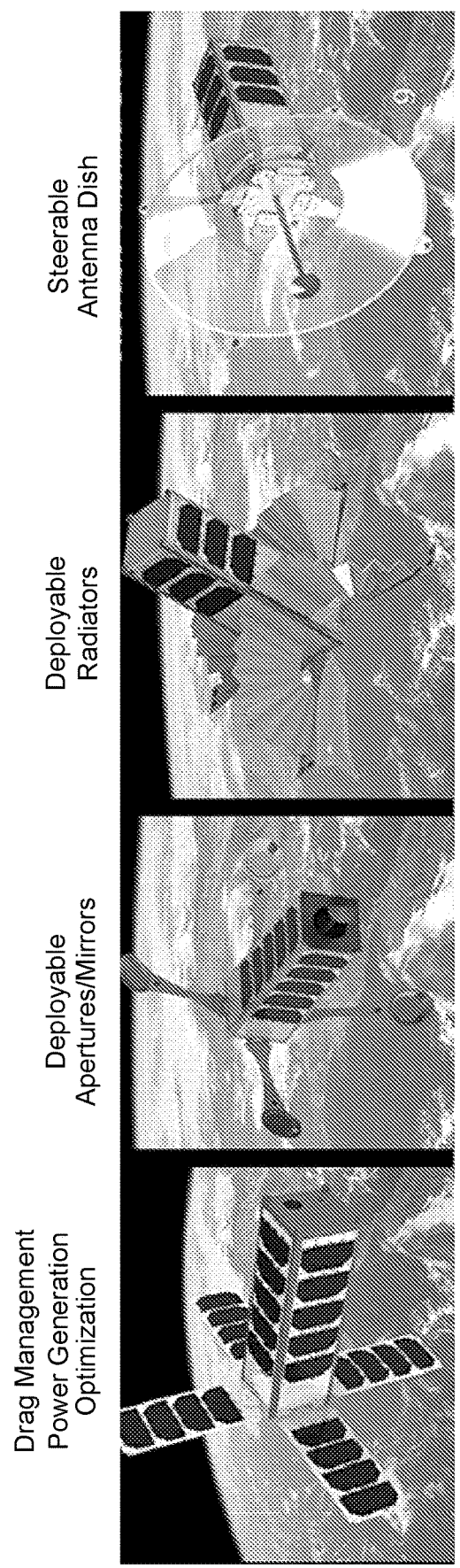
FIG. 2 shows various applications of deployable structures enabled by an actively controlled actuator or SMA hinge apparatus, according to the inventive concepts disclosed herein.

The Inventors have thus recognized and appreciated a need for smaller, lighter, and simpler actuators that can actively control deployable structures on CubeSats. Such actuators can be used to adjust the orientation of solar cells to improve power generation during orbit, improving the alignment of communication systems to increase data communication rates, or differential drag management where a drag surface can be actuated without rotating the entire CubeSat to control the speed of the CubeSat. In other instances, the actuator can be used for deployable radiators for fine temperature control, steerable antennas for higher gains, and robotic arms coupled to various optical and imaging systems such as apertures, attenuators, and mirrors. Several exemplary applications are shown in FIG. 2. The actuators described herein can also be modular, enabling greater compatibility with various mission specifications, simplifying manufacturing and reducing costs.

Free-Space Lasercom and Radiation Experiment (FLARE)

Figure 3:
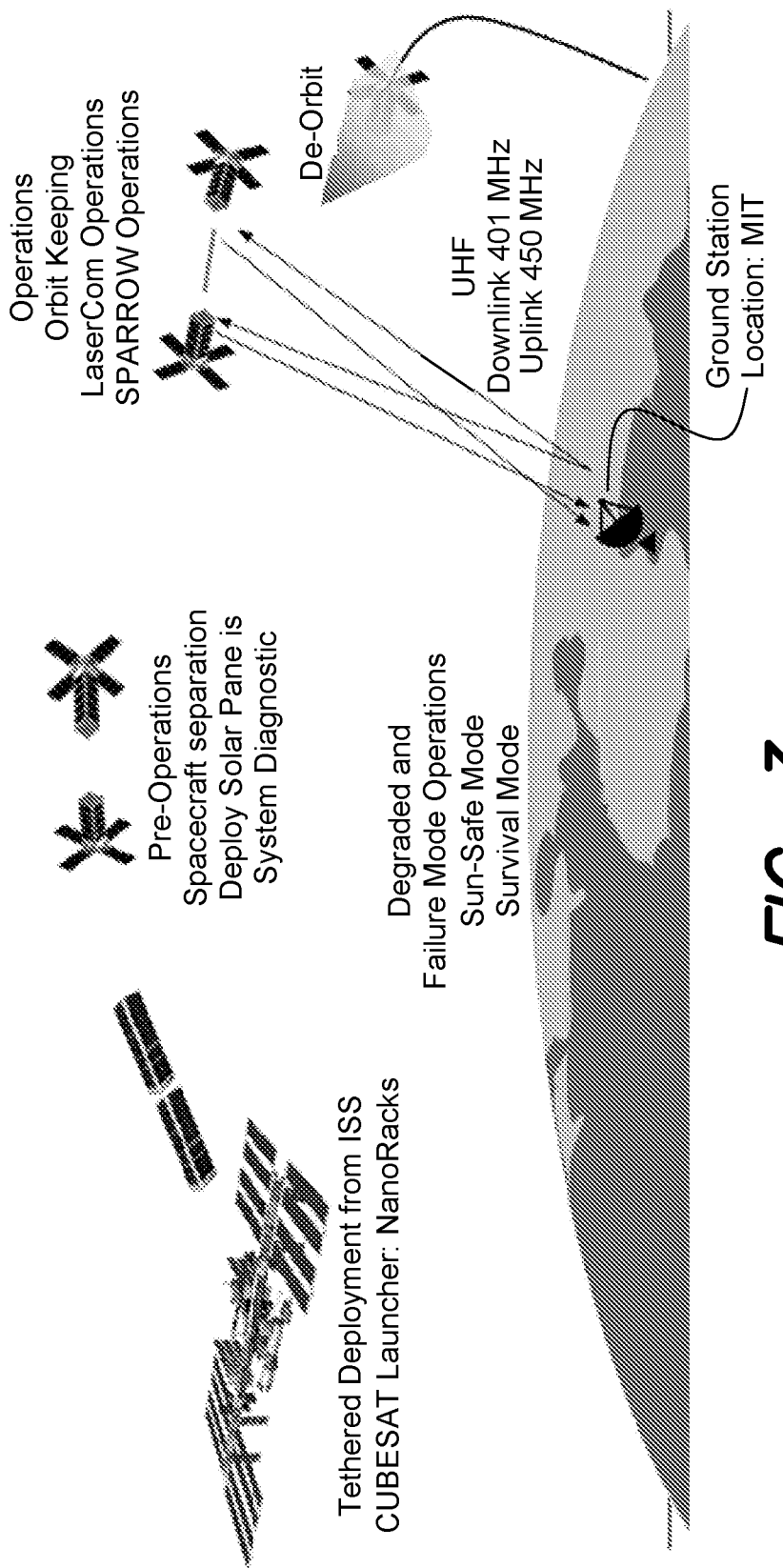
FIG. 3 shows a conceptual illustration detailing the operation of the identical pair of FLARE 3U CubeSats.

To provide illustrative context, an exemplary application for inventive actuators according to the present disclosure will now be described for the Free-Space Lasercom and Radiation Experiment (FLARE) system. However, it should be appreciated that such actuators can be configured and incorporated in other systems. As shown in FIG. 3, FLARE includes a pair of identical 3U CubeSats deployed in a circular LEO and configured to provide laser crosslinks and radiation particle spectrometry. For these CubeSats, it is desirable to have multi-use rotary actuators, which can be coupled to deployable solar panels to form a folded lightweight actuated positioning system (FLAPS). The solar panels can be used to increase power generation and can also function as drag surfaces for differential drag management. For FLAPS, the rotary actuator can be configured to rotate the solar panels between at least two angular positions for high-drag and low-drag configurations.

The rotary actuators for FLAPS can be used to change the drag coefficient of the FLARE CubeSats in real time, thus enabling dynamic adjustment of the relative orientation and position between the pair of CubeSats. The rotary actuators for FLAPS can also continuously adjust the solar panels to increase or maintain power generation during orbit. Additionally, the rotary actuators can augment reaction wheel systems to provide finer attitude control and momentum desaturation to orient the entire CubeSat during operation.

The rotary actuators should be sufficiently lightweight and compact in size to accommodate size and weight budgets imposed by the FLARE system. It is desirable for the rotary actuators to have a simplified design to improve reliability, increase the operational lifetime of a CubeSat, and reduce manufacturing costs. The simplified design can also enable the rotary actuators to be used for different applications, e.g., positioning an imaging system or a radiator. The rotary actuators can be modular in design and configured to rotate a deployable structure to a variety of angular positions based on the needs of the mission. For example, one or more FLAPS can be used to facilitate deployment of a solar panel with variable size by deploying at least one FLAPS along a first edge of the solar panel and at least one FLAPS along a second edge of the solar panel.

In order to comply with the CubeSat Design Specification, the rotary actuators should reduce the creation of orbit debris, avoid the use of pyrotechnics, limit the magnetic field strength, and adhere to regulations for propulsion systems. Furthermore, the rotary actuators should adhere to material guidelines to meet vacuum, corrosion, and outgassing compatibility. The rotary actuators should also be operable for a range of temperatures in the orbital environment, e.g., from −30° C. to 70° C. For FLAPS, the rotary actuators should deliver a torque that is less than the torque provided by onboard reaction wheels to ensure the reaction wheels can counteract the rotary actuators and maintain CubeSat stability, e.g., the rotary actuator should not cause the CubeSat to appreciable rotate. FIG. 4 is a table showing a list of exemplary requirements for the SMA hinge apparatus. It should be appreciated that the specifications for FLARE is one exemplary application for an actuator described in the present disclosure.

Actuator Technologies

Miniaturized actuator technologies have been an active area of development, particularly in the field of robotics. However, few of these technologies provide capabilities that can meet the demands imposed by CubeSats such as the FLARE system described above. Electrostatic actuators typically do not provide sufficient force and/or torque when miniaturized and need larger voltage inputs, e.g., about 100 V, which is higher than the voltage supplied on a CubeSat, e.g., about 8 V. Piezoelectric and magnetorestrictive alloys can produce sufficient force and/or torque, but need high voltages and/or magnetic fields for operation and typically only support low strains, which limits their use for rotary actuation. Optical actuators tolerate low strain and need a separate light source for control, resulting in greater system complexity. Actuators based on thermal expansion materials, e.g., a bimetallic spring, do not provide sufficient strain to stow compactly within the volume of the CubeSat. Hydraulic and pneumatic actuators can provide sufficient strain and power density, but utilize pressurized fluids, which increase system complexity.

Electromagnetic motors, such as brushless DC motors, solenoids, and transducers, have been used on CubeSats to drive various controllable mechanisms. The electromagnetic motors can be configured as servo motors with encoders or stepper motors, which both provide positional control. However, the encoder used in servo motors can have complex electronics, which can be damaged by radiation from the environment. Furthermore, miniaturized electromagnetic motors configured to provide rotational actuation typically have miniaturized shafts that are unable to directly support deployable mechanisms since loads applied during handling or launch can damage the shaft. As a result, bearings and/or other support structures can be used to support electromagnetic motors, which increase the size, weight, and complexity of the actuator.

Shape Memory Materials

Shape memory materials can also be used for actuation. In general, shape memory materials are deformable materials that can recover a memorized shape when a stimulus is applied to the material. The memorized shape can be configured such that the shape memory materials provide linear motion, e.g., a spring, or rotary motion, e.g., a curved beam. Rotary motion can also be achieved by coupling a linear actuator to a moment arm and a bearing. However, the additional components for such configurations can lead to larger and more complex actuation systems compared to an actuator based on a shape memory element that provides rotary motion. Compared to electromagnetic motors, actuators based on shape memory materials can be simpler in design (e.g., fewer moving components), smaller, lighter, silent, and have a high power density.

Several types of shape memory materials are available, including, but not limited to, shape memory alloys (SMAs), shape memory polymers (SMPs), and shape memory polymer composites (SMPCs). SMPCs are a type of SMP that include particles, fibers, or nanotubes that alter the thermomechanical properties of the material. SMPs and SMPCs can provide actuation by changing the temperature ranges that cross the glass transition temperature of the polymer, resulting in large changes in strain. SMPs and SMPCs can also be lightweight and easy to process. However, SMPs and SMPCs typically provide low recovery forces limiting their ability to drive a deployable mechanism and can experience creep over time, which can change the memorized shape.

Figure 5:
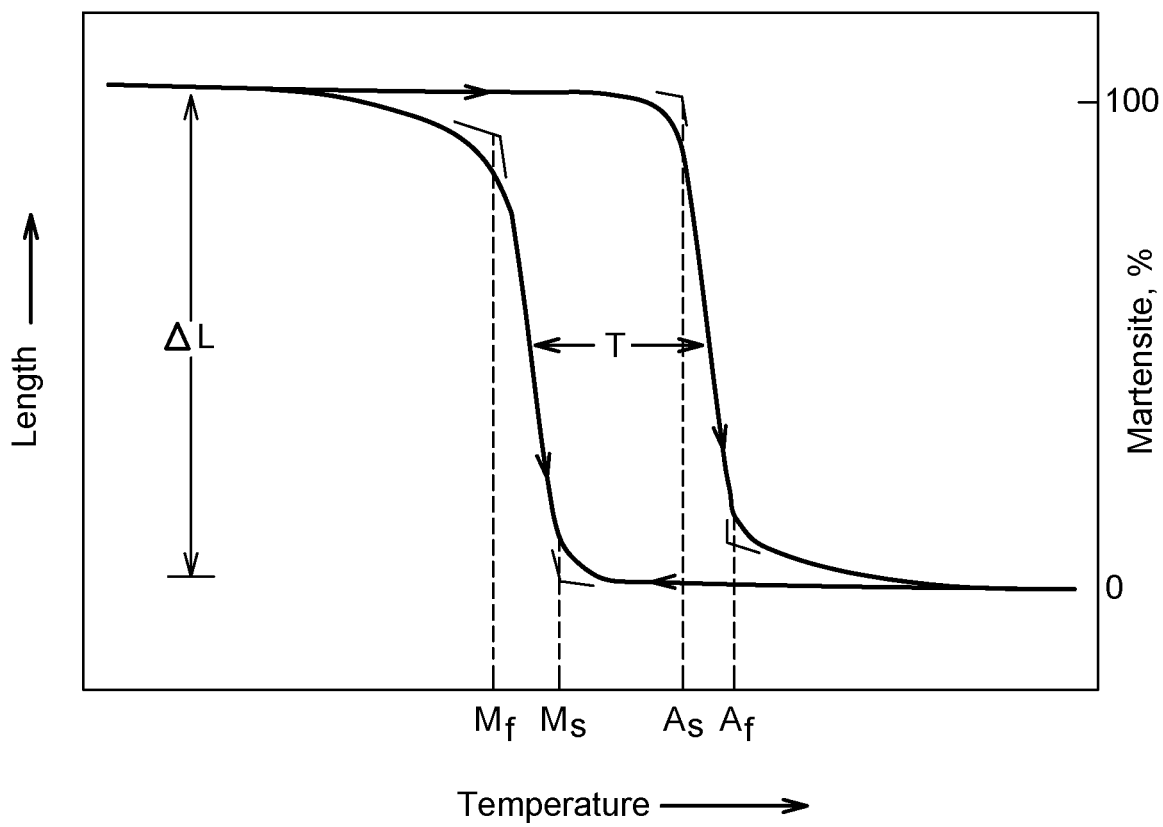
FIG. 5 shows an exemplary transformation curve for a linear SMA actuator. 'M' denotes the martensitic phase and 'A' denotes the austenitic. The 's' is the start of the transformation, and 'f' is the finish.

SMAs are typically metallic alloys that can be configured to remember a shape when annealed at high temperatures. When cooled, the crystal structure of the SMAs is transformed into a martensite phase where the SMAs can be readily deformed and can support high strain. When the SMAs are heated above a transformation temperature, which is substantially less than the annealing temperature, the crystal structure of the SMAs is transformed into an austenite phase. In the austenite phase, the SMAs become more mechanically rigid and revert back to the memorized shape. An exemplary cycle for a linear actuator is shown in FIG. 5. SMAs can provide large recovery forces and repeatable activation, which can enable SMAs to be used for actuation.

Figure 6:
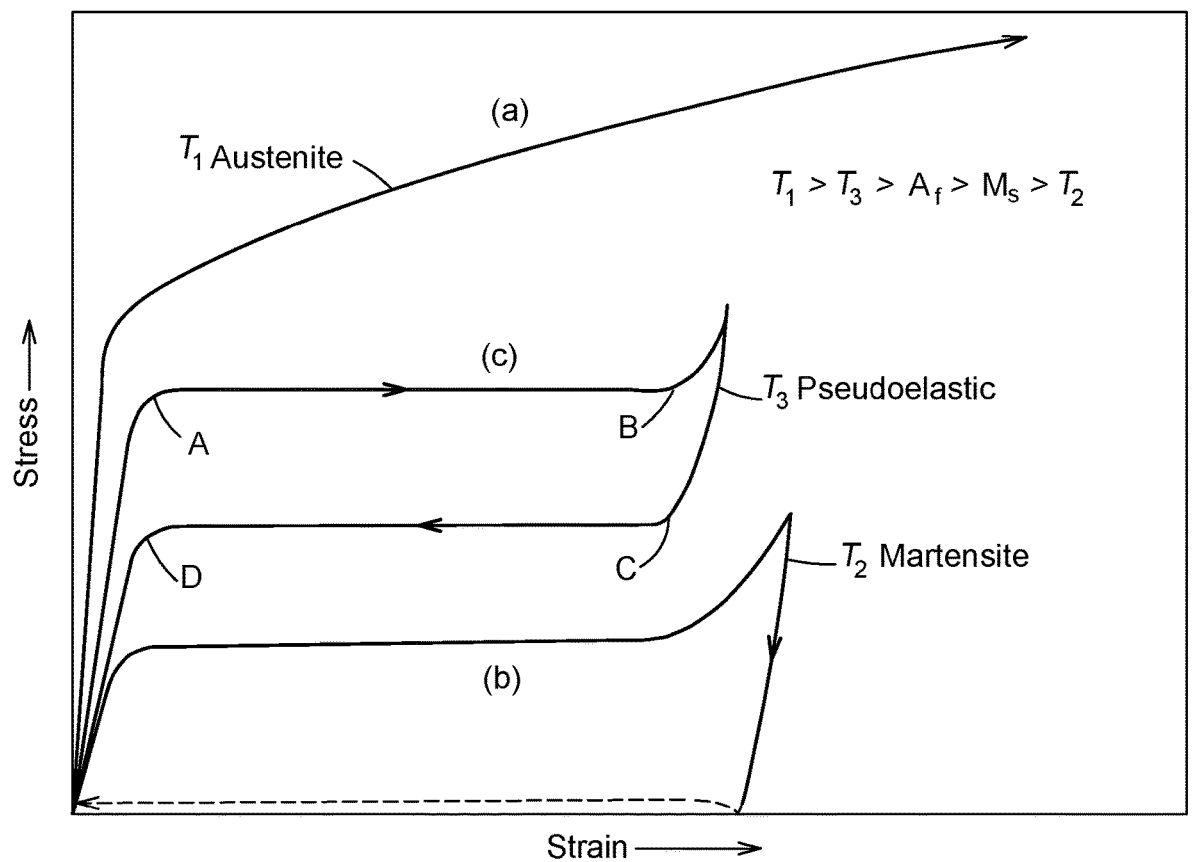
FIG. 6 shows the thermomechanical behavior of a typical shape memory alloy.

SMAs can exhibit multiple transformation effects depending on the temperature, as shown in FIG. 6. For instance, a one-way effect can occur at high temperatures where the shape of the SMA can change upon heating, but not cooling. A two-way effect can occur at lower temperatures where the shape of the SMA can change upon both heating and cooling; however, the shape of the SMA cannot be passively maintained once the stimulus, e.g., heat, is no longer applied. A pseudoelastic effect can provide the full recovery of material strain due to a stress-induced martensite conversion to detwinned martensite, which is reversed when the stress is relieved and the material transforms back to austenite. Exemplary SMA materials include, but are not limited to, nickel-titanium (NiTi) alloys, copper-based (Cu—X) alloys such as Cu—Al—Ni and Cu—Zn—Al, and iron-based (Fe—X) alloys.

SMA Actuator Design

The present disclosure is thus directed towards various inventive implementations of SMA-based actuators (also referred to herein as "SMA hinge apparatus" or "SMA hinge assembly") to controllably actuate deployable structures on a satellite such as a CubeSat. It should be appreciated that SMA actuators disclosed herein can be configured to provide linear or rotary actuation and unidirectional or bidirectional motion. For the FLARE system described above, SMA rotary actuators can be configured to provide bidirectional rotation to actuate the solar panel between at least two angular positions. Various design configurations can be used to form a SMA rotary actuator, including, but not limited to, one SMA element with a bias spring as the restoring force, one SMA element with two activation zones and localized heating, one SMA element utilize the two-way effect, one SMA element configured to have a twisting motion and two SMA elements in parallel with an antagonistic design as the restoring force. These various design configurations utilize at least one SMA element that provides rotary motion. In particular, the two SMA elements in an antagonistic configuration can provide large rotational motion and large torque to move a deployable surface.

Figure 7:
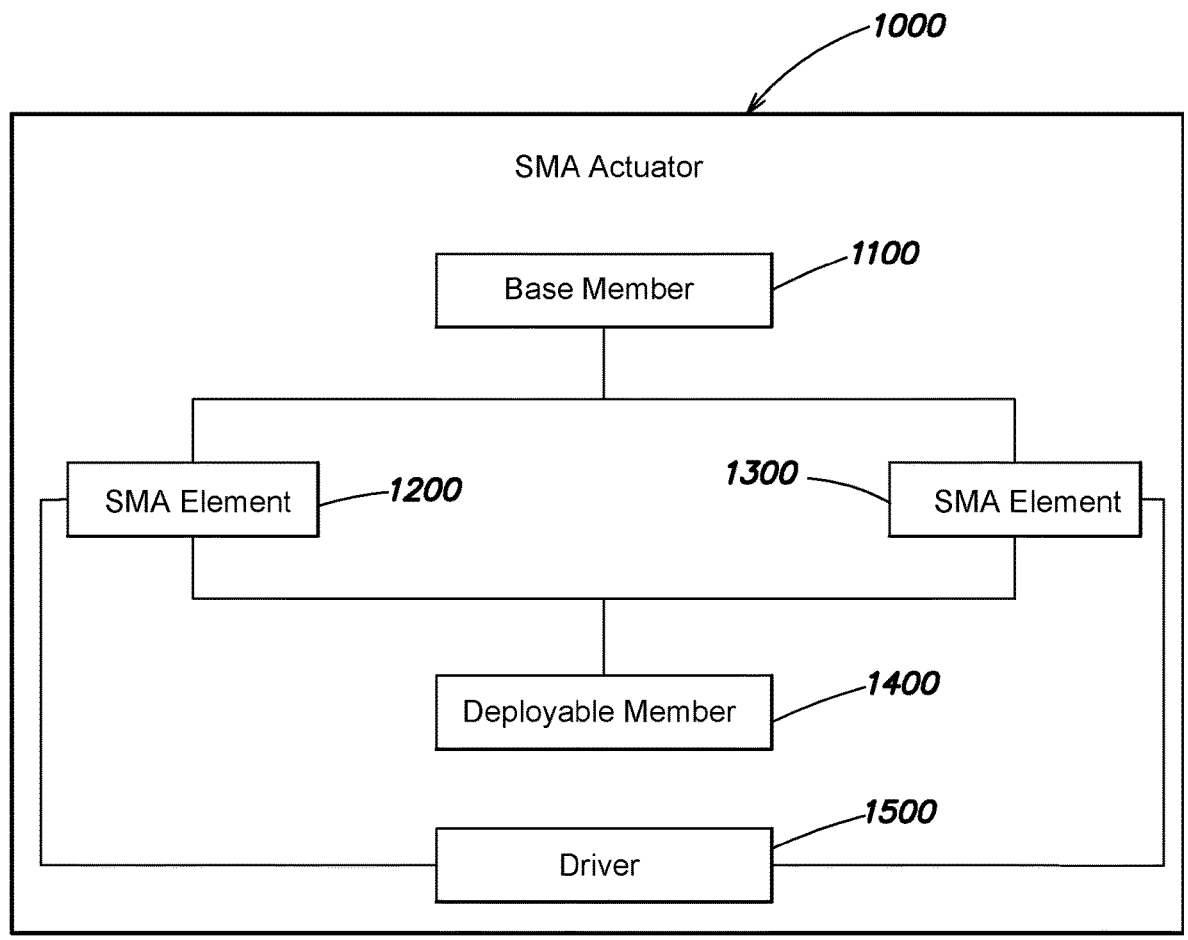
FIG. 7 shows an exemplary SMA actuator, according to an implementation.

An exemplary implementation of a SMA actuator 1000 based on the two element antagonistic configuration is shown in FIG. 7. In general, the SMA actuator 1000 may be a hinge assembly in which multiple SMA elements are coupled to a first object and a second object to effect different angles of rotation between the first and second objects about an axis of rotation. As discussed further below, in some implementations, the first object is a spacecraft (e.g., a satellite), and the second object is a deployable structure or "member" that may be rotated with respect to the spacecraft; however, it should be appreciated that SMA hinge apparatus/actuators as disclosed herein may have a wide variety of application beyond spacecraft and deployable structures for a spacecraft. Respective SMA elements of an SMA actuator or hinge assembly may be coupled to the first and second objects in a variety of manners (e.g., mechanical coupling via screws, fasteners or other mechanical compression mechanism, or other bonding technique).

For example, in one implementation as shown in the block diagram of FIG. 7, an SMA actuator 1000 can include a base member 1100 that couples to first object (e.g., a main body of a satellite). A first SMA element 1200 and a second SMA element 1300 can each include a first end coupled to the base member 1100 and second end coupled to a deployable member 1400. The first SMA element 1200 and the second SMA element 1300 can be configured to apply a positive and a negative torque, respectively, to rotate the deployable member 1400 in a bidirectional manner with respect to the base member. A driver 1500 (e.g., a source of electrical energy) can be operably coupled to the first SMA element 1200 and the second SMA element 1300 to control the direction of rotation and position of the SMA actuator 1000 to effect different angles of rotation between the base member and the deployable member.

Exemplary Implementations of a SMA Actuator

Figure 8:
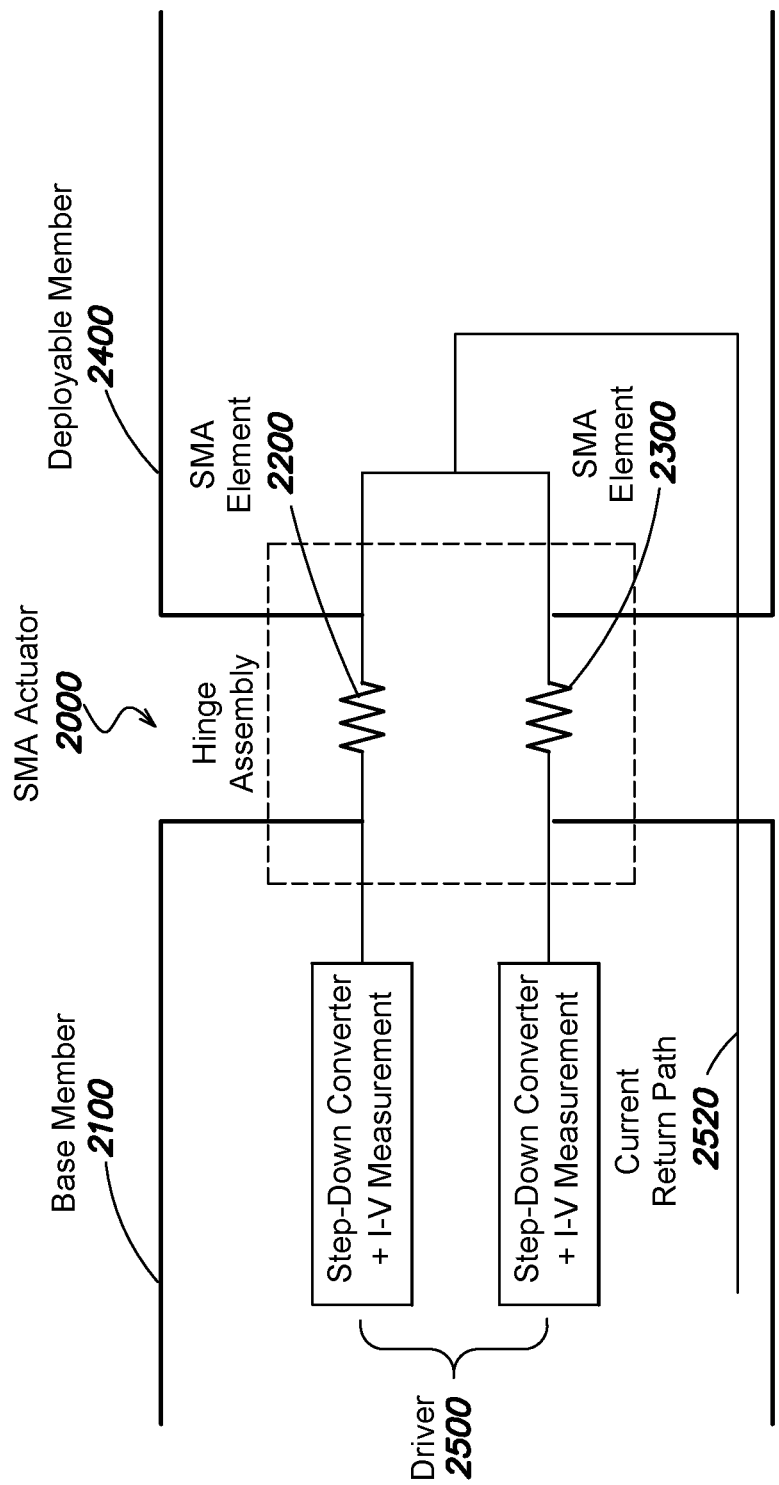
FIG. 8 is an illustration of an exemplary SMA actuator, according to an implementation.

FIG. 8 shows a schematic representation of a SMA actuator 2000 according to an implementation. The SMA actuator 2000 can include a base member 2100. The base member 2100 can be a separable component that couples to the main body of the satellite. The base member 2100 can also be a portion of the main body of the satellite with features that can support and couple to other various components in the SMA actuator 2000.

A first SMA element 2200 and a second SMA element 2300 can be used as actuators configured to rotate a deployable member 2400 in a bidirectional manner. The SMA elements 2200 and 2300 each include a first end coupled to the base member 2100 and a second end coupled to the deployable member 2400. The SMA elements 2200 and 2300 can be coupled to the base member 2100 or the deployable member 2400 using various methods, including, but not limited to adhesives, solder, brazing, welding, screw fasteners, clamps, and clips.

A driver 2500 (e.g., a source of electrical energy) can be included to provide a controllable voltage and/or current source to electrically actuate the first SMA element 2200 and the second SMA element 2300. The driver 2500 can be configured to independently supply voltage and/or current to the first SMA element 2200 and the second SMA element 2300 to facilitate actuation between at least two angular positions. In order to close the electrical circuit formed by the driver 2500, a current return path 2520 can be included. The current return path 2520 can be a wire with a substantially small bending stiffness such that the rotation of the deployable member 2400 is not appreciably affected by the wire. The driver 2500 can also include electronics to monitor current and voltage output to facilitate control of the SMA actuator 2000.

Figure 9A:
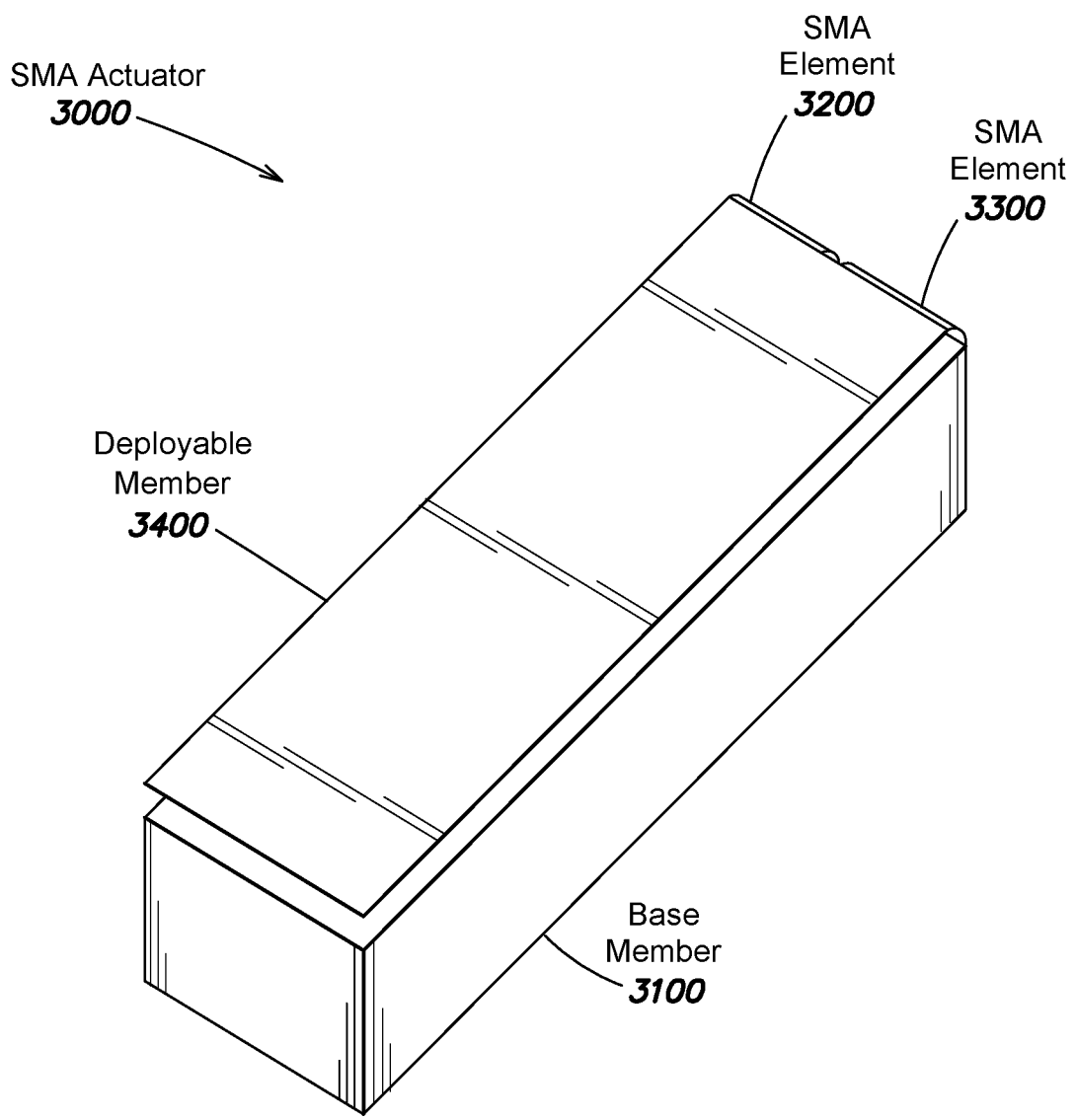
FIG. 9A shows an exemplary SMA actuator in a closed state ($\theta=0°$), according to an implementation.
Figure 9B:
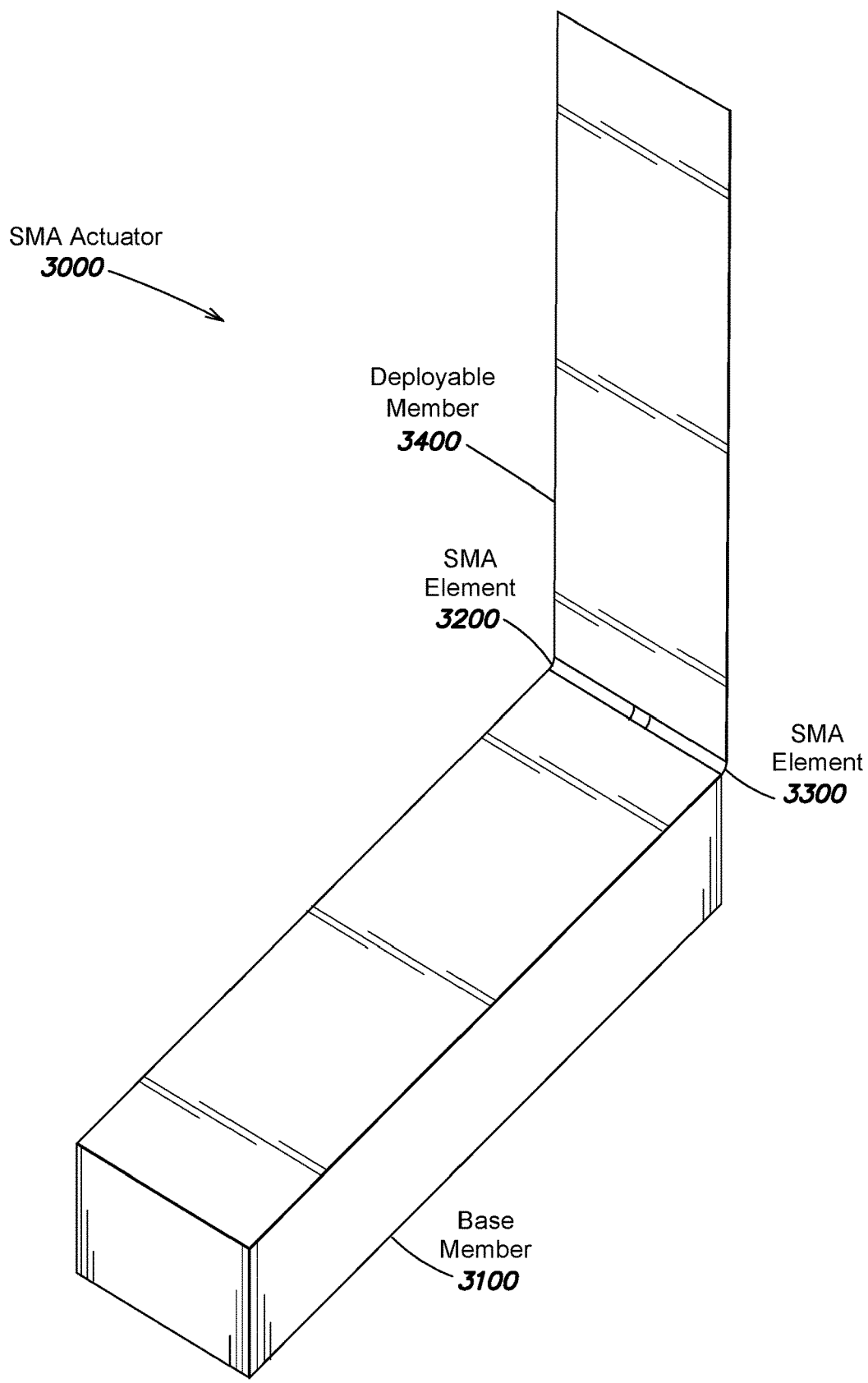
FIG. 9B shows the exemplary SMA actuator from FIG. 9A in an open state ($\theta=90°$).
Figure 9C:
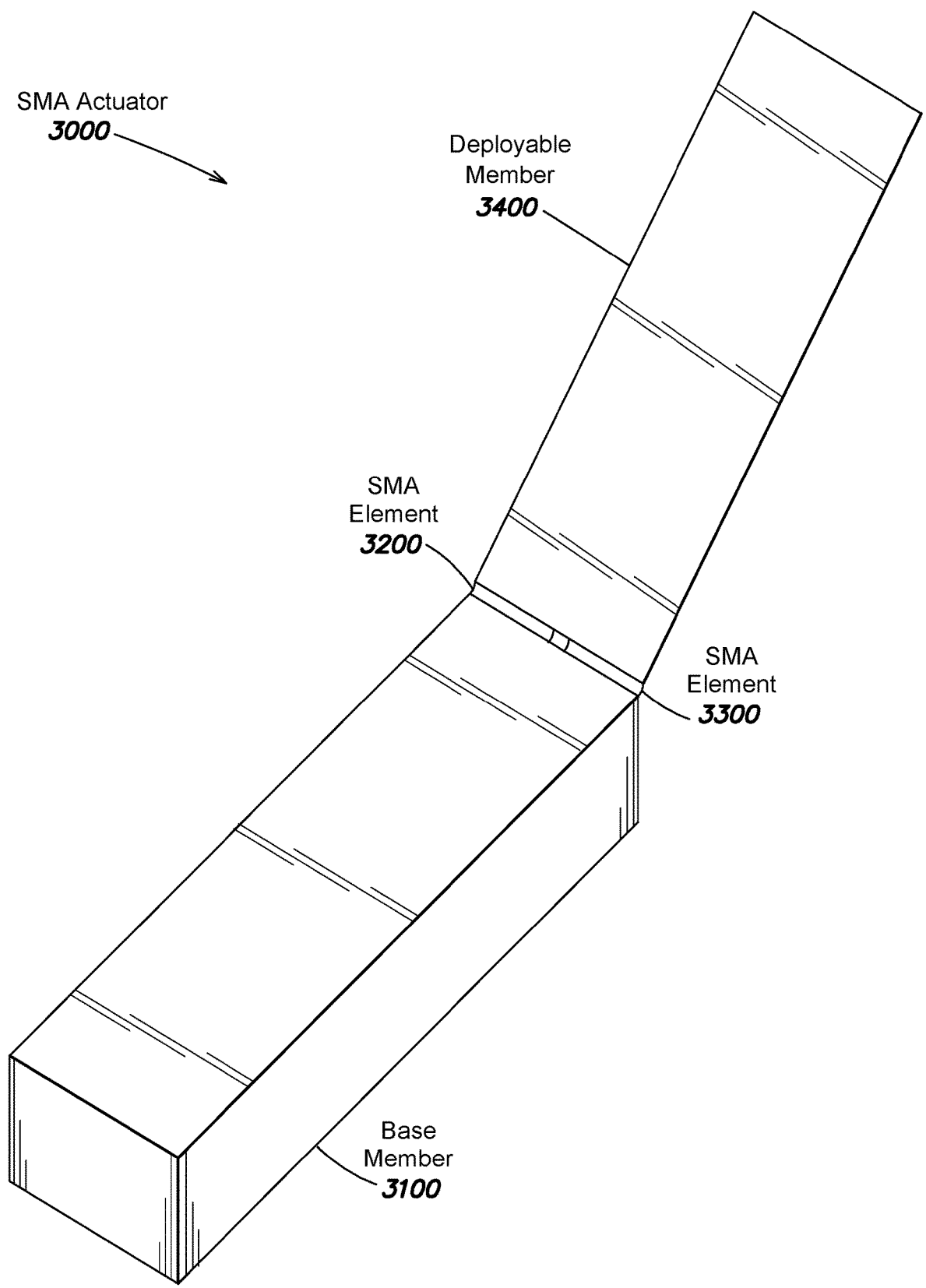
FIG. 9C shows the exemplary SMA actuator from FIG. 9A in a fully rotated state ($\theta>90°$).

FIGS. 9A-9C show an exemplary implementation of a SMA actuator 3000 at various angular positions including a closed state (θ=0°), an open state (θ=90°), and a further rotated state) (θ>90°). The SMA actuator 3000 includes a first SMA element 3200 and a second SMA element 3300. The SMA elements 3200 and 3300 can have respective memorized shapes where the first SMA element 3200 has a positive curvature and the second SMA element 3300 has a negative curvature. The closed state and the open state can represent the two angular positions effected by the SMA actuator 3000. The further rotated state can represent the largest angular position the deployable member 3400 can be rotated to and is intended to provide a margin to compensate for the potential limited free recovery of the SMA elements 3200 and 3300 when assembled in an antagonistic configuration.

FIGS. 10A-10D show an exemplary implementation of a SMA actuator 4000 that can couple to an end of a CubeSat system 4700. In particular, the SMA actuator 4000 includes a base member 4100 configured to fit to the end of the CubeSat system 4700. The base member 4100 can be coupled to a driver 4500 by a plurality of threaded fasteners. The driver 4500 can be a printed circuit board (PCB) with electronic components configured to supply and control voltage and current to one or more SMA actuators 4000. The base member 4000 can further include one or more coupling features 4120 to couple to a first SMA element 4200 and a second SMA element 4300 in one or more SMA actuators 4000. For example, the coupling features 4120 can be screw holes configured to support screw fasteners that couple the SMA elements 4200 and 4300.

The SMA elements 4200 and 4300 can also be coupled to a deployable member 4400 via one or more coupling features 4120. In this manner, the SMA elements 4200 and 4300 can be mechanically constrained at each end to the base member 4100 and the deployable member 4400 such that actuation is achieved by the deformation of each SMA element. One or more hinges 4600 can also be disposed between the base member 4100 and the deployable member 4400 to constrain the axes of motion of the deployable member 4400. For example, in FIG. 10A, the hinges 4600 can be configured to only allow the deployable member to substantially rotate along a particular axis. In this manner, the hinge 4600 can be used to reduce unwanted motion in the deployable member 4400, which can cause damage to the SMA actuator 4000.

Figure 10A:
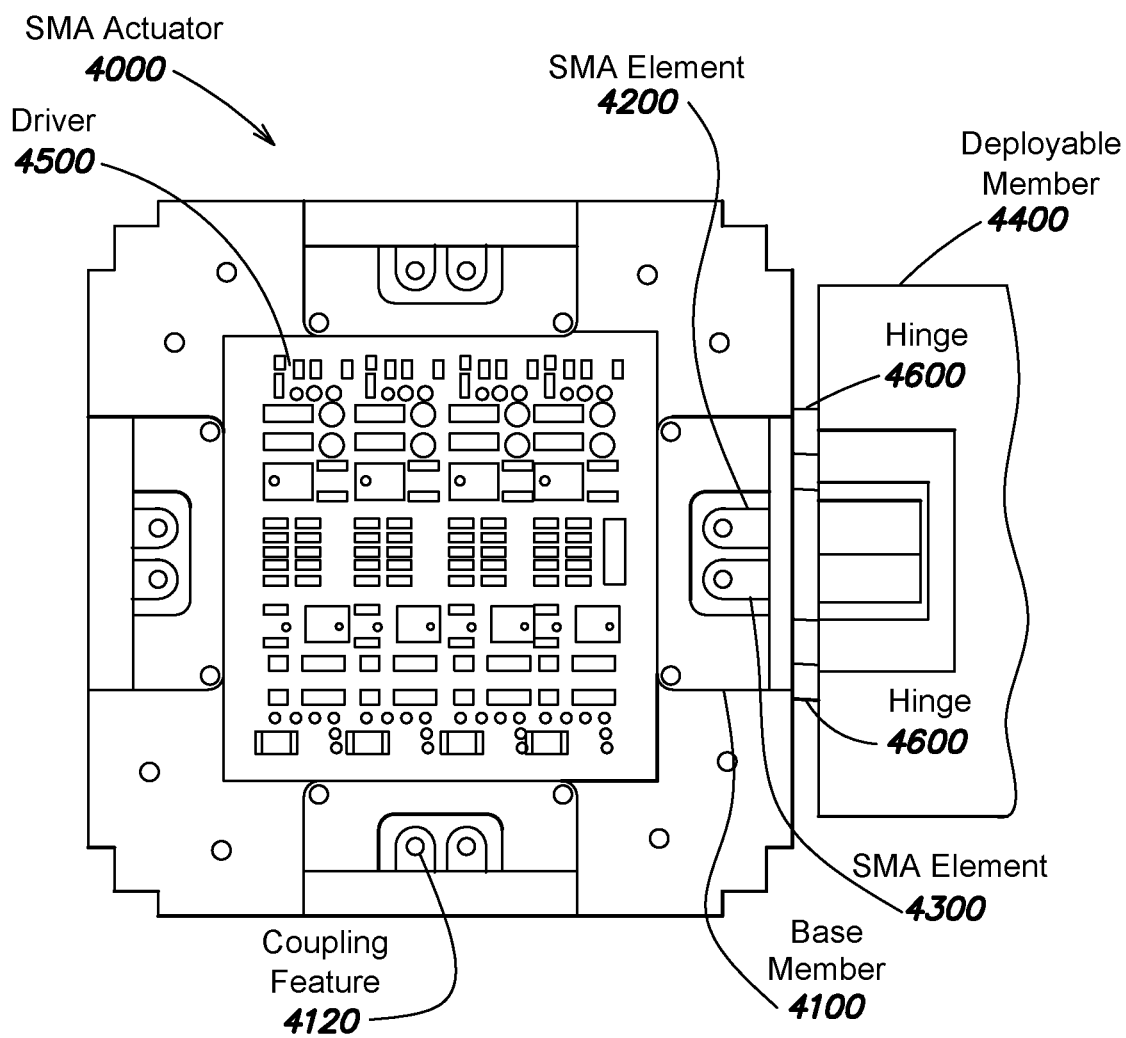
FIG. 10A shows the bottom view of a driver in an exemplary SMA actuator, according to an implementation.
Figure 10B:
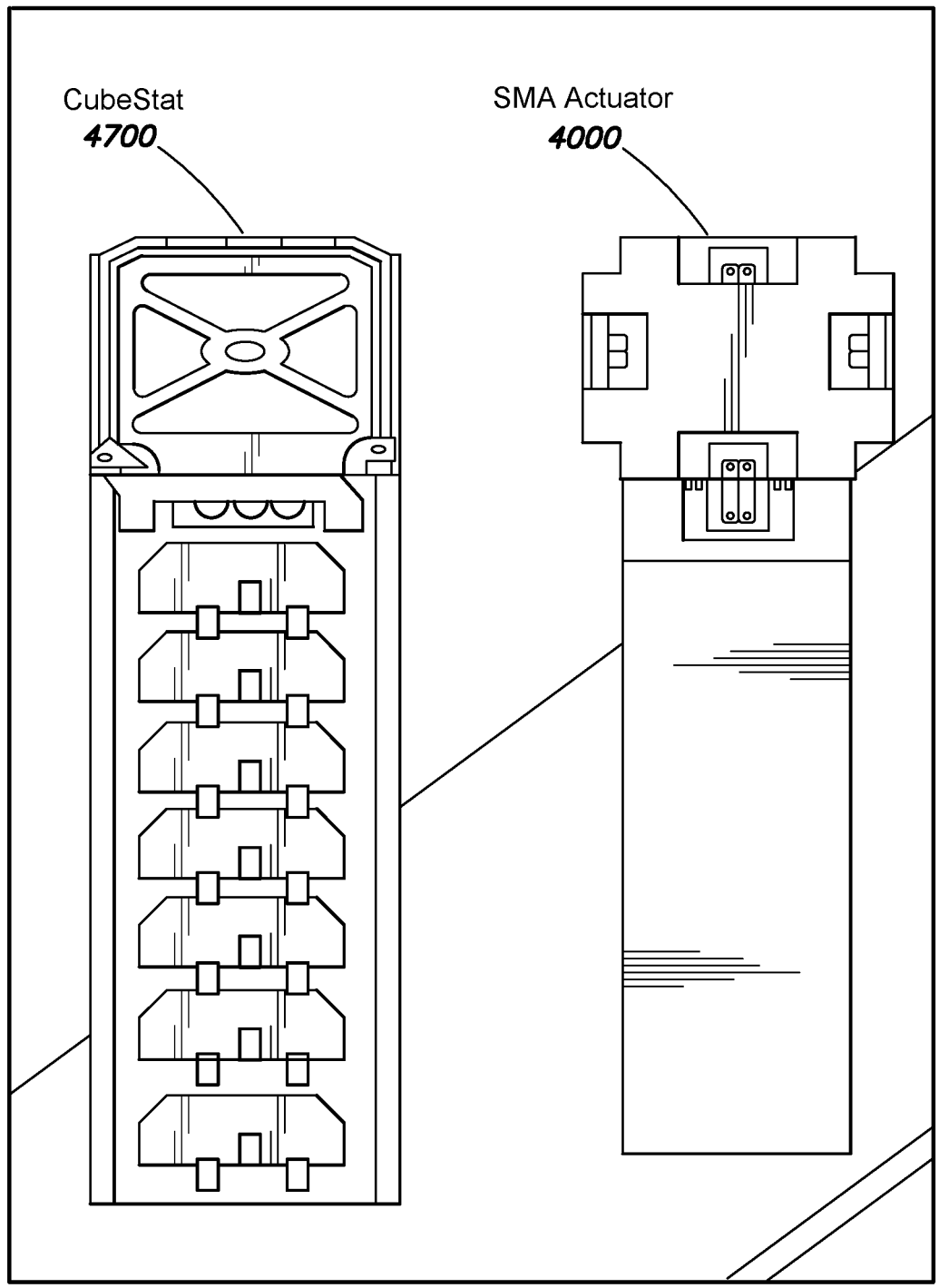
FIG. 10B shows the exemplary SMA actuator from FIG. 10A and an exemplary CubeSat main body configured to support the exemplary SMA actuator.
Figure 10C:
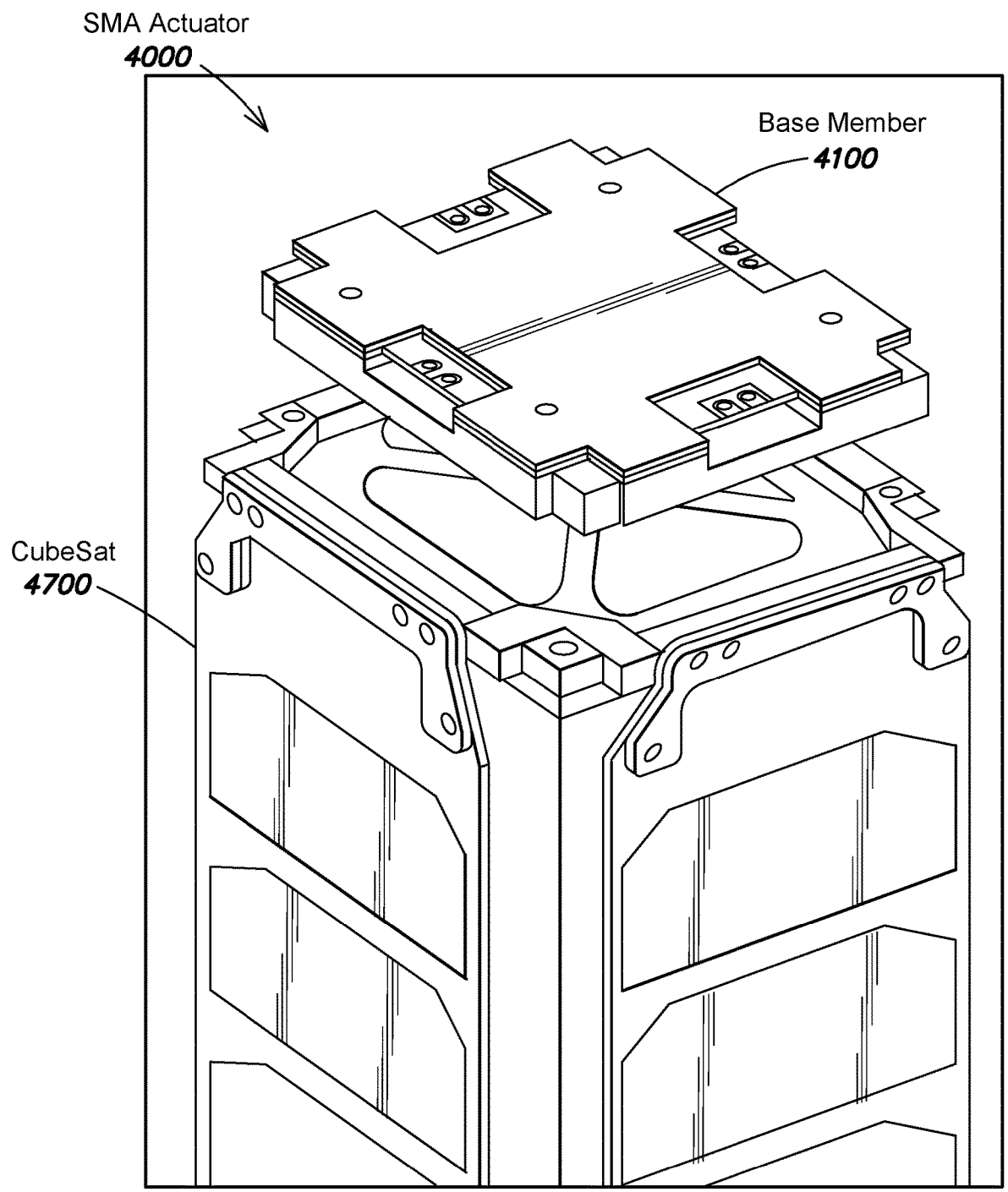
FIG. 10C shows the driver and base member of the exemplary SMA actuator from FIG. 10A placed above an end of the CubeSat main body for comparison.

FIG. 10B shows an exemplary CubeSat 4700 and the SMA actuator 4000, which is configured to couple to the end of the CubeSat 4700. As shown, the SMA actuator 4000 is dimensioned and shaped to provide a sufficiently small form factor that can meet the dimensional requirements of a typical CubeSat. FIG. 10C further shows the base member 4100, and the driver 4500 mounted therein, disposed above the end of the CubeSat 4700. As shown, the base member 4100 can conform to the shape and dimensions of the CubeSat 4700.

Figure 10D:
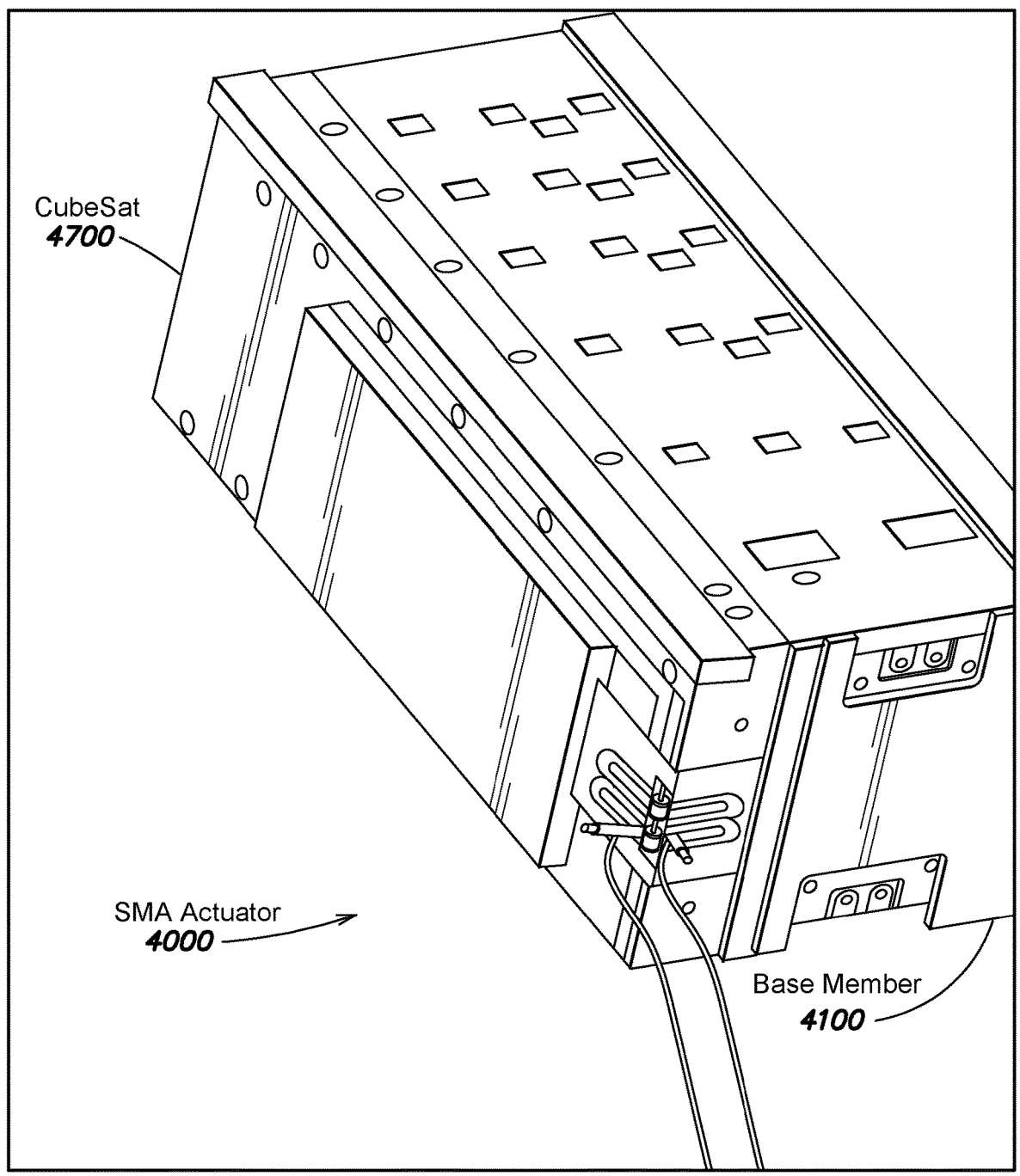
FIG. 10D shows the exemplary SMA actuator from FIG. 10A coupled to the CubeSat main body in a closed state.

FIG. 10D shows the SMA actuator 4000 coupled to the main body of the CubeSat 4700 in a closed state. The deployable member 4400 can also substantially conform to the sides of the CubeSat. To facilitate testing, separate electrical connectors can be coupled to the first SMA element 4200 and the second SMA element 4300 to supply voltage and current from an external electrical supply and measurement system, e.g., a current source, multimeter.

Technical Disclosure

An antagonistic architecture with 3D SMA transformations can be used as the actuator technology for the SMA hinge apparatus. These elements can create rotation through bending or torsion using geometries including, but not limited to, wires and sheets. The geometry of the SMA elements can be configured based on a desired range of motion, desired torque, and the applied loads. The geometry of the SMA elements can also affect how heating is applied for activation.

Figure 11A:
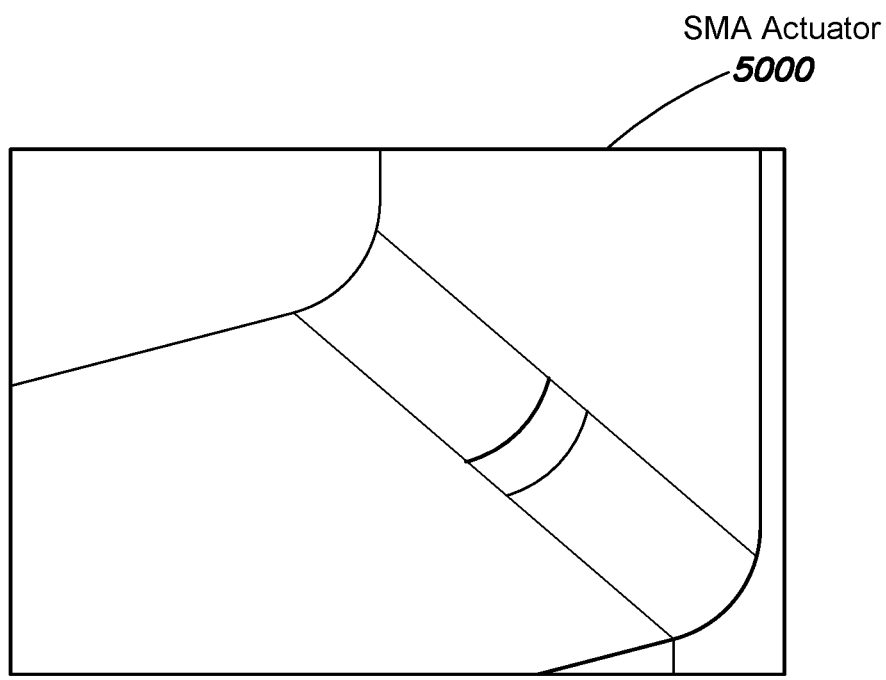
FIG. 11A shows an exemplary SMA rotary concept utilizing 3D transformations based on antagonistic bending.
Figure 11B:
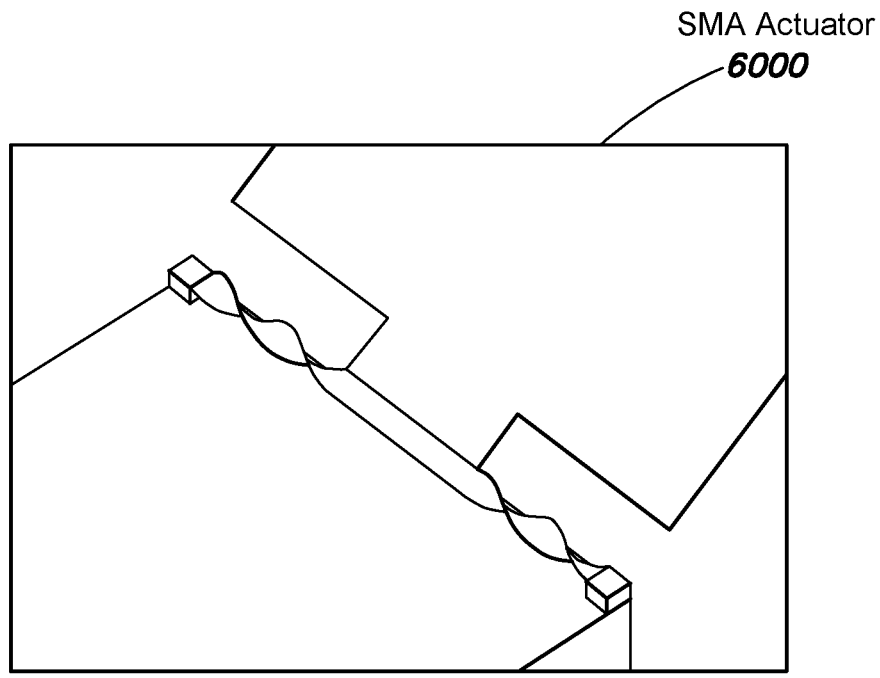
FIG. 11B shows an exemplary SMA rotary concept utilizing 3D transformations based on torsion.

An exemplary implementation of a SMA actuator 5000 based on beam bending and an exemplary implementation of a SMA actuator 6000 based on torsion are presented in FIGS. 11A and 11B, respectively. SMA actuators 5000 and 6000 can both provide rotational motion without bearings or support structures. The exemplary SMA actuators 5000 and 6000 shown in FIGS. 11A and 11B can both be used as an actuator with reduced mass, volume, and complexity for CubeSat system such as FLARE. A trade study is provided comparing the SMA actuators 5000 and 6000 to facilitate selection for prototyping. The risks and countermeasures of various design variables are discussed and first-order calculations evaluate the feasibility for both implementations to comply with the FLAPS specifications. Based on this trade study, an antagonistic bending architecture with rectangular SMA elements is selected for design, build, and testing.

Trade Studies

At least two design variables can be considered including the type of 3D transformation (i.e. bending or torsion) and the SMA element geometry. Various risks and countermeasures relevant to the function and design of actuators for CubeSats are presented in FIG. 12, which can be used to guide the trade study. The results of the trade study can have implications on the mechanism performance, heat up power, fatigue life, dynamic stability, and manufacturability.

Smaller elements benefit from reduced heat up power, but do not produce high torques and create dynamic instability for the host. However, they can achieve larger rotations with reduced strain and volume, leading to less mass and fatigue. Large torques may not be necessary given the microgravity environment. Furthermore, dynamic instabilities can, in theory, be compensated for by other systems on the satellite. To provide extra margin for robust control, the dimensions of the SMA element can be sufficiently large to satisfy the fatigue, size, weight, and power (SWaP), and performance requirements while being compatible with Joule heating.

In some implementations, Joule heating can be preferable in order to heat the element instantaneously over the entire volume. For this to occur, the cross-section of the element can be dimensioned to be sufficiently small such that Joule heating can cause the temperature of the SMA element to rise above the activation temperature. In the exemplary FLARE system described above, the current supply on a CubeSat is limited to 8 A; however, other satellite systems may provide greater electrical current. Otherwise, an external heater can be applied to the SMA element. However, the addition of an external heater can add mass and complexity. Further, the heater should be analyzed in bending or torsion with the SMA element.

The geometry of the SMA element can also be important. Cylindrical elements, such as wires and tubes, are readily available and can be better characterized for use in SMA actuators. However, they can be difficult to anneal, assemble, and mount without time-consuming machining techniques. Rectangular elements, such as sheets and flat wires, can offer simplified manufacturing, training, and assembly procedures. In addition, the width and thickness of flat elements can be varied to achieve the desired stiffness about the non-rotation axes. This can be especially advantageous in a bending architecture, since a thin and wide element will be compliant for bending along one axis of motion and stiff along other axes of motion. Therefore, flat SMA elements can offer reduced complexity over wires in a 3D transformation SMA actuator.

In regards to the type of 3D transformation, concept feasibility studies, which can take into account the element geometries and these two transformations, can be conducted to select the best architecture to prototype. The feasibility studies can also provide analysis on the SMA element geometry to evaluate whether Joule heating is practical.

Concept Feasibility Studies

The actuator can be designed to provide high torque for robust control, while still accommodating requirements relating to performance, SWaP, and lifetime. To make the actuator easier to operate, Joule heating is preferred over external heaters. Lastly, it is desirable to reduce manufacturing and assembling complexity. Based on these design considerations, the shape of the SMA elements, e.g., rectangular, cylindrical, and the architecture type, e.g., torsion, bending, can be compared.

Heating Method

Joule heating, which utilizes electrical current to heat the SMA element based on the electrical resistance of the SMA element, can be advantageous over external heaters. Heaters can add mass and complexity. Furthermore, heaters can affect the bending and torsion of the SMA elements if the heater is coupled directly to the SMA element. Joule heating is typically reserved for small cylindrical wires, which have high electrical resistance. For a flat SMA element, analysis can be performed to assess whether Joule heating is practical within the context of the FLARE system where electrical current is limited to 8 Amps.

For this analysis, various heat transfer mechanisms including conduction, radiation, and Joule heating, e.g. volumetric heat generation, can be considered. Convection is negligible in the vacuum of space. To compare the heat losses to the Joule heating power, an exemplary NiTi specimen is used. The specimen is a cylindrical wire with properties given in FIG. 13.

The thermal power, $\dot{Q}_J$, generated due to Joule heating is written as:

$$\dot{Q}_J = I^2 R \tag{1}$$

where I is the current and R is the electrical resistance. The electrical resistance of an element is denoted:

$$R = \frac{\rho_e L}{A} \tag{2}$$

where $\rho_e$ is the electrical resistivity of the material, L is the element's length in the direction of current flow, and A is the cross-sectional area of the element normal to the current flow. Based on FIG. 13 and Equations 2 and 1, the resistance of the element is 13 mΩ, thus the thermal power for Joule heating is 0.81 W.

The SMA element can be first heated from a starting temperature to the transformation temperature. The SMA transformation can then occur, which is an endothermic process with a latent heat of transformation. The energy required to raise the temperature of and transform the element can be compared against the rate of Joule heating to find the time t to activate the element:

$$t = \frac{m(c_p \Delta T + c_t)}{\dot{Q}_J} \tag{3}$$

where m is the mass of the SMA element, $c_p$ is the specific heat, $c_t$ is the latent heat of transformation, and $\Delta T$ is the difference between the SMA activation temperature and the SMA initial temperature, which is assumed to be the same temperature as the spacecraft.

Combining Equations 3 with 1 and 2, the activation time can also be written as:

$$t = \frac{\rho_d A L(c_p \Delta T + c_t)}{I^2 \frac{\rho_e L}{A}} \tag{4}$$

$$t = \frac{\rho_d A^2 (c_p \Delta T + c_t)}{I^2 \rho_e}$$

$$t = \frac{\rho_d}{\rho_e} U_a \frac{A^2}{I^2}$$

where $\rho_d$ is the material's density and $U_a$ is the minimum energy input to achieve activation. Equation 4 shows that high current and low cross-sectional area are the driving factors that can increase Joule heating and reduce activation time. For a given SMA material and current, in cases where heat losses are not considered, the activation time is related to only the cross-section of the material (e.g., activation type is independent of the length). Thus, theoretically, a 1 mm diameter wire should take the same time to activate as a 8×0.1 mm² flat sheet. Applying Equation 4, the activation time is 6.8 s.

So far, heat losses to the surrounding media have been neglected. However, these losses can be the same order of magnitude as the Joule heating since there is a large temperature difference between the SMA element's activation temperature and the temperature of the spacecraft and free space.

Assuming the element is lumped at its centroid and heat flows from the centroid to both ends, which is a lower limit for conduction, the conduction losses, $\dot{Q}_c$, are approximately:

$$\dot{Q}_c = 2\frac{kA(T_{SMA} - T_{sc})}{L/2} = \frac{4kA}{L}(T_{SMA} - T_{sc}) \qquad (5)$$

where k is the thermal conductivity of the material, $T_{SMA}$ is the activation temperature of the SMA element, and $T_{sc}$ is the temperature of the host spacecraft. The factor of 2 accounts for conduction towards both ends.

For radiation, a worst-case black body radiation can be assumed, which means the emissivity, ε, is equal to unity. Additionally, the low temperature of space is considered negligible and the SMA element is assumed to be able to radiate unobstructed to space, which is an upper limit. The radiation losses, $\dot{Q}_r$, can be written as:

$$\dot{Q}_r = \sigma_{sb}(PL)T_{SMA}^4 \qquad (6)$$

where $\sigma_{sb}$ is the Stephan-Boltzmann constant and P is the wetted perimeter, which is equal to the circumference of the wire.

Applying Equations 5 and 6, the conduction losses equal 0.31 W and the radiation losses equal 0.027 W. Radiation losses are an order of magnitude lower than those from conduction. If the SMA temperature is increased to 500 K, conduction losses increase 2.5× to 0.79 W while radiation losses grow 4× to 0.11 W.

The combined heat losses equal 0.34 W at the activation temperature of 350 K are less than the Joule heat input of 0.81 W, thus the temperature of the SMA element increases and activation can be achieved. If the current was lowered by half, then Joule heating would decrease 4× and the element would not be able to activate.

This feasibility study shows that, if the same material and current is used, the cross-sectional area has the greatest effect on whether the element can be activated by Joule heating. Based on these exemplary conditions, if the element's cross-sectional area is smaller than about 1 mm², Joule heating can provide sufficient heating for a rectangular element.

Bending Architecture

Beam theory can be used to calculate the recovery moment in a bending architecture. The SMA element can be assumed to be a rectangular beam with a thickness t, a width w, and a length L. The normal stress, σ, can be expressed as:

$$\sigma = \frac{My}{I} \qquad (7)$$

where M is the moment, y is the distance from the beam's neutral axis, and I is area moment of inertia about the neutral axis. Given the rectangular geometry, the area moment of inertia to bending is:

$$I = \frac{wt^3}{12} \qquad (8)$$

Equations 7 and 8 can be used to evaluate the moment generated if an internal recovery stress is applied within the element, such as in a bending SMA actuator during activation:

$$M = \frac{\sigma wt^3}{12y} \qquad (9)$$

When a beam is bent with a constant radius of curvature, the strain in the beam can be a function of the distance from the neutral axis:

$$\varepsilon = \frac{y}{r} \qquad (10)$$

where ε is the strain and r is the radius of curvature. For a flat sheet, the neutral axis is located in the middle, so the maximum value for y is half the thickness of the sheet, or t/2. The strain can be related to the stress using Young's formula:

$$\sigma = E\varepsilon \qquad (11)$$

where E is the elastic modulus of the material. Combining Equation 9 with 10 and 11, the recovery moment can be written as:

$$M = \frac{Ewt^3}{12r} \qquad (12)$$

Equation 12 is compared against the bending rotary actuator developed by Zhakypov et al. The NiTi sheet used had a thickness of 0.1 mm, width of 8 mm, and curvature radius of 1 mm. Using the same 34.1 GPa elastic modulus for the austenite phase, the recovery bending moment is calculated using Equation 56 to be 22.7 mNm, which is the same order of magnitude as the reported value of 34.1 mNm. The discrepancy in the two values may be due to the uncertainty in the material's austenite elastic modulus and error in the radius of curvature due to elastic spring-back after annealing. Applying Equation 10 to Zhakypov et al.'s actuator, the working strain is found to have a maximum value of 5%.

For an antagonistic architecture, Equation 12 can be used to create a simplified expression which approximates the total output moment. The moment is assumed to be the difference in bending moments of the austenite active element and passive martensite partner:

$$M_{antag,rect} = \frac{E_{aust}wt^3}{12r} - \frac{E_{mart}wt^3}{12r} \qquad (13)$$

$$M_{antag,rect} = \frac{(E_a - E_m)wt^3}{12r}$$

Similar equation relationships hold for cylinders if the bending area inertia for a circular cross-section is included in Equation 9 instead of Equation 8:

$$M_{antag,cyl} = \frac{(E_a - E_m)\pi D^4}{64r} \qquad (14)$$

Torsion Architecture

The torsion architecture features two collinear, antagonistic SMA elements that are twisted to induce rotation. The maximum shear stress, τ, produced by torsion of a cylindrical beam:

$$\tau = G\vartheta r \quad (15)$$

where G is the shear modulus of the material, $\vartheta$ is the degree twist per unit length (in radians), and r is the radial distance from the neutral axis. Maximum shear stress occurs when r is equal to the largest radius R. The shear modulus can be related to the elastic modulus:

$$G = \frac{E}{2(1+v)} \quad (16)$$

where v is Poisson's ratio, which is 0.33 for NiTi.

The shear strain, γ, is related to the shear stress via the shear modulus of the material, similar to Young's formula:

$$\gamma = \frac{\tau}{G} = \vartheta r \quad (17)$$

The torque, T, is related to the shear stress by:

$$T = \frac{\tau J}{r} \quad (18)$$

where J is the polar moment of inertia for a cylindrical element with diameter D and equal to:

$$J = \frac{\pi D^4}{32} \quad (19)$$

Combining Equations 15 and 18, then substituting Equations 16 and 19, the torque produced by a twisted, cylindrical element is:

$$T = G\vartheta J = \frac{E}{2(1+v)}\vartheta \frac{\pi D^4}{32} \quad (20)$$

$$T = \frac{E\vartheta \pi D^4}{64(1+v)}$$

Equation 20 can be compared with the results for the torsion SMA actuator by Koh et al. A 0.2 mm diameter cylindrical SMA wire was used with a length of 12 mm and twisted by 360°, so $\vartheta$ was equal to 0.52 rad/mm. Although the austenite elastic modulus of the material was not published, it can be assumed to be similar to that from Zhakypov et al. (34.1 GPa). Using Equation 20, the resultant torque is calculated to be 1.1 mNm, which is very similar to the maximum prediction of 1.2 mNm given by Koh et al., who used a more complicated model. Again, discrepancies can be caused by uncertainty in the elastic modulus of the material.

The recovery torque can then be predicted if sheets are twisted instead of cylinders. For narrow rectangular beams, the effective polar moment of inertia, $J_e$, can be approximately written as:

$$J_e = \frac{1}{3}wt^3 \quad (21)$$

The ⅓ coefficient can be an upper limit, which decreases as the beam becomes less narrow. Substituting the effective polar moment of inertia into Equation 20, the torque is:

$$T = G\vartheta J_e = \frac{E\vartheta wt^3}{6(1+v)} \quad (22)$$

Again, a simplified model can be used similar to Equation 13 to find the torque in a twisted antagonistic architecture:

$$T_{antag,rect} = \frac{(E_a - E_m)\vartheta wt^3}{6(1+v)} \quad (23)$$

and for a cylinder:

$$T_{antag,rect} = \frac{(E_a - E_m)\vartheta wt^3}{6(1+v)} \quad (24)$$

Concept Selection

The concept feasibility studies analyze Joule heating with respect to the element geometry. It is determined that for the same material and input current, Joule heating can be driven by the cross-sectional area. If two elements of different geometry and length have the same cross-sectional area, then the time to activate the elements can be approximately the same. In terms of Joule heating, a 1 mm diameter wire is equivalent to a 8×0.1 mm² flat sheet.

The recovery moments and torques for the rectangular and cylindrical geometries is derived in concept feasibility studies:

$$M_{antag,rect} = \frac{(E_a - E_m)wt^3}{12r} \quad (25)$$

$$M_{antag,cyl} = \frac{(E_a - E_m)\pi D^4}{64r}$$

$$T_{antag,rect} = \frac{(E_a - E_m)\vartheta wt^3}{6(1+v)}$$

$$T_{antag,cyl} = \frac{(E_a - E_m)\vartheta \pi D^4}{64(1+v)}$$

where M is the antagonistic recovery moment for a bending architecture and T is the antagonistic recovery torque for a torsion architecture. The elastic modulus E and the Poisson's ratio v are material properties. The width w, thickness t, and diameter D describe the element geometry. The radius of curvature r and twists per unit length, $\vartheta$ describe the strain in the bending and torsion architectures, respectively.

The bending and torsion performance of a 1 mm diameter wire is compared to that of a 8×0.1 mm flat sheet in FIG. 14. The normal and shear strains can be limited to 2%, which sets a lower value for the radius of curvature r and maximum angular twist per unit length, $\vartheta$, respectively. The Poisson's ratio is 0.33 and the difference in elastic moduli is taken to be 15,100 MPa as in Zhakypov et al.'s actuator.

The results show that a rectangular element can be well suited for bending while a cylindrical element can perform best in torsion, since the outside fibers generate the most moment in bending, but these outside fibers are not present in the corners of a cylindrical element. Furthermore, when a cylindrical element is twisted, all points on the outside diameter experience the same shears stress. However, the distance from the edge to the center of a rectangular element (w/2) can be much larger than the radius of the cylindrical element, limiting the shear strain that can be induced. Although it appears the cylindrical element produces a larger moment in bending, the rectangular element can produce over 50 mNm if a 1 mm thick sheet with a radius curvature of 25 mm is used (2% strain).

FIG. 15 summarizes the results from the trade studies. Joule heating can be applied to both elements because they have the same cross-sectional area. Rectangular elements can perform best in bending and provide a large range of motion since they can be stored in a compact radius of curvature. In contrast, cylindrical elements in a torsion architecture can produce more torque. In terms of prototyping, cylindrical objects can be more difficult to anneal and assemble than rectangular ones. Cylinders can have the same stiffness in all radial directions, while rectangular elements can be tailored to produce compliance in the desired direction. Since the output torque is secondary to considerations such as range of motion, fatigue, and stowage height, a rectangular bending architecture is chosen as the preferred concept for the exemplary FLAPS.

Modeling

A design of an SMA element is now presented that can rotate a deployable structure by approximately $\pi/2$ radians while adhering to various CubeSat standards and with reduced effect on the host satellite. First, the thermomechanical behavior of the alloy is examined to understand the transformation process. The element can be sized for the space environment using a kinematic model, which describes how the SMA elements will move, and a thermal model, which describes how the SMA element actuates. Performance, geometry, and fatigue life determine the maximum thickness, Joule heating determines the allowable cross-section, and the thermal environment resolves the length of the element. Considerations for operating in space on a CubeSat are also discussed.

SMA Thermomechanical Behavior

The thermomechanical constitutive model can describe the stress of the SMA element in terms of its strain, temperature, and stage of transformation. The transformation itself is a function of the stress and temperature, which creates an implicit relation for the material stress. This model is based off of work taking place over a decade by Tanaka, Rogers, Liang, Brinson, and Huang.

The stress, $\sigma$, in a typical metal and in a SMA is described by:

METAL:

$$\sigma_{metal} = E\varepsilon = \sigma(\varepsilon)$$

SMA:

$$\sigma_{SMA} = E_{SMA}(\xi)\varepsilon_{SMA}(\xi_s) = \sigma(\varepsilon, \xi, T)$$

$$\xi = \xi(\sigma, T) = \xi_s(\sigma) + \xi_T(T)$$

$$\sigma_{SMA} = (\xi E_m + (1-\xi)E_a)(\varepsilon - \varepsilon_L \xi_s) \quad (26)$$

where $\varepsilon$ is strain, T is temperature, and the martensite fraction $\xi$ describes the stage of transformation, which is calculated from an empirical cosine model by Liang and Rogers. $\xi$ has two components: (1) the temperature-dependent martensite fraction $\xi_T$ that decreases as the element is heated above $A_s$, and (2) the stress-dependent fraction $\xi_s$ that increases due to loading about the critical stress $\sigma_s^{cr}$. The total martensite fraction $\xi$ is the sum of these two components and is equal to unity when the material is completely martensitic. The elastic modulii, $E_m$ and $E_a$, are material properties along with the maximum recoverable strain, $\varepsilon_L$.

For the SMA hinge apparatus prototype, the material can be heated above the activation temperature $A_f$ for a substantially complete austenite transformation. Likewise, the passive element can be kept below $M_f$ to ensure it is substantially martensitic. Therefore, a detailed analysis of the transformation process to determine $\xi$ during actuation is unnecessary. For the simplified bending model used to determine the moment generated from the SMA transformation, the active element can be considered to have an elastic modulus of $E_a$, and the passive element $E_m$.

The thermomechanical model can also provide insight into how the SMA element generates moments. As the material is heated, the austenite, which can have a higher stiffness, attempts to recover its memorized shape and generates a moment. As long as the elevated temperature is sustained, this difference in stiffness can drive the mechanism. If the heating is removed, the austenite transforms back to martensite, halting the mechanism. Theoretically, the mechanism can generate an infinitesimally small torques through command techniques such as pulse width modulation (PWM).

Kinematic and thermal models can be used to determine the geometry of the SMA elements. First, the motion profile of the SMA element during activation can determine the element's strain and annealing diameter using a predetermined thickness of 0.1 mm. Next, steady state thermal analyses can be conducted to determine the allowable cross-section for Joule heating. Finally, transient thermal analyses can be used to determine the length, activation time, and energy consumption of the proposed mechanism.

Kinematic Profile

Figure 16:
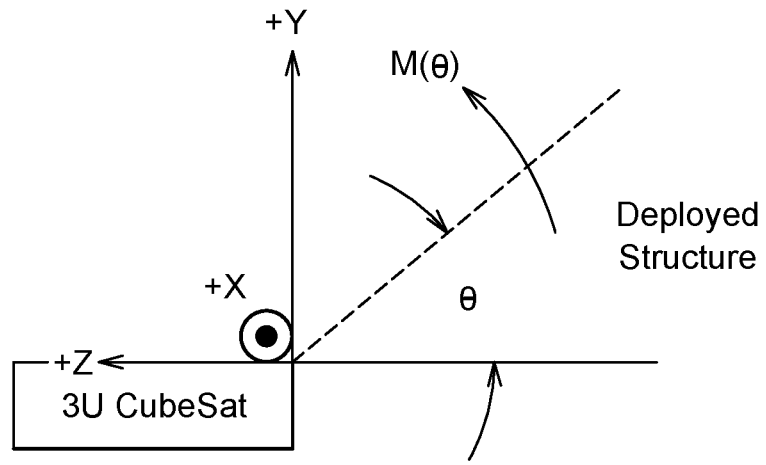
FIG. 16 shows an exemplary CubeSat-SMA actuator coordinate system to facilitate analysis.

A kinematic model can predict the motion profile of the SMA actuator without considering speed and acceleration. For this exemplary model, it is assumed that the SMA elements are in pure bending throughout their actuation and rotation is considered only for $\theta=0$ to $\sigma=\pi/2$ radians. The CubeSat-mechanism coordinate system is shown in FIG. 16. The actuation angle, $\theta$, has a value of 0 in the closed low-drag configuration and a value of $\pi/2$ in the open high-drag configuration. The CubeSat walls constrain FLAPS to operate between $\pi$ and $-\pi/2$ in this reference frame.

Figure 17:
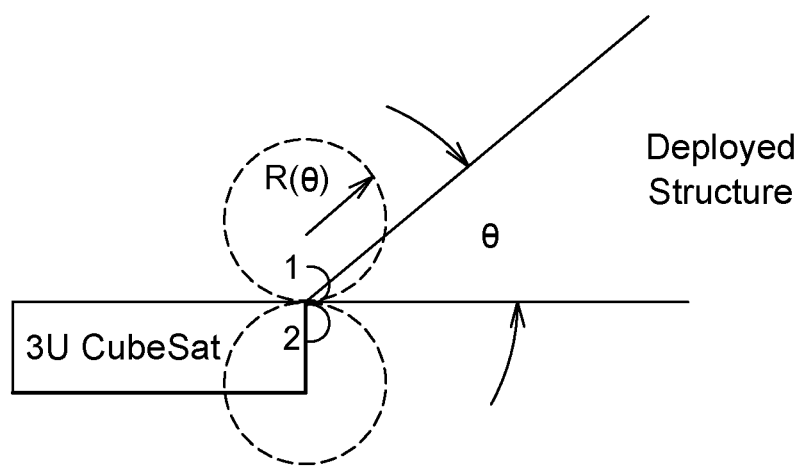
FIG. 17 shows the proposed SMA-deployable structure configuration for the exemplary SMA hinge apparatus.

A proposed configuration for an SMA hinge apparatus according to one implementation is shown in FIG. 17. Although FIG. 17 shows different motion profiles for each of the annealed SMA elements, they can have concentric profiles once they are yielded post-annealing and then integrated with the deployable structure. The annealed positions can be outside the preferred motion range such that the additional rotational margin acts as a buffer for each SMA element since free recovery can be limited in an antagonistic architecture. An additional $\pi/2$ of rotational margin per SMA element was included.

FIG. 17 illustrates two important properties of an SMA actuator in pure bending: (1) The shape of the actuator can be of a circular profile, and (2) the center of rotation can move along the y-axis because one end of the SMA element is fixed to the CubeSat. The radius of curvature is a function of the actuation angle and can be represented as R(θ). The radius decreases as the angle increases, reaching a lower value when the actuator is in its curled annealed shape (θ=π), and reaching an upper value of ∞ when the actuator becomes straight (θ=0).

Figure 18:
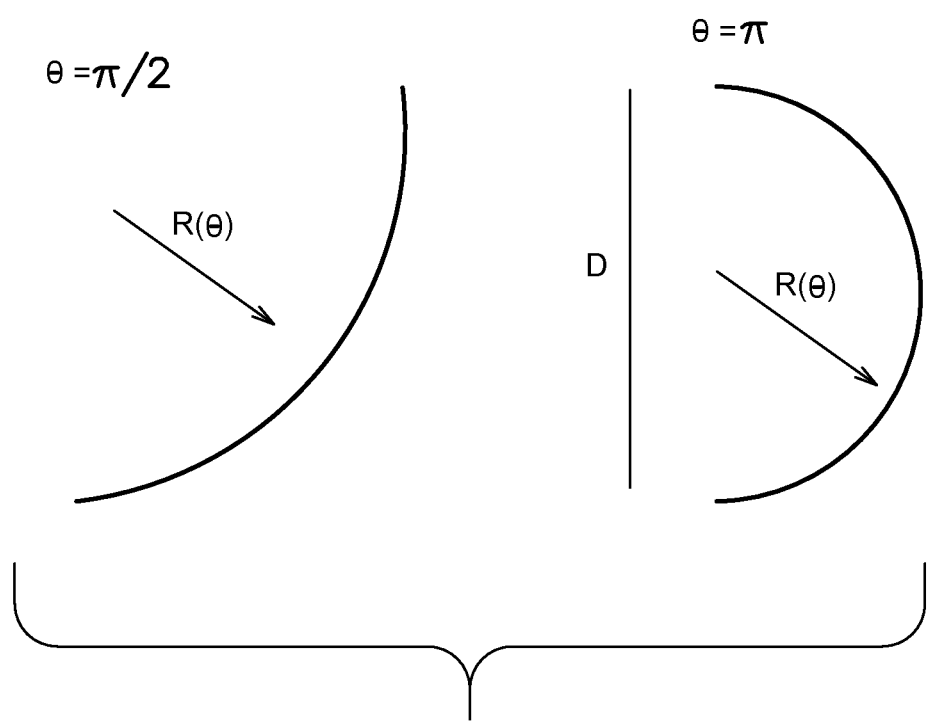
FIG. 18 shows the SMA element in an actuated position ($\theta=\pi/2$) and an annealed position ($\theta=\pi$).

FIG. 18 shows an exemplary SMA element in its actuated and annealed positions. The annealing π position is used for derivation and is not an actual state incorporated in the kinematic model. To derive a relationship for R(θ) and determine the motion profile under these exemplary conditions, a constraint can be applied where the neutral axis cannot elongate or compress during pure bending. The length of the SMA element, L, can be related to half the circumference of the initial annealing circle:

$$L = \frac{\pi D}{2} = \text{constant} \tag{27}$$

where D is the annealing diameter of the SMA element as shown in FIG. 18.

Using algebraic relations, the radius of curvature R(θ) is equal to D/2 when in the π position, equal to D when in the π/2 position, and equal to ∞ when in the 0 position. Utilizing these conditions and considering the inverse relationship between θ and R(θ), the radius of curvature as a function of actuation angle can be determined:

$$R(\theta) = \frac{\pi}{2} \frac{D}{\theta} \tag{28}$$

where θ is in radians.

Figure 19:
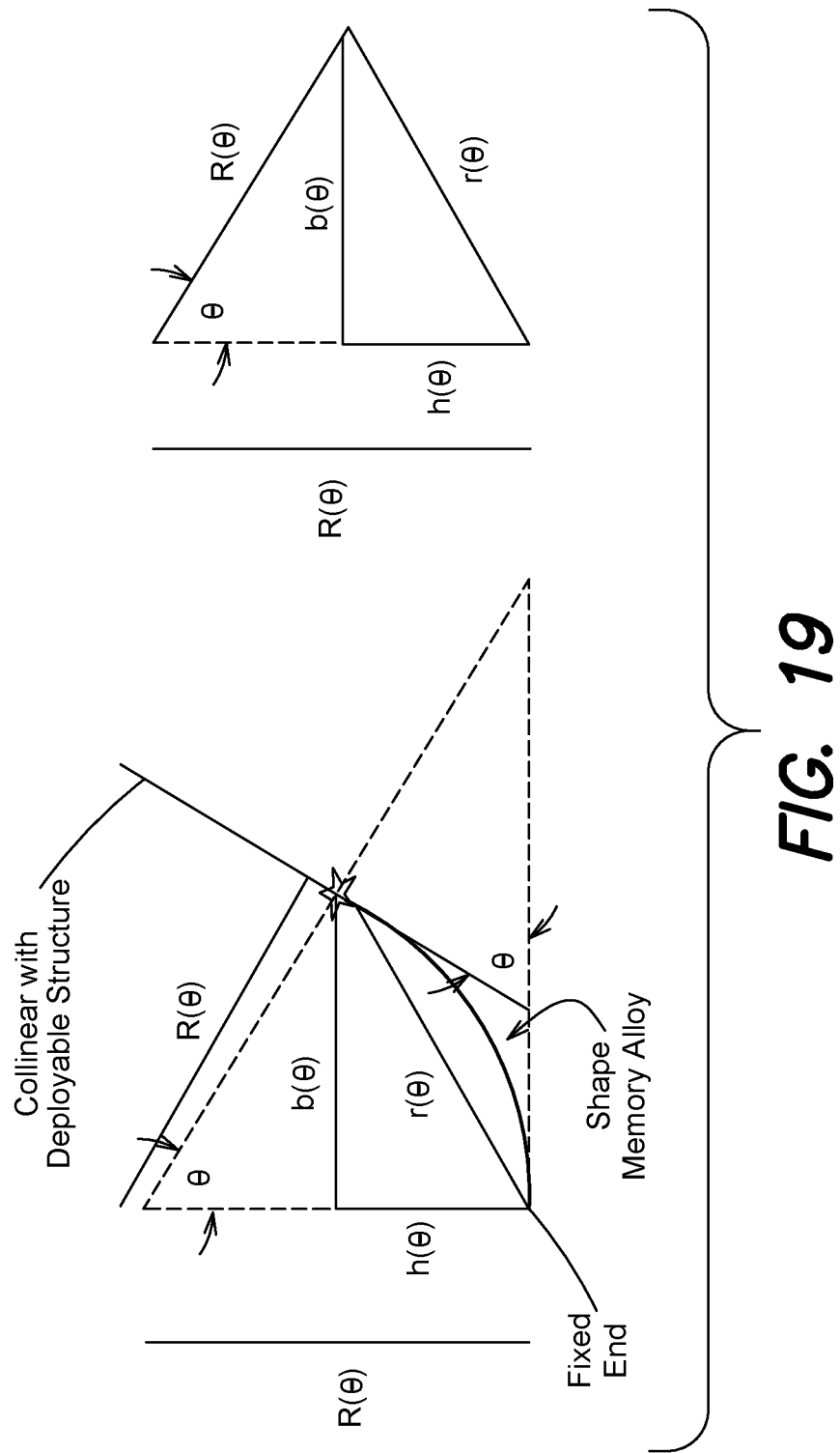
FIG. 19 shows an illustration of a geometric model used to derive the position of the SMA actuator free end relative to the fixed CubeSat for $\theta$ ranging from 0 to $\pi/2$.

A geometric model can relate the free end of the SMA element, which is integrated with the deployable structure, to the fixed SMA-CubeSat interface. FIG. 19 provides an illustration to facilitate the derivation of the free end position as a function of θ under these exemplary conditions. After applying the symmetry of angles and using trigonometric relations, the position of the free can be determined:

$b(\theta)=R(\theta)\sin\theta$ $h(\theta)=R(\theta)[1-\cos\theta]$ $r^2(\theta)=b^2(\theta)+h^2(\theta)$ $r^2(\theta)=R^2(\theta)\sin^2\theta+R^2(\theta)[1-\cos\theta]^2$ $r^2(\theta)=R^2(\theta)(\sin^2\theta+1-2\cos\theta+\cos^2\theta)$ $r(\theta)=R(\theta)\sqrt{\sin^2\theta+\cos^2\theta+1-2\cos\theta}$ $r(\theta)=R(\theta)\sqrt{2-2\cos\theta} \tag{29}$ where r(θ) is the distance from the one end of the SMA element to the other. It also defines the distance from the edge of the CubeSat to the deployable structure.

Figure 20:
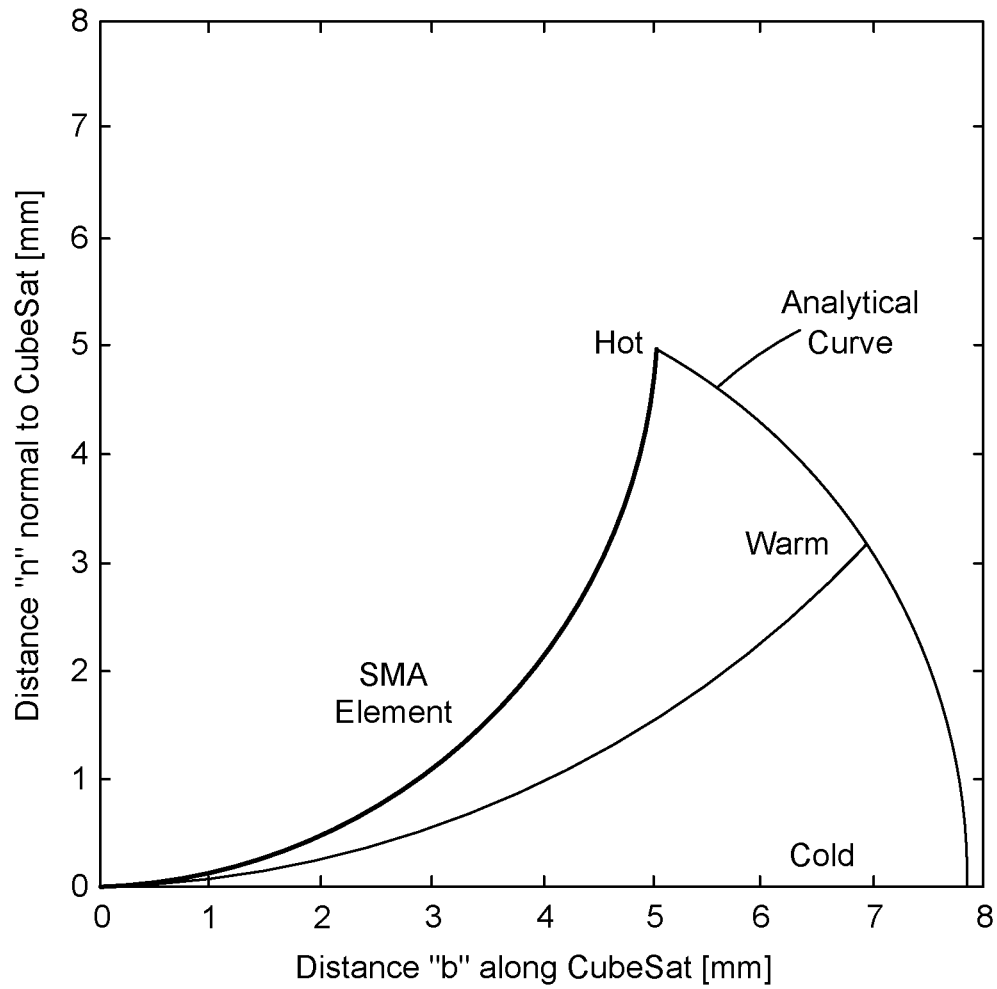
FIG. 20 shows the predicted kinematic motion profile of the free end of the SMA actuator at various temperatures.

To verify the geometric model provides the correct trajectory, the position of the SMA element's free end is plotted parametrically in FIG. 20 with h(θ) as the vertical axis and b(θ) as the horizontal axis. FIG. 20 shows an excellent correlation with the expected arc of motion, providing confidence in the geometric model. FIG. 20 also shows that the free end of the actuator does not trace a circle under these conditions. Thus, tangential and radial components of the acceleration and reaction force appear in the polar coordinate system. The angular position θ can be used to translate between the Cartesian and polar coordinate systems.

Recall from curved beam theory that the strain in a bent material is related to its distance from the neutral axis and the radius of curvature. In a pure bending case, this means that the strain at any point in the material can be related to R(θ):

$$\varepsilon = \frac{y}{R(\theta)} \tag{30}$$

$$\varepsilon(\theta) = \theta \frac{2y}{\pi D}$$

where ε is the strain, y is the distance from the neutral axis and has a minimum value of 0 and a maximum value of t/2, and D is a constant set by annealing.

Thickness and Fatigue Life

Each SMA element should preferably have a fatigue life of at least 2,200 activation cycles, which determines the working strain. The strain can be determined from Equation 30 where the largest strain under these conditions can be set during annealing in the π position. During operation in space, the range of motion can be limited to θ=π/2, meaning the actual strain experienced on-orbit is half of that when the element is being annealed.

The number of cycles that the material can sustain can be inversely related to the strain it experiences. The allowable strain can be 8% for a single cycle, 6% for 100 cycles, and 4% for 100,000 cycles. A safety factor can be incorporated into the allowable strain such that the largest strain in the element during annealing can be limited to 6%, so that the strain can be 3% during actual operation. This can guarantee a lifetime of at least 100,000 cycles.

Using Equation 30 for an exemplary element with a thickness of 0.1 mm, the annealing diameter D should be greater than 1.7 mm. The diameter D is conservatively chosen to be 4.5 mm to provide an additional margin for the fatigue life. A diameter of 4.5 mm yields 2.2% strain during annealing, and 1.1% when in the π/2 position. These conditions can ensure a long mechanism lifetime even when considering integration, testing, and operation.

Steady State Thermal Analyses

Figure 21:
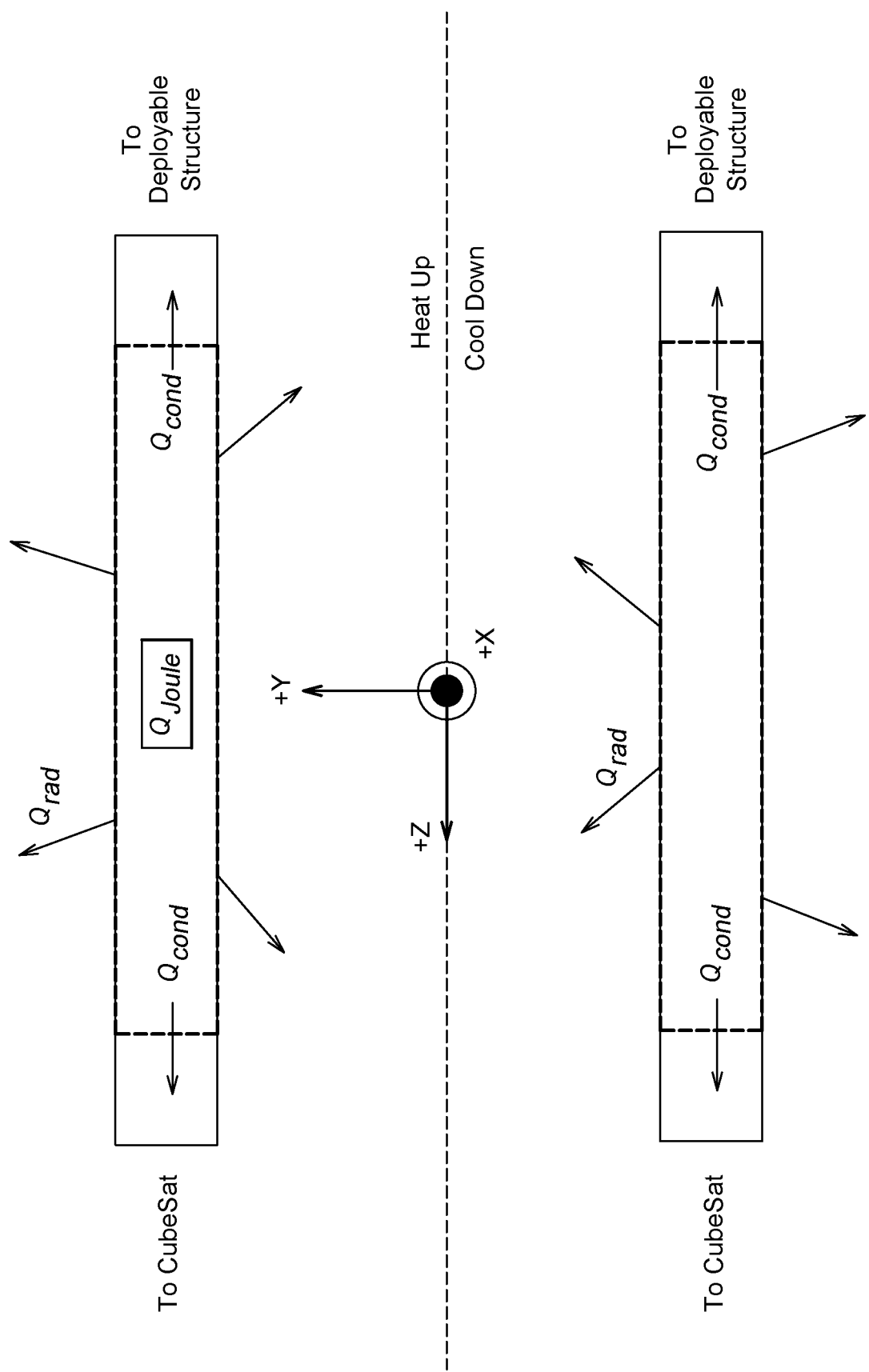
FIG. 21 shows thermal diagrams of the heat flow during the heat up and the cool down processes.

Heat transfer and thermodynamics govern the temperature of the SMA element during activation and cool down, which are shown in FIG. 21. For exemplary SMA hinge apparatus, it is assumed that the elements can be activated one at a time, where only the active element has an elevated temperature. The antagonistic partner, which can also be attached to the CubeSat and deployable structure, but located far away from the active element, can be deformed at a constant temperature when substantially martensitic. The temperature of the SMA's two heat sinks, the spacecraft, and deployable panel, can be below the $M_f$ temperature to ensure the martensite transformation is substantially complete. After activation, the austenitic element can be cooled passively to martensite to prepare it for re-use.

A thermal model can be developed, which describes the temperature of the active SMA element along three dimensions, T(x,y,z,t), during heat up and cool down. The system can be first simplified through many justified assumptions and an approximate solution can be proposed. An estimate for the heat up time can allow determination of the necessary input energy to activate the mechanism, while the cool down time can provide the operation frequency. In this manner, only two thermal profiles needs to be analyzed: 1) initial heat up for full austenite transformation, and 2) subsequent passive cool down to martensite. The thermal expansion of the material can be neglected for this exemplary model, but can be included when sizing the fasteners for use in an engineering model.

Thermophysical Properties

As the material transforms from martensite to austenite, its crystallography can change, which alters how the atoms interact. For nickel-titanium, also referred herein as nitinol, this transformation to austenite at elevated temperature can result in an increase of both thermal conductivity and electrical resistivity. Since k and $\rho_e$ change with the transformation, these parameters can generally be functions of the martensite fraction $\xi$. For simplicity, the thermophysical properties can be assumed to be constant, limiting values for all operating conditions; however, more generally, thermophysical properties can be modeled to include various dependencies, e.g., temperature dependency.

The property data for nitinol can be sourced from various literature sources. However, properties such as activation temperature, elastic modulus, and yield strength can be highly dependent on the alloy. These properties can be unique to the material composition and annealing process. Thus, these properties can only be determined by thermo-mechanically testing the exact specimen. Other thermo-physical properties can be assumed to be approximately constant for most nitinol alloys, which are listed in FIG. 22.

The nitinol emissivity can be approximated as an upper limit based on both nickel and titanium emissivities. The nitinol emissivity can be altered by specialized coatings. When the SMA element is heated to a sufficiently high temperature, e.g., the annealing temperature, the shape memory effect can be diminished; hence, operation of the SMA actuator can be limited to this temperature to maintain functionality. For example, once the SMA element is initially trained to remember a memorized shape, the temperature of the SMA element should not reach the annealing temperature during operation thereafter. The spacecraft and deployable structure can be assumed to be substantially isothermal at the same temperature. A 10° C. margin can be added to compensate deviations from this assumption.

The upper and lower values for the thermophysical properties can be used to create limits for the activation and cool down times. For example, both the thermal conductivity k and the electrical resistivity $\rho_e$ can be functions of the transformation process. For an upper estimate of the activation time, the highest thermal conductivity measured can be used to increase heat conduction losses and the lowest electrical resistivity measured can be used to reduce Joule heating. The cool down time can be approximated by the period of lowest heat transfer during transformation, which typically occurs when the SMA element is cooled near its martensite transformation range. During this period, heat from the SMA element is at least used for the latent heat of transformation to change the SMA element from a substantially austenite phase to a substantially martensite phase. In this manner, the thermal conductivity of the SMA element can be approximated to be the martensite thermal conductivity for estimation of the cool down time. Although cool down begins when the SMA element is in the austenite phase, the period is typically short such that the thermal conductivity of the SMA element does not need to include the austenite thermal conductivity. Therefore, the martensite thermal conductivity can be used to create an upper limit for the cool down time.

FIG. 23 shows the thermophysical properties used to estimate the heat up and cool down cases in this model. A lower estimate of the activation time can be provided by an idealized lumped capacity model. The activation and reset times can be determined by solving the heat equation for these cases. The transient solutions can be used as an upper limit, thus performance in a space environment should yield better results.

The material transformations and the energy exchange used to sustain the transformations, can occur simultaneously as the temperature changes from a starting temperature to a final temperature. To account for these different phases, an effective specific heat, $c_e$, can be used for the transformation. The effective specific heat can be incorporated into the heat equation as a parameter expressed as a function of temperature, e.g., $c_e(T)$, because the latent heat of transformation is only applied during the activation temperature range.

A constant denoted $c_a$ can be used to describe the endothermic austenitic transformation and on can be used for the exothermic martensite transformation. The latent heat of crystallization can be incorporated for the entire temperature change from the initial temperature $T_0$ to the final temperature $T_f$. This creates a constant for the effective specific heat that can be readily integrated:

$$c_a = c_p + \frac{c_t}{A_f - T_0} \tag{31}$$

$$c_a = 0.84 \ \frac{J}{g \ K} + \frac{24.2 \ \frac{J}{g}}{373 \ K - 243 \ K} = 1.0 \ \frac{J}{g \ K}$$

$$c_m = c_p + \frac{c_t}{T_0 - M_f}$$

$$c_m = 0.84 \ \frac{J}{g \ K} + \frac{24.2 \ \frac{J}{g}}{500 \ K - 373 \ K} = 1.0 \ \frac{J}{g \ K}$$

where $c_a$ is valid for the initial heat up where $T_0$ can be equal to lower values of the spacecraft temperature during operation. $A_f$ and $M_f$ are the martensite and austenite finish temperatures, respectively, and can be assumed to both equal 373 K for the purposes of this theoretical thermal analysis. In this manner, $c_m$ is valid for the subsequent cool down when $T_0$ is equal to higher values of the SMA temperature. The transformation temperatures can be assumed to both be around $T_{activate}$. Since the temperature changes can be large, $c_t$ can be small compared to $c_p \Delta T$ and the modified specific heats can be approximately equal.

The modified specific heats ca and cm can be used to determine the upper limit of heat transfer times, while the original specific heat $c_p$ can be used to determine the lower limit. If the temperature change continues beyond the transformation finish temperature, $c_a$ and $c_m$ can still be used to estimate the upper limits on the time.

Thermal Resistances

The relevant modes for heat transfer in the exemplary case of the SMA hinge apparatus are conduction and radiation, since convection is negligible in the vacuum of space. For the SMA hinge apparatus, activation can be achieved by resistive Joule heating. Cool down can be possible via conduction to the CubeSat and the deployable structure as well as radiation to space. The conduction and radiation thermal resistances can be compared to determine the heat transfer mode with the greatest influence. A flat 10×6×0.1 mm³ NiTi sheet can be used for the initial thermal sizing.

Conduction causes heat to flow from the SMA element's hot center to its cold ends. The lower limit for conduction heat losses can occur if the SMA element is considered lumped at its centroid. Heat conducts from the center to both ends, each located L/2 from the centroid, over a large temperature difference. The temperature region of interest is $T_{activate}$:

$$\dot{Q}_{cond} = 2\frac{kA(T - T_{sc})}{L/2} \quad (32)$$

$$\dot{Q}_c = 2\frac{(T - T_{sc})}{\frac{L/2}{kA}}$$

$$\dot{Q}_c = 2\frac{T - T_{sc}}{R_{cond}}$$

$$R_c = \frac{L/2}{kA}$$

$$R_c = \frac{L/2}{k_a wt} = \frac{(10 \text{ mm})/2}{\left(18 \times 10^{-3} \frac{W}{\text{mm K}}\right)(6 \text{ mm})(0.1 \text{ mm})} = 460 \frac{K}{W}$$

$$\dot{Q}_c = \frac{2(T_{activate} - T_{sc,min})}{R_{cond}} = \frac{2(373 \text{ K} - 243 \text{ K})}{460 \frac{K}{W}} = 0.56 \text{ W}$$

where the conduction resistance $R_c$ also includes the conduction area. The factor of 2 accounts for conduction towards both ends.

Radiation can occur at the surface of the SMA material due to the large temperature difference between the hot element and cold deep space (about 3 Kelvin). By neglecting the temperature of space, $T_{space}$, a modified radiation resistance $R_r$ and modified radiation heat transfer coefficient $h_r$ can be derived:

$$\dot{Q}_{rad} = \varepsilon\sigma_{sb}PL(T^4 - T_{space}^4) \quad (33)$$

$$\dot{Q}_r = \varepsilon\sigma_{sb}PL(T^4 - 0^4)$$

$$\dot{Q}_r = \varepsilon\sigma_{sb}T^3 PL(T - 0)$$

$$\dot{Q}_r = h_r PL(T - 0)$$

$$\dot{Q}_r = \frac{T}{R_{rad}}$$

$$R_r = \frac{1}{h_r PL}$$

$$h_r = \varepsilon\sigma_{sb}T^3$$

$$h_r = \varepsilon\sigma_{sb}T_{activate}^3 = (0.50)\left(5.67 \times 10^{-14} \frac{W}{\text{mm}^2 \text{ K}^4}\right)(373 \text{ K})^3$$

$$h_r = 1.47 \times 10^{-6} \frac{W}{\text{mm}^2 \text{ K}} = 1.47 \frac{W}{\text{m}^2 \text{ K}}$$

$$R_r = \frac{1}{h_r PL} = \frac{1}{\left(1.47 \times 10^{-6} \frac{W}{\text{mm}^2 \text{ K}}\right)(2(6 \text{ mm}))(10 \text{ mm})} = 5,700 \frac{K}{W}$$

$$\dot{Q}_r = \frac{T_{activate}}{R_{rad}} = \frac{373 \text{ K}}{5,700 \frac{K}{W}} = 0.066 \text{ W}$$

where P is the wetted perimeter equal to 2w for a sufficiently thin element. The heat transfer coefficient hr does not inherently include the surface area for radiation. The surface area, however, is incorporated in the resistance $R_r$. In this case, $R_r$ includes the surface area on both sides of the SMA element as an upper limiting case. For radiation, the reference temperature can be $T_{space}$, which results in a value of hr that is low compared to that of typical values for natural convection in air at room temperature. The low magnitude of radiation compared to conduction also implies the fin effect can be ignored for first-order estimates. However, as described above, the SMA temperature can reach a high temperature, e.g., $T_{max}$. Since radiative heat transfer scales by a $T^4$ relationship, radiation may affect the maximum performance of the mechanism at elevated temperatures.

Cross-Section and Joule Heating

Joule heating can be used to uniformly distribute the thermal input power throughout the element, simplifying the subsequent analysis for activation. For Joule heating to be effective, the cross-sectional area of the SMA element should be configured to be sufficiently small such that the SMA element has a high electrical resistance. The initial thermal analyses determined that the heat losses, $\dot{Q}_L$, can be as high as 0.63 W during heat up. The total heat input provided by Joule heating, $\dot{Q}_J$, should be greater than these losses to increase the temperature of the satellite.

Comparing Joule heating to the heat losses, a lower limit to the cross-sectional area for the SMA element can be derived:

$$\dot{Q}_J > \dot{Q}_L \quad (34)$$

$$I^2 \frac{\rho_e L}{A} > \dot{Q}_L$$

$$A < I_{max}^2 \frac{\rho_{e,m} L}{\dot{Q}_L}$$

$$A < (8 \text{ A})^2 \frac{(80 \times 10^{-5} \, \Omega \text{ mm})(10 \text{ mm})}{0.63 \text{ W}}$$

$$A < 0.81 \text{ mm}^2$$

It is preferable for the Joule heating to be greater than the heat losses to ensure there is a sufficient margin to heat both ends of the SMA element. Based on the width, e.g., 6 mm, and the thickness, e.g., 0.1 mm, used to determine the heat losses, the SMA element yields an area of 0.60 mm². Based on the resistance and input current, the area of the SMA element satisfies the conditions in Equation 34, thus Joule heating can be used to heat the SMA element.

The thermal power input for Joule heating and the martensite electrical resistance, $R_m$, can be described by:

$$R_m = \frac{\rho_{e,m} L}{A} \quad (35)$$

$$R_m = \frac{(80 \times 10^{-5} \, \Omega \text{ mm})(10 \text{ mm})}{0.6 \text{ mm}^2}$$

$$R_m = 13 \text{ m}\Omega$$

$$\dot{Q}_J = I_{max}^2 R_m$$

$$\dot{Q}_J = (8 \text{ A})^2 (13 \times 10^{-3} \, \Omega)$$

$$\dot{Q}_J = 0.85 \text{ W}$$

Based on Equation 35, the thermal power provided by Joule heating is greater than the heat losses.

Transient Thermal Analyses

A transient thermal analysis determines the temperature as a function of time. First, isothermal assumptions can be justified using the Biot number and the relative thermal inertia of the components. An ideal lumped capacity model can be used to determine a lower limit for the activation time. Based on these approximations, the second-order, partial differential heat equation can be solved to calculate a realistic upper limit to the activation and cool down times. A Fourier series approximation can be used to determine a lower limit to the operation frequency based on these exemplary conditions.

Isothermal Assumption

The Biot number can be used to assess whether the SMA element can be approximated as isothermal along one or more coordinate dimensions. If the SMA element can be approximated as isothermal along a dimension, the terms related to the spatial temperature gradients along that dimension in the heat equation do not need to be implemented, which simplifies the analysis. The Biot number compares heat conduction across the SMA element's dimensions to the heat lost at its surface from convection and radiation. For the SMA hinge apparatus, radiation can only be considered. If heat passes readily through the material to the surface, the Biot number is low and the element can be considered isothermal along that dimension.

Traditionally, a heat transfer coefficient h is used for the Biot number. For radiation, this coefficient was derived as $h_r$, akin to the convection heat transfer coefficient $h_c$. Care must be taken when calculating the Biot number in this case because conduction uses $T_{sc}$ as the reference temperature while radiation uses $T_{space}$. To increase radiation, an emissivity of unity, denoted $\varepsilon_{bb}$, to indicate black-body radiation. To decrease conduction, the martensite thermal conductivity is used. This creates the largest Biot numbers as a limiting case. Again, the temperature of interest is $T_{activate}$ and the lower limit in spacecraft temperature $T_{sc,min}$ is used since it represents the worst-case scenario for activation where detailed thermal analyses are most relevant.

The Biot number for the thickness can be calculated:

$$Bi_t = \frac{R_{t,cond}}{R_{rad}} \frac{(T - T_{space})}{(T - T_{sc})} \tag{36}$$

$$Bi_t = \frac{\frac{t/2}{kwL}}{\frac{1}{(\varepsilon\sigma_{sb}T^3)(2wL)}} \frac{(T - T_{space})}{(T - T_{sc})}$$

$$Bi_t = t \frac{\varepsilon_{bb}\sigma_{sb}T_{activate}^3}{k_m} \frac{(T_{activate} - 0)}{(T_{activate} - T_{sc,min})}$$

$$\frac{\varepsilon_{bb}\sigma_{sb}T_{activate}^3}{k_m} =$$

$$\frac{(1)\left(5.67 \times 10^{-14} \frac{W}{mm^2\ K^4}\right)(373\ K)^3}{\left(8.6 \times 10^{-3} \frac{W}{mm\ K}\right)} = 3.42 \times 10^{-4} \frac{1}{mm}$$

$$Bi_t = (0.1\ mm)\left(3.42 \times 10^{-4} \frac{1}{mm}\right)\frac{373\ K}{(373\ K - 243\ K)} = 1.0 \times 10^{-4}$$

and then the Biot number along the width is determined similarly:

$$Bi_w = \frac{R_{w,cond}}{R_{rad}} \frac{(T - T_{space})}{(T - T_{sc})} \tag{37}$$

$$Bi_w = \frac{\frac{w/2}{ktL}}{\frac{1}{(\varepsilon\sigma_{sb}T^3)(2wL)}} \frac{(T - T_{space})}{(T - T_{sc})}$$

$$Bi_w = \frac{w^2}{t} \frac{\varepsilon_{bb}\sigma_{sb}T_{activate}^3}{k_m} \frac{(T_{activate} - 0)}{(T_{activate} - T_{sc,min})}$$

$$Bi_w = \frac{(6\ mm)^2}{(0.1\ mm)}\left(3.42 \times 10^{-4} \frac{1}{mm}\right)(2.87) = 0.35$$

and finally the Biot number along the length:

$$Bi_L = \frac{R_{L,cond}}{R_{rad}} \frac{(T - T_{space})}{(T - T_{sc})} \tag{38}$$

$$Bi_L = \frac{\frac{L/2}{ktw}}{\frac{1}{(\varepsilon\sigma_{sb}T^3)(2wL)}} \frac{(T - T_{space})}{(T - T_{sc})}$$

$$Bi_L = \frac{L^2}{t} \frac{\varepsilon_{bb}\sigma_{sb}T_{activate}^3}{k_m} \frac{(T_{activate} - 0)}{(T_{activate} - T_{sc,min})}$$

$$Bi_L = \frac{(10\ mm)^2}{0.1\ mm}\left(3.42 \times 10^{-4} \frac{1}{mm}\right)(2.87) = 0.98$$

The Biot numbers for the thickness and width are less than unity, thus the element can be approximated as isothermal along these dimensions. However, the Biot number for the length is near unity, thus 1-dimensional (1D) heat conduction along the SMA element's length, coupled with radiation, can be considered.

Finally, the relative thermal inertia of the system can be quantified. If one component's thermal inertia is substantially greater than another component, the former component can be considered isothermal as heat is transferred between both components. This also implies that the large isothermal component can readily transfer heat from the interface. For thermal analyses, this inertia is the product of the component's mass and specific heat, or $mc_p$, which describes the thermal energy input necessary to raise the temperature of the component. If a transformation is occurring, $c_p$ would also include the latent heat of transformation to create an effective specific heat $c_e$.

If the thermal inertia of the CubeSat and deployable structure are much greater than that of the SMA element, the SMA element can be modeled as being mounted to two isothermal heat sinks. The mass of the CubeSat can be on the order of 5 kg and the deployable structure can be on the order of 100 g. The mass of the SMA element can be simply calculated by applying $m_{SMA}=\rho_d twL=39$ mg. Thus, for these exemplary conditions, the masses of the major components differ by at least two orders of magnitude. The thermal inertia is the product of $mc_p$ and since the specific heat of metals differs by only an order of magnitude, the isothermal CubeSat and isothermal deployable structure assumptions are valid. Isothermal boundary conditions can be applied when solving the heat equation.

An idealized lumped capacity model is applied for the heat up process to obtain a lower limit estimate of the activation time. For cases where heat losses are negligible and assuming the entire element is at a uniform temperature, the ideal heat up time can be calculated. Joule heating is used to raise the temperature of the SMA and supply the latent heat of transformation.

The thermal energy input for activation can be calculated by summing the energy needed to raise the temperature of the SMA element and the energy to transform the SMA element between both phases. This latent heat of transformation can be assumed to be the same value for all transformations, from martensite to austenite and vice versa. The necessary activation energy, or $U_a$, can then be described as:

$$U_{activate} = m(c_p \Delta T + c_t) \quad (39)$$

$$U_a = (\rho_d t w L)(c_p(T_f - T_0) + c_t)$$

$$U_a = m(c_p(T_{activate} - T_{sc,min}) + c_t)$$

$$m = \left(6.45 \times 10^{-3} \frac{g}{mm^3}\right)(0.1 \text{ mm})(6 \text{ mm})(10 \text{ mm}) = 39 \text{ mg}$$

$$U_a = (39 \times 10^{-3} \text{ g})\left[\left(0.84 \frac{J}{g}\right)(373 \text{ K} - 243 \text{ K}) + 24.2 \frac{J}{g}\right]$$

$$U_a = 5.2 \text{ J}$$

where $T_0$ is the initial temperature of the material and $T_f$ is the final temperature, allowing the activation energy to be positive for the endothermic martensite to austenite transformation, and negative for the exothermic reverse transformation.

Utilizing Joule heating to deliver the activation energy to the element, the lumped activation time, $t_l$, can be calculated:

$$t_l = \frac{U_a}{\dot{Q}_J} \quad (40)$$

$$t_l = \frac{5.2 \text{ J}}{0.85 \text{ W}} = 6.1 \text{ s}$$

Equation 40 does not include radiation and conduction losses, which can increase the power draw of the mechanism during actuation. These heat losses can be included to create a more accurate thermal model. If heat losses are included, the center of the SMA element can be hotter than the ends, leading to a nonuniform temperature distribution and hence, renders the use of a lumped capacity model invalid.

Heat Up for Activation

Figure 24:
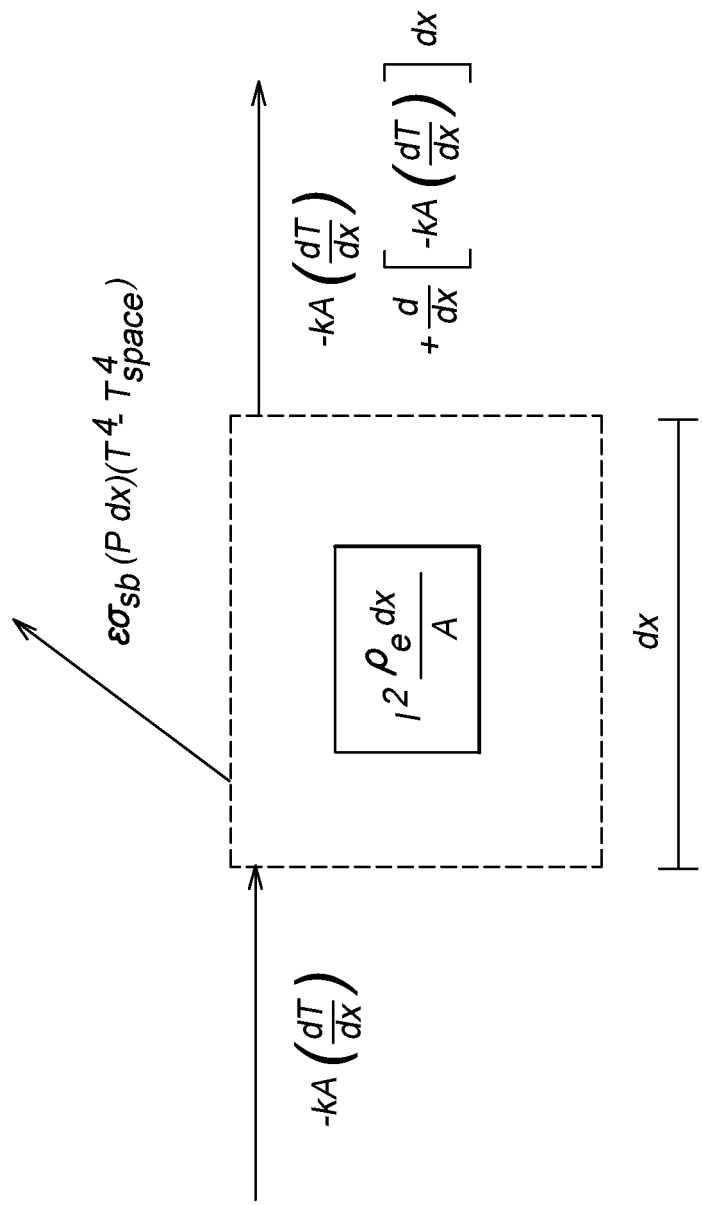
FIG. 24 shows an illustration of a control volume used to model the full heat equation in the heat up process.

To analyze the process of heating up of the SMA element, the full heat equation with initial and boundary conditions can be used to obtain a transient solution for the temperature. Due to the source term from Joule heating, a Fourier series approximation cannot be used. First, a control volume can be drawn around the SMA element as shown in FIG. 24. This control volume can also be applicable for the cool down process, e.g, when Joule heating is removed, with appropriate initial and boundary conditions for this case.

Referring to the control volume and differentiating along the dimension dz, or when the element is curved, the length dl:

$$\dot{U} = \dot{Q}_{Joule} + \dot{Q}_{cond} + \dot{Q}_{rad} \quad (41)$$

$$(\rho_d A dl) c_a \frac{dT}{dt} = \frac{I^2 \rho_e dl}{A} + \frac{d}{dl}\left(kA \frac{dT}{dl}\right) dl - \sigma_{sb}\varepsilon(P dl)T^4$$

$$\frac{dT}{dt} = \frac{I^2 \rho_e}{A^2 \rho_d c_a} + \frac{k}{\rho_d c_a} \frac{d}{dl}\left(\frac{dT}{dl}\right) - \frac{\sigma_{sb}\varepsilon P}{A \rho_d c_a} T^4$$

-continued $$\frac{dT}{dt} = \frac{I^2 \rho_e}{A^2 \rho_d c_a} + \alpha \frac{d}{dl}\left(\frac{dT}{dl}\right) - \frac{\sigma_{sb}\varepsilon P}{A \rho_d c_a} T^4$$

where $$\alpha = \frac{k_a}{\rho_d c_a}$$

is the thermal diffusivity, utilizing the austenite thermal conductivity $k_a$ and modified effective specific heat $c_a$ to yield the worst case activation time. Again, the temperature of space can be neglected. One initial condition (IC) is necessary to solve $$\frac{d\bar{T}}{d\bar{t}}$$

and two boundary conditions (BCs) are needed to solve $$\frac{d^2\bar{T}}{d\bar{l}^2}.$$

Dimensional analysis can be applied by configuring the variables T, l, and t to be dimensionless and to vary from zero to unity:

$$\bar{T} = \frac{T}{T_{anneal}} \ldots d\bar{T} = \frac{1}{T_{anneal}} dT \quad (42)$$

$$\bar{t} = \frac{\alpha t}{L^2} = Fo \ldots d\bar{t} = \frac{\alpha}{L^2} dt$$

$$\bar{l} = \frac{l}{L} \ldots d\bar{l} = \frac{1}{L} dl$$

where $T_{anneal}$ is an upper limit to the temperature of the SMA element. The variable L refers to the length of the SMA element, and the Fourier number, Fo, describes the conduction along the element's length. Note that the Fourier number is also the dimensionless time variable, or $\bar{t}$.

The heat equation can be rewritten in dimensionless form:

$$\frac{dT}{dt} = \frac{I^2 \rho_e}{A^2 \rho_d c_a} + \alpha \frac{d}{dl}\left(\frac{dT}{dl}\right) - \frac{\sigma_{sb}\varepsilon P}{A \rho_d c_a} T^4 \quad (43)$$

$$\frac{(T_{anneal} d\bar{T})}{\left(\frac{L^2}{\alpha} d\bar{t}\right)} = \frac{I^2 \rho_e}{A^2 \rho_d c_a} + \alpha \frac{d}{(L d\bar{l})}\left(\frac{T_{anneal} d\bar{T}}{L d\bar{l}}\right) - \frac{\sigma_{sb}\varepsilon P}{A \rho_d c_a}(T_{anneal}\bar{T})^4$$

$$\frac{d\bar{T}}{d\bar{t}} = \frac{d^2\bar{T}}{d\bar{l}^2} + \frac{L^2}{T_{anneal}\alpha}\left[\frac{I^2 \rho_e}{A^2 \rho_d c_a} - \frac{\sigma_{sb}\varepsilon P}{A \rho_d c_a}(T_{anneal}\bar{T})^4\right]$$

$$\frac{d\bar{T}}{d\bar{t}} = \frac{d^2\bar{T}}{d\bar{l}^2} - \frac{L^2 T_{anneal}^3}{\alpha} \frac{\sigma_{sb}\varepsilon P}{A \rho_d c_a} \bar{T}^4 + \frac{L^2}{T_{anneal}\alpha} \frac{I^2 \rho_e}{A^2 \rho_d c_a}$$

$$\frac{d\bar{T}}{d\bar{t}} = \frac{d^2\bar{T}}{d\bar{l}^2} - \beta\bar{T}^4 + i$$

and the constants are:

$$\alpha = \frac{k_a}{\rho_d c_a} = \frac{\left(18 \times 10^{-3} \frac{W}{mm\ K}\right)}{\left(6.45 \times 10^{-3} \frac{g}{mm^3}\right)\left(1.0 \frac{J}{g\ K}\right)} = 2.8 \frac{mm^2}{s} \quad (44)$$

$$i = \frac{L^2}{T_{anneal} \alpha} \frac{I^2 \rho_e}{A^2 \rho_d c_a}$$

$$i = \frac{(10\ mm)^2}{(750\ K)\left(2.8 \frac{mm^2}{s}\right)}$$

$$\frac{(8\ A)^2 (80 \times 10^{-5}\ \Omega\ mm)}{(0.6\ mm^2)^2 \left(6.45 \times 10^{-3} \frac{g}{mm^3}\right)\left(1.0 \frac{J}{g\ K}\right)} = 1.1$$

$$\beta = \frac{L^2 T_{anneal}^3}{\alpha} \frac{\sigma_{sb} \varepsilon P}{A \rho_d c_a}$$

$$\beta =$$

$$\frac{(10\ mm)^2 (750\ K)^3}{2.8 \frac{mm^2}{s}} \frac{\left(5.67 \times 10^{-14} \frac{W}{mm^2\ K^4}\right)(0.50)(12\ mm)}{(0.6\ mm^2)\left(6.45 \times 10^{-3} \frac{g}{mm^3}\right)\left(1.0 \frac{J}{g\ K}\right)} = 1.3$$

where $\alpha$ is a constant that describes conduction, $\beta$ is a dimensionless constant that describes radiation, and $i$ is a dimensionless constant that describes Joule heating, all with respect to the thermal inertia of the element.

The ends of the SMA element can be assumed to be mounted to two isothermal heat sinks kept at a constant temperature equal to the initial temperature, $T_0$, of the SMA element. To determine an upper limit to the heat up time, $T_0$ can equal the lower limit in spacecraft temperature. Since the variables were defined to be dimensionless, the initial condition, IC, and the boundary conditions, BCs, vary from zero to unity:

$$IC: \overline{T}(\overline{t}=0, \overline{l}=l) = \frac{T_0}{T_{anneal}} = \frac{T_{sc,min}}{T_{anneal}} = \frac{243\ K}{750\ K} = 0.32 \quad (45)$$

$$BC: \overline{T}(\overline{t}=t, \overline{l}=0) = \frac{T_0}{T_{anneal}} = 0.32$$

$$BC: \overline{T}(\overline{t}=t, \overline{l}=1) = \frac{T_0}{T_{anneal}} = 0.32$$

Equation 43 can be combined with the constants in Equation 44 and the conditions in Equation 45 to solve for the dimensionless temperature $\overline{T}(\overline{t}, \overline{l})$. Equation 42 can be used to convert the dimensionless parameters into values relevant to the physical SMA element.

Figure 25A:
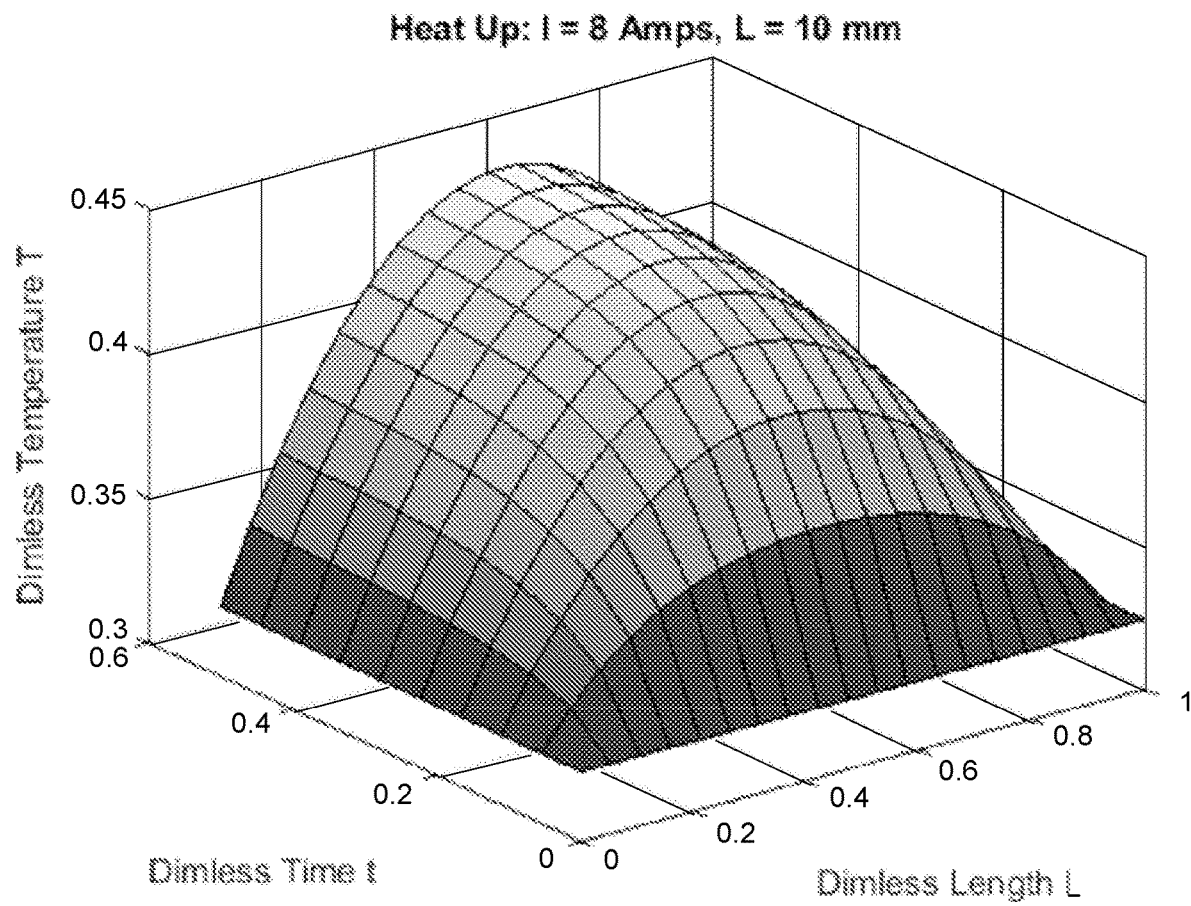
FIG. 25A shows a transient solution to the heat equation during the heat up process for an element length of 10 mm. The value of 0.45 for the dimensionless temperature implies activation is not achieved.
Figure 25B:
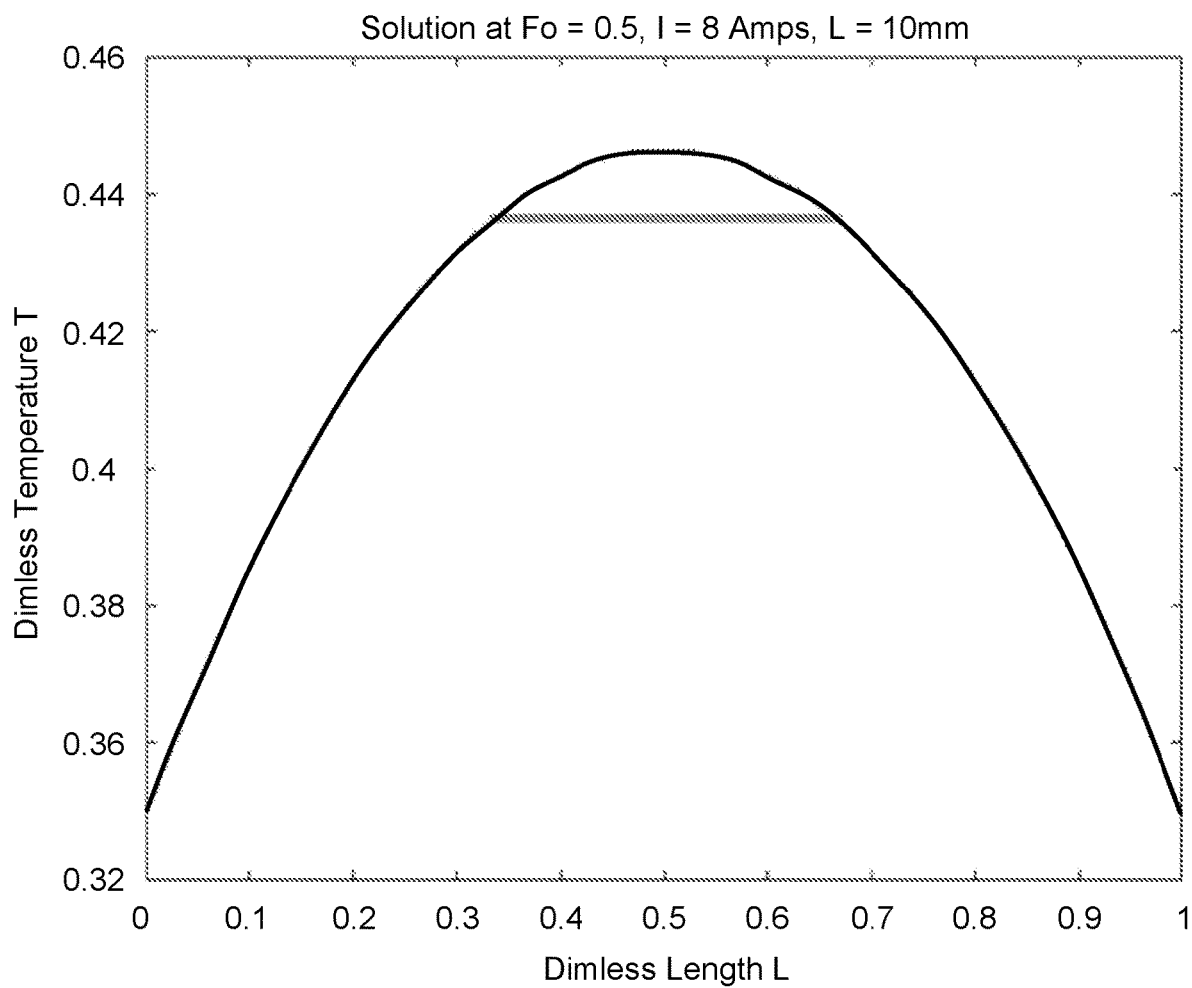
FIG. 25B shows the predicted temperature distribution along the 10 mm SMA element during heat up. The portion of the SMA that has been trained to bend is highlighted. The value of 0.45 for the dimensionless temperature implies activation is not achieved.

The heat equation can be solved to evaluate whether the SMA element reaches activation in space. Based on the activation temperature of approximately 373 K, the corresponding dimensionless temperature should equal approximately 0.50 when the transformation temperature is reached. The numerical solution is shown in FIG. 25A and depicts how the element heats up while conducting to the boundaries. FIG. 25B illustrates the temperature distribution when steady state has been reached. The center of the element does not reach a dimensionless temperature of 0.50 and is not activated, which indicates the boundary conditions have a significant effect on the temperature distribution.

Figure 26:
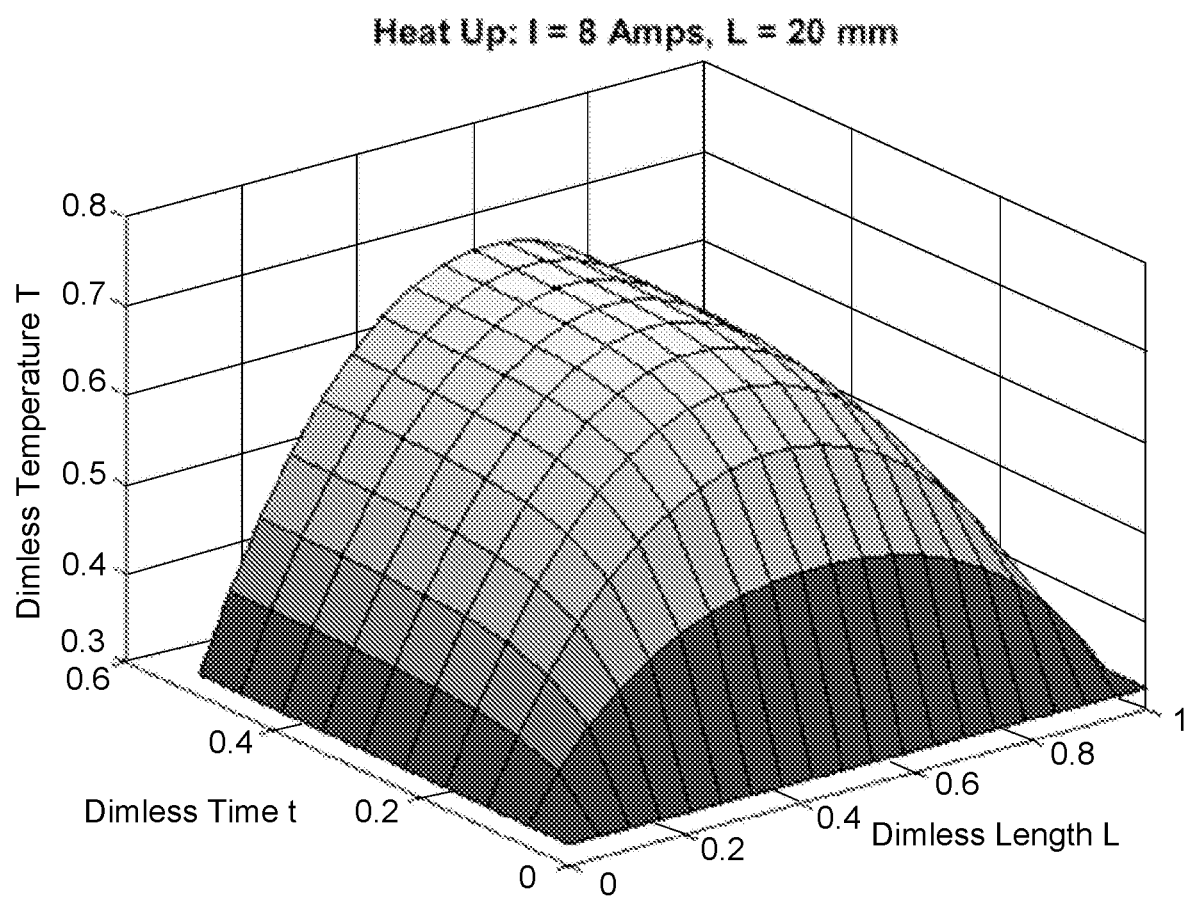
FIG. 26 shows a transient solution to the heat equation during SMA activation for an element length of 20 mm and a current of 8 A. The dimensionless temperature of 0.70 means activation is achieved, but the shape memory effect may be degraded due to the high temperature.

The SMA element can thus be lengthened to 20 mm. The numerical solution is recalculated for a 20 mm long SMA element, as shown in FIG. 26. In this case, the dimensionless temperature can reach approximately 0.70, which is equal to 525 K. This temperature is above the $T_{max}$ temperature, thus the shape memory effect may begin to diminish. The area of the SMA element can be increased or the input current during can be reduced to ensure the temperature of the SMA element does not exceed $T_{max}$.

Figure 27A:
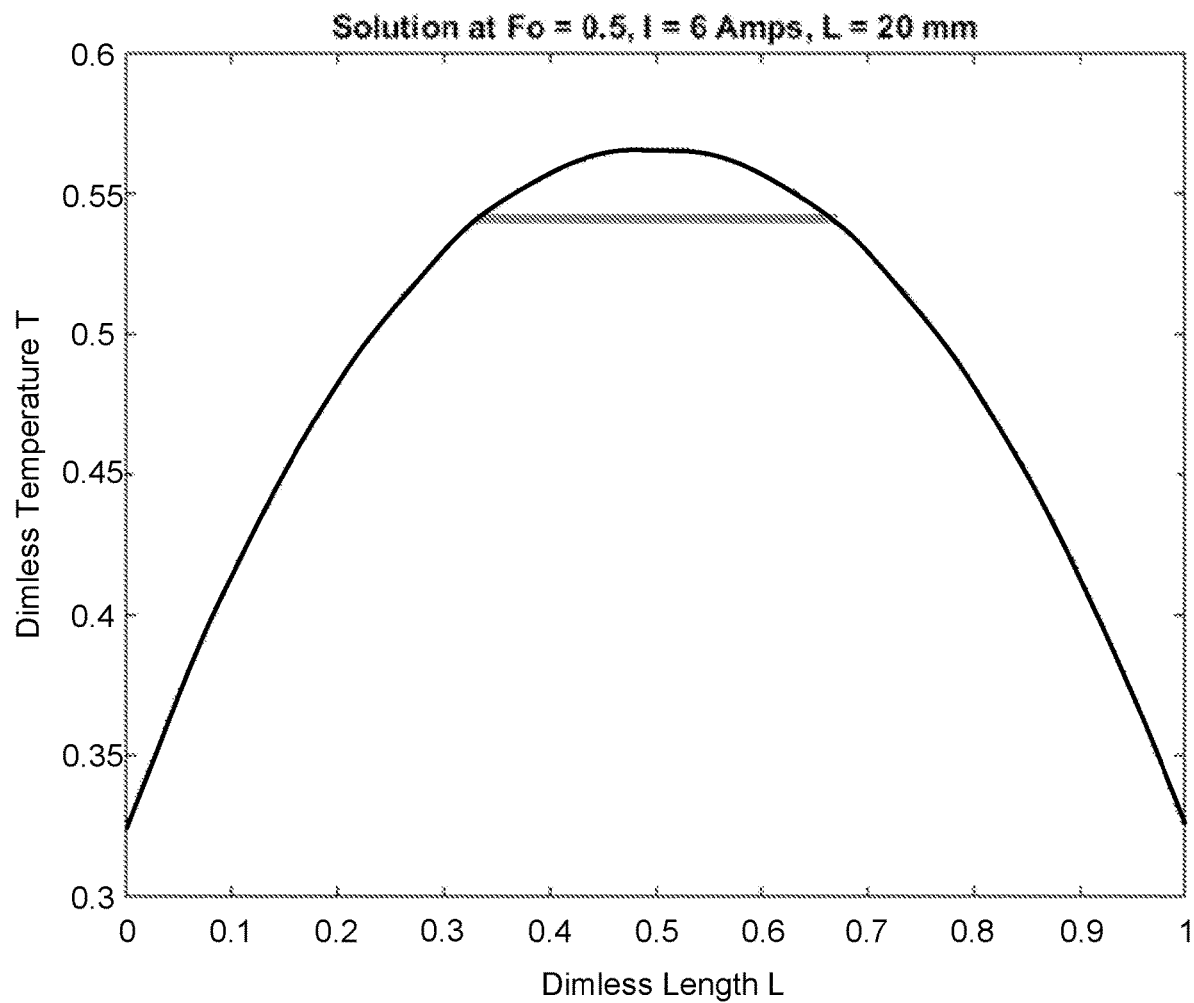
FIG. 27A shows the predicted temperature distribution along the 20 mm SMA element during activation with a current of 6 A. The portion of the SMA that has been trained to bend is highlighted. Activation is achieved with a dimensionless temperature of 0.55.
Figure 27B:
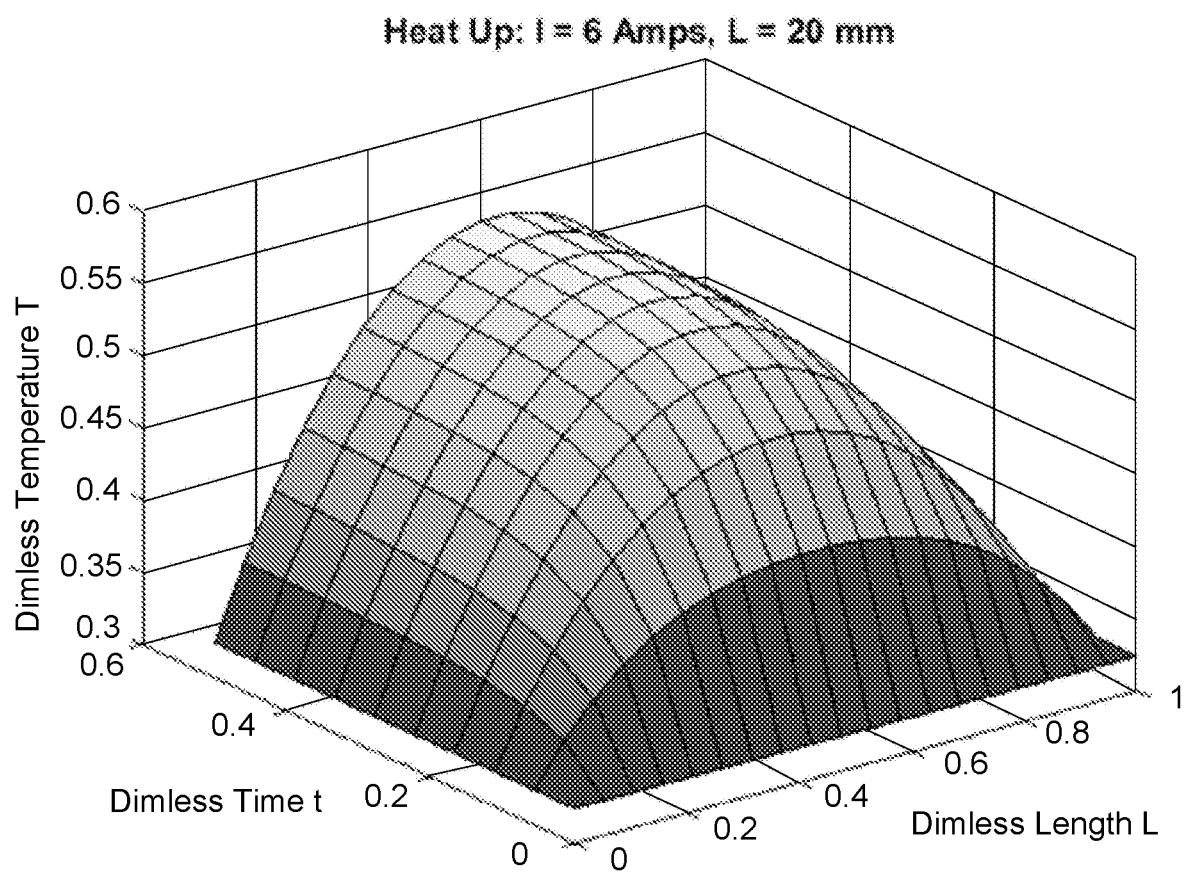
FIG. 27B shows a transient solution to the heat equation during SMA activation for an element length of 20 mm and a current of 6 A. Activation is achieved with a dimensionless temperature of 0.55.

The effects of reducing the input current to 6 Amps are shown in FIGS. 27A and 27B. The SMA element reaches a dimensionless temperature of 0.55 which is equal to 413 K. Thus, the SMA element under these conditions can transform between the martensite and austenite phases, allowing the structure to deploy in space. This analysis validates the requirement to operate in the CubeSat thermal environment.

By limiting the current through the element to 6 Amps, the SMA element can be prevented from overheating even if the power is accidentally kept on for a short duration. However, if the SMA element is heated for too long, the boundaries may no longer be isothermal, which can cause the SMA element to reach even higher temperatures that may lead to damage. In this case, a more detailed thermal model that includes the fasteners, insulation, CubeSat, and deployable structure should be pursued.

With a current of 6 Amps, the activation temperature is reached across the length of interest when the dimensionless temperature is equal to 0.50. Equation 42 can be applied with a and the length of 20 mm to yield the worst-case activation time, $t_a$, which is equal to 36 seconds. The power of the mechanism can then be calculated by multiplying $t_a$ by the Joule heating caused by the 6 A current, which is equal to 0.96 W. For these parameters, the increased length also increased the electrical resistance of the element. The power to activate the mechanism is then equal to 35 J, or 0.01 Whr. This is an order of magnitude less than the allocated budget and satisfies the power requirement for the SMA hinge apparatus.

Cool Down for Reset

During the subsequent cool-down, heat is dissipated via conduction to the CubeSat and deployable structure, and via radiation to deep space. An estimate for the time to cool down and reset the mechanism provides an estimate for the control bandwidth, or allowable operation frequency.

The problem can be modeled as a sheet of finite length being cooled by conduction to isothermal heat sinks at both ends. However, if the element has just been activated and is now being cooled, the mounting interfaces can be at an elevated temperature, which can be considered if a more detailed result is needed. The simplified model proposed can be analogous to cooling a slab of length of $2L_s$, with x=0 being the centerline. Radiation can be neglected to create an upper limit for the cool down time, which can then be approximated by a Fourier series.

To understand this transient conduction, the Biot and Fourier numbers can be calculated. For this case, the Biot number can compare the conduction resistance along the SMA element's length to the thermal resistance at the element's mounting interfaces. Since the interfaces are considered to be isothermal heat sinks due to the large thermal inertia of the CubeSat and deployable structure, the thermal resistance at these interfaces is equal to zero. The Biot number for the cool down process is then:

$$Bi_{cd} = \frac{R_{cond}}{R_{interface}} \quad (46)$$

-continued $$Bi_{cd} = \frac{L_s/kA}{0}$$

$$Bi_{cd} = \infty$$

where $L_s$ is equal to the half-length of the element, which is L/2 in our case, because heat is dissipated from the center to both ends of the element.

Since the Biot number is greater than unity, a lumped capacity model cannot be assumed. Instead, a semi-infinite model or Fourier series approximation can be used. A semi-infinite model is only valid with a Fourier number of less than about 0.075, corresponding to very short and transient processes. The semi-infinite model can be useful if one wishes to characterize the semi-infinite transformation wave that travels through the element during the crystallographic phase change. If the Fourier number is between 0.2 and 0.4, a one-term series approximation can be used. Other values for the Fourier number require the second order, partial differential heat equation to be solved.

First, a one-term solution can be assumed and then the Fourier number is checked to validate the assumption. For this model, the element is considered to have finished the reset process when its temperature drops from the initial temperature of $T_0$ to the martensite finish temperature of $M_f$. The initial temperature can be assumed to be the upper limit in SMA element temperature $T_{max}$ and the spacecraft can also be assumed to be at a higher temperature to reduce conduction losses and create an upper limit for the cool down time.

The temperature of the element can again be incorporated into the dimensionless variable T to solve the dimensionless heat equation without radiation or Joule heating. The temperature is then approximated by a Fourier series and the one-term approximation is applied:

$$\Theta = \frac{T - T_{sc,max}}{T_{max} - T_{sc,max}} = \sum_{n=1}^{\infty} A_n \exp(-\lambda_n^2 Fo) f_n \quad (47)$$

$$\Theta \approx A_1 f_1 \exp(-\lambda_1^2 Fo)$$

where $\Theta$ is a new dimensionless temperature and $A_n$, $f_n$, and $\lambda_n$ are terms in the Fourier series approximation. The initial temperature of the entire element can be assumed to be $T_{max}$. These terms are dependent on the element geometry and are functions of the Biot number. Once the temperature of interest is decided, and the series terms quantified, Equation 47 can be solved for the cool down time, or $t_c$, which is an upper limit.

The slab geometry can be used to calculate the parameters for the one-term Fourier series approximation:

$$A_1 = 1 + \frac{0.273}{(1 + 2.42/Bi^{1.5})^{2/3}} = 1.273 \quad (48)$$

$$\lambda_1 = \frac{\pi/2}{(1 + 2.62/Bi^{1.07})^{0.468}} = \pi/2$$

$$f_1 = \cos\left(\lambda_1 \frac{x}{L}\right) = 1$$

where the Biot number is equal to $\infty$ and the centers of the slab and the SMA element are at x=0.

The SMA element can be assumed to have completed cool down when its center reaches the martensite finish temperature of approximately 373 K, making the dimensionless temperature $\Theta$ equal to 0.19. Using the definition of the Fourier number and the element slab length $L_s$, which is equal to L/2 for our element, the cool down time is:

$$Fo = \frac{-1}{\lambda_1^2}\ln\left(\frac{\Theta}{A_1 f_1}\right) = \frac{-1}{(\pi/2)^2}\ln\left(\frac{0.19}{(1.273)(1)}\right) = 0.77 \quad (49)$$

$$t_c = \frac{(Fo)(L/2)^2}{\alpha} = \frac{(0.77)(20 \text{ mm}/2)^2}{1.3 \frac{\text{mm}^2}{\text{s}}} = 58 \text{ s}$$

where L is the length of the whole element and $t_c$ is the cool-down time. Note that $$\alpha = \frac{k_m}{\rho_d c_m}$$

can account for martensite thermal conductivity $k_m$ and the modified effective specific heat $c_m$ for the limiting case during the cool down transformation to martensite.

The Fourier number is equal to 0.77 which is outside the allowable range for a one-term approximation. However, the cool down time proposed here is a limiting value, thus there is a buffer included to compensate for potential inaccuracies in the approximation. The upper limit for the cool down time is equal to 58 s and the allowable operation frequency is about once per minute based on these exemplary conditions.

CubeSat Considerations

When building CubeSat hardware, the environment aboard the host satellite can be an important consideration during the design process. First, the space environment and its implications on material selection are discussed. Then, the dynamic effects of the mechanism on the host are disclosed. The atmospheric drag force in LEO can be analyzed to determine the deflection of the SMA element when the structure is deployed.

Space Environment

The space environment around Earth is highly oxidizing, thus the use of ferrous metals is prohibited in addition to silver, zinc, tin, and cadmium. Metallic materials are typically limited to aluminum, copper, titanium, and stainless steels. For CubeSats, magnetic materials that exhibit a magnetic field strength that exceeds a particular threshold are also prohibited. Stainless steel fasteners are common.

Due to the vacuum of space, polymers tend to spontaneously shed particles, which is called outgassing. Plastics used for electrical and thermal insulation in the SMA hinge apparatus should thus be configured such that outgassing is reduced. Furthermore, the integrity and use of the material should be maintained for all extreme temperatures used to activate the SMA element.

It should also be mentioned that Teflon is also prohibited by some launch providers despite its use on the Apollo program. A majority of launch providers further require that materials selected have a total mass loss (TML) of less than 1% under vacuum conditions. This TML is well characterized for many materials. Melting temperatures for the polymers discussed herein are available from multiple literature sources; however, further testing is recommended to confirm the reported data.

The common plastics that do not readily meet the outgassing requirements include, but are not limited to, polyester, polyvinyl chloride (PVC), polyvinylidene chloride (PVDC), polyamide (nylon), polyurethane, phenolic, polymethyl methacrylate (acrylic), and polyepoxide (epoxy). Although they may still be allowed in small quantities, these materials require further characterization if used in space systems. The plastics with low TML and thus cleared for space system use include, but are not limited to, polyethylene (PE), polypropylene (PP), polystyrene (PS), polycarbonate (PC), polyimide (Kapton), polyether ether ketone (PEEK), polyoxymethylene (POM, acetal), and polytetrafluoroethylene (PTFE, Teflon).

Care must be taken to select a plastic that can also sustain the temperature rise involved in heating the SMA material. The materials were reviewed based on their glass transition temperatures, which is preferably above $T_{max}$ of approximately 230° C. Based on these temperature considerations, polyethylene (120° C.), polypropylene (130° C.), PEEK (140° C.), polycarbonate (150° C.), and acetal (180° C.) are limited for FLAPS. The only space-qualified and temperature-resistant plastics remaining are polystyrene (240° C.), PTFE (330° C.), and Kapton (380° C.). These materials are available commercially, with polystyrene and PTFE sold primarily as machining stock and Kapton sold primarily as a thin film. Washers in all three materials are also available.

The materials selected for FLAPS can thus meet outgassing and temperature requirements. Nickel-titanium elements, aluminum structures, stainless steel fasteners, copper wiring, and PTFE insulation can be used exclusively for FLAPS.

Disturbances to Satellite

As the actuator mechanism actuates, the actuator generates forces that may invoke a response by the CubeSat. These forces couple to create moments that are counteracted by the reaction wheels on the CubeSat. The deployable structure translates in free space, which means the CubeSat should also translate such that the center of mass of the system remains fixed. The mechanism may also vibrate as it operates, causing pointing errors for the host that needs to be analyzed. If the resonant frequency of the panel is low, its vibrations may couple with the ADCS of the CubeSat, causing control instabilities.

Center of Mass Effects

The center of mass of the CubeSat-FLAPS system orbits about the Earth's center of mass. If FLAPS actuates, the CubeSat should translate in free-space such that the system's center of mass does not change. Actuation of FLAPS can cause the CubeSat to accelerate or decelerate in the ram direction and also in one of the lateral directions.

The translation of the CubeSat can be determined by assuming the CubeSat mass is lumped at the CubeSat's center of mass and the FLAPS mass is lumped at the deployable structure's centroid. Then the center of mass of the entire system can be calculated relative to some origin. If the position of the panel is changed, for example from the $\theta=0$ to the $\theta=\pi/2$ position, the calculations can be repeated to yield an updated center of mass of the CubeSat, relative to the origin and the fixed center of mass of the system.

Resonant Frequency

The vibrations from the panel can couple with the ADCS system aboard the CubeSat to cause control instability. Due to complex electronics such as a star camera, some ADCS run on a bandwidth of a couple of Hz. The SMA element can be thin and coupled to a large inertial mass, thus the resonant frequency of the mechanism can be low.

Approximating the SMA element as a cantilever beam, the rotational stiffness is:

$$\kappa = \frac{EI}{L} = \frac{(28{,}000 \text{ MPa})\frac{(6 \text{ mm})(0.1 \text{ mm})^3}{12}}{20 \text{ mm}} = 0.7 \frac{\text{N mm}}{\text{rad}} \quad (50)$$

where E is the lower limit elastic modulus of the martensite material, I is the second area inertia to bending, and L is the length of the actuator.

The resonant frequency of the SMA element is then written as:

$$f_n = \frac{1}{2\pi}\sqrt{\frac{2\kappa}{I_{ds}}} = \frac{1}{2\pi}\sqrt{\frac{2\kappa}{\frac{1}{3}m_{ds}L_{ds}^2}} \quad (51)$$

$$f_n = \frac{1}{2\pi}\sqrt{\frac{2\left(0.7\times 10^{-3}\frac{\text{N m}}{\text{rad}}\right)}{\frac{1}{3}(80\times 10^{-3} \text{ kg})(0.340 \text{ m})^2}} = 0.11 \text{ Hz}$$

where the factor of 2 accounts for both elements acting in parallel and $I_{ds}$ is the moment of inertia of the deployable structure about its short edge. The resonant frequency can thus be sufficiently low such that the resonant frequency is below the control frequency of the CubeSat. It is also possible that the satellite ADCS can compensate this disturbance. Deploying the solar panel from its short edge or increasing the thickness of the SMA element can have the greatest effects on increasing the resonant frequency.

Atmospheric Drag Deflection

While space is assumed to be a vacuum for most purposes, there are still a small number of molecules, such as atomic oxygen, in space near the Earth. As the CubeSat orbits, it impacts these molecules, which exert a force on the CubeSat causing the orbit to decay. Most CubeSats are launched to an altitude of about 400 km where the International Space Station orbits. At this altitude, a CubeSat can hit enough molecules to fall back to Earth within a few years without propulsion to boost its orbit. As the altitude increases, the air density decreases dramatically. For example, CubeSats in orbit at around 600 kcm can take approximately 10 years to deorbit. CubeSats do not typically operate at higher altitudes because of an international treaty that declares all space objects cannot become orbital debris 25 years after launch.

By utilizing FLAPS, a CubeSat can increase its drag area and impact more molecules. This increases the drag force on the CubeSat and decreases its orbital lifetime. If a longer orbital lifetime is desired, FLAPS can enter the low-drag configuration. FLAPS can achieve this without rotation of the entire satellite bus, which could affect the payload performance.

For the mechanical design of FLAPS, the drag force on the 3U deployable structure should not cause excessive deflection of the SMA element. The drag force, FD, is dependent on the density of molecules, $\rho_m$, at a given altitude h. At 400 km, the atmospheric density can be as high as $8.43\times 10^{-12}$ kg/m³. The drag coefficient CD can be assumed to be equal to 4 as a worst-case estimate for a specular flat plate at normal incidence. The area of the deployable structure, Ads, is equal to 340 mm×88 mm=0.30 m². The orbital velocity, v, is about 7,700 m/s at 400 km altitude. The drag force is then:

$$F_D = \frac{1}{2}\rho_m v^2 C_D A_{ds} \qquad (52)$$

$$F_D = \frac{1}{2}\left(8.43 \times 10^{-12}\,\frac{\text{kg}}{\text{m}^3}\right)\left(7,700\,\frac{\text{m}}{\text{s}}\right)^2 (4)(0.30\ \text{m}^2)$$

$$F_D = 3.0 \times 10^{-4}\ \text{N}$$

This force can be approximated as being applied at the center of pressure deployable structure, which is at the centroid and about 170 mm from the SMA element. This creates a drag moment, $M_D$, of 0.051 N·mm on the SMA element. Approximating the element as a cantilever beam of length 20 mm, the angular deflection of the SMA element's tip can be calculated:

$$\theta_{Drag} = \frac{M_D L}{EI} \qquad (53)$$

$$\theta_{Drag} = \frac{M_D L}{E\left(\frac{wt^3}{12}\right)}$$

$$\theta_{Drag} = \frac{(51 \times 10^{-3}\ \text{N mm})(20\ \text{mm})}{\left(26,300\,\frac{\text{N}}{\text{mm}^2}\right)\frac{(6\ \text{mm})(0.1\ \text{mm})^3}{12}}$$

$$\theta_{Drag} = 0.078\ \text{rads} = 4.4°$$

The angular deflection of the deployable structure can be considered acceptable for the purposes of a drag surface. Note that many limiting estimates were used to justify $\Theta_D$ as the worst-case deflection estimate for the exemplary SMA hinge apparatus. Higher atmospheric densities at lower altitudes may cause more deflection of the element, but then orbital decay and deorbit is assured. If less deflection is desired, a thicker or shorter element can be used.

Prototyping

The various modeling described above, e.g., kinematic and thermal models, can be applied to create a prototype of the SMA hinge apparatus. The prototype of the mechanism can include a fixed CubeSat base member, SMA elements, deployable structure, fasteners, electrical insulation, and electrical contacts. The base member can be milled. Sheet metal techniques can be used to shape the SMA elements and the deployable structure. Prior to being integrated into the SMA hinge apparatus, the SMA elements can be annealed in a furnace.

Computer Model and Bill of Materials

Figure 28:
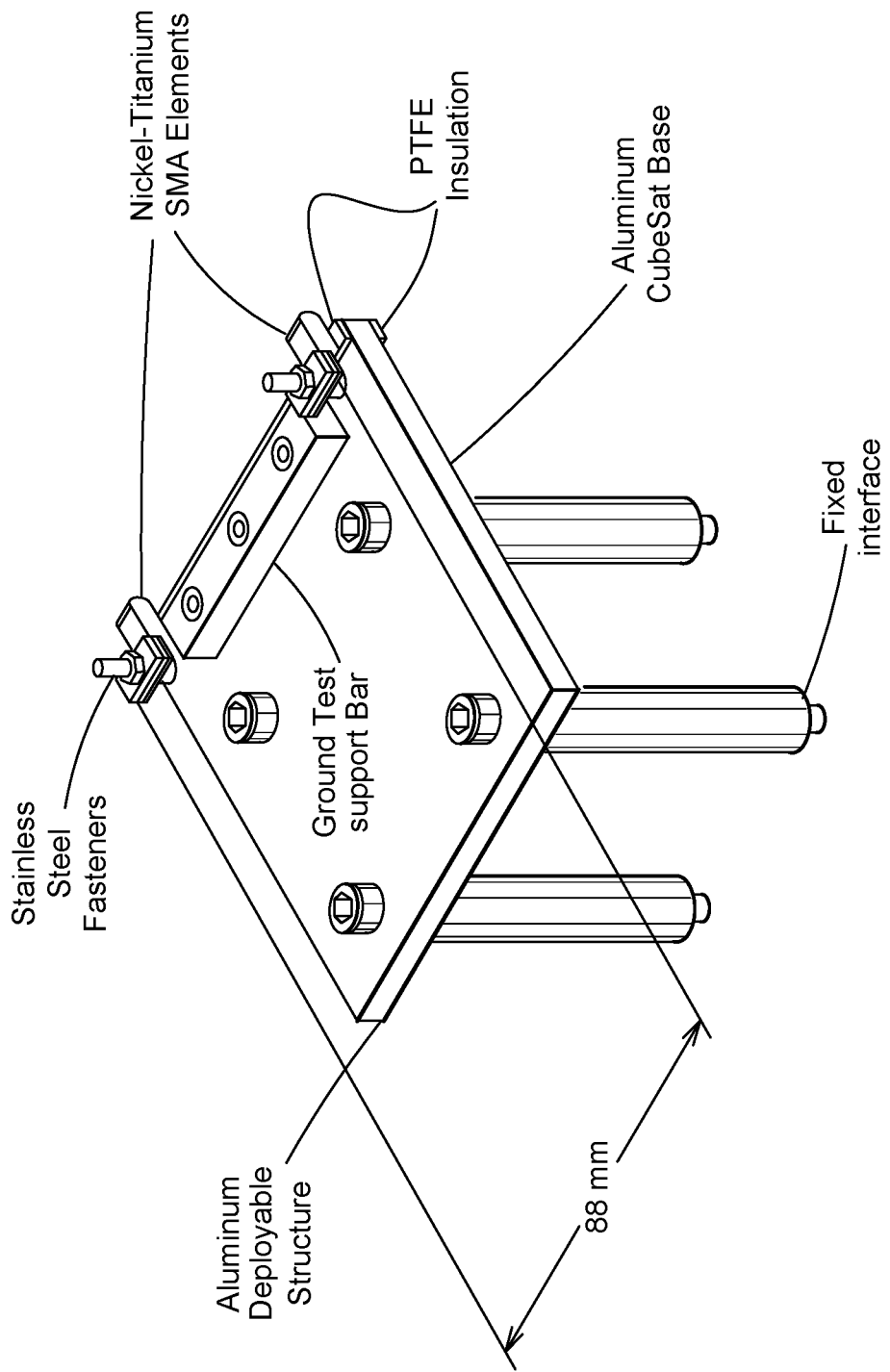
FIG. 28 shows a computer model of the SMA actuator prototype for ground testing. The SMA actuators can be mounted externally from the CubeSat or offset into the structure.

The prototype is shown stowed in FIG. 28. The SMA elements can be sandwiched between the fasteners and the electrical insulation and then mounted to the CubeSat base member, which is fixed. The other end of the SMA elements can be mounted similarly to the deployable structure. The ground support equipment (GSE) includes many components that may be unnecessary for the flight version of FLAPS. The stopper bar and associated fasteners are only included in ground testing to prevent accidental damage to the SMA elements. The CubeSat base member can be part of a structures subsystem on the CubeSat. The SMA elements can be mounted directly to a printed circuit board via through holes, eliminating the need for insulation at the CubeSat-SMA interface.

The components used in some implementations of a SMA hinge apparatus configured as a flight version are listed in the Bill of Materials, shown in FIG. 29. Excluding the deployable structure and control electronics, only the SMA elements, fasteners, insulation, and electrical connections are needed for the flight version of the mechanism. The number of components in FLAPS is on the order of 20. 6 mm can be added to each end of the SMA element to make a through hole for the M3 fasteners.

Manufacturing

Figure 30:
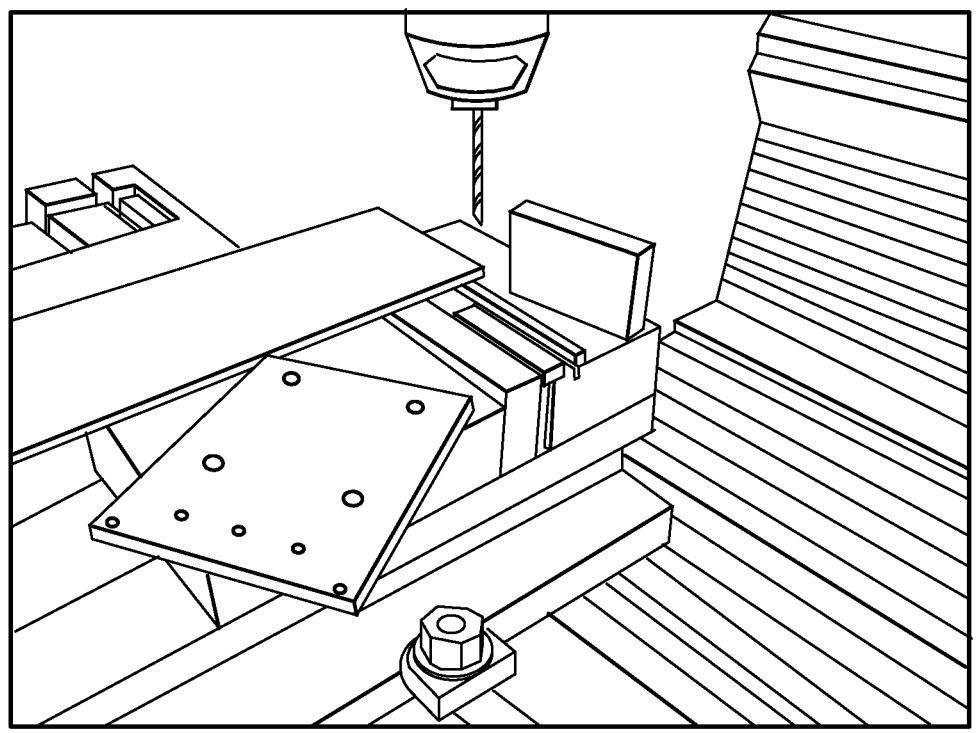
FIG. 30 shows the manufacture of the prototype CubeSat base member and stopper bar.

The SMA hinge apparatus prototype shown in FIG. 28 can be manufactured and assembled using various machining tools including, but not limited to, band saws, drill presses, and milling systems. The prototype can be assembled using various commercially off the shelf parts, such as standoffs and fasteners, and machinable raw materials, such as aluminum and PTFE machining stock. The 0.1 mm thick nickel-titanium alloy can be supplied as a 2"×4" foil. The thick components, such as the CubeSat base member and stopper bar, can be milled from aluminum as shown in FIG. 30.

Figure 31:
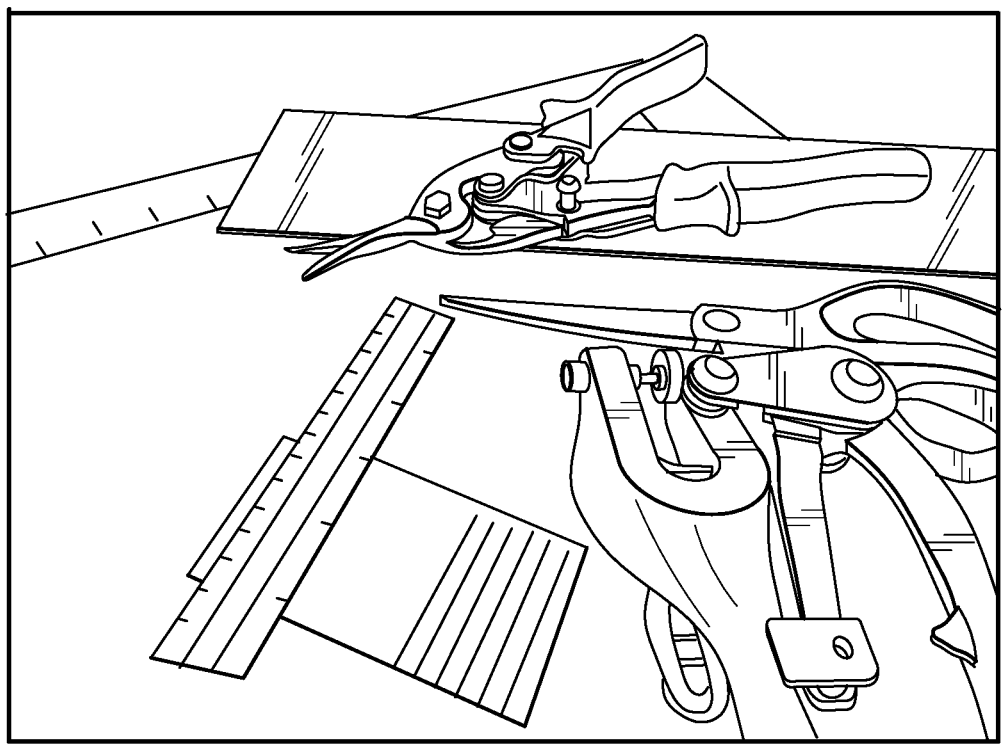
FIG. 31 shows the shaping of the SMA material using scissors and a sheet metal hole punch.

SMA elements can be sufficiently thin such that the SMA elements can be shaped via scissors or shears, as shown in FIG. 31. The desired dimensions of the SMA elements can be first marked by a pencil. The mounting holes can then be created with a Whitney hole punch. Finally, scissors can be used to release the SMA elements from the foil. The deployable structure can be manufactured via a similar method. In implementations where the thickness of the deployable structure is sufficiently larger than the SMA foil, shears can be used. The PTFE insulation can be cut from 1/16" PTFE sheet stock using shears. In some implementations, thinner PTFE washers can be utilized during ground testing. In some implementations, the through holes can be enlarged by over 0.5 mm from their nominal diameters on the CubeSat base member and deployable structure to ensure no electrical contact is made with the fasteners.

The low part number and simple manufacturing methods show the ease of building the SMA hinge apparatus. Almost all of the materials can be procured commercially and the manufacture of the remaining components can be simple. If a custom SMA geometry is desired, it can be easily cut with scissors or shears. This approach allows for rapid prototyping and testing with low risk. Once the SMA elements are released, the SMA elements can then be annealed, thus training the SMA elements to remember a memorized shape prior to assembly.

Annealing and Assembly

Figure 32:
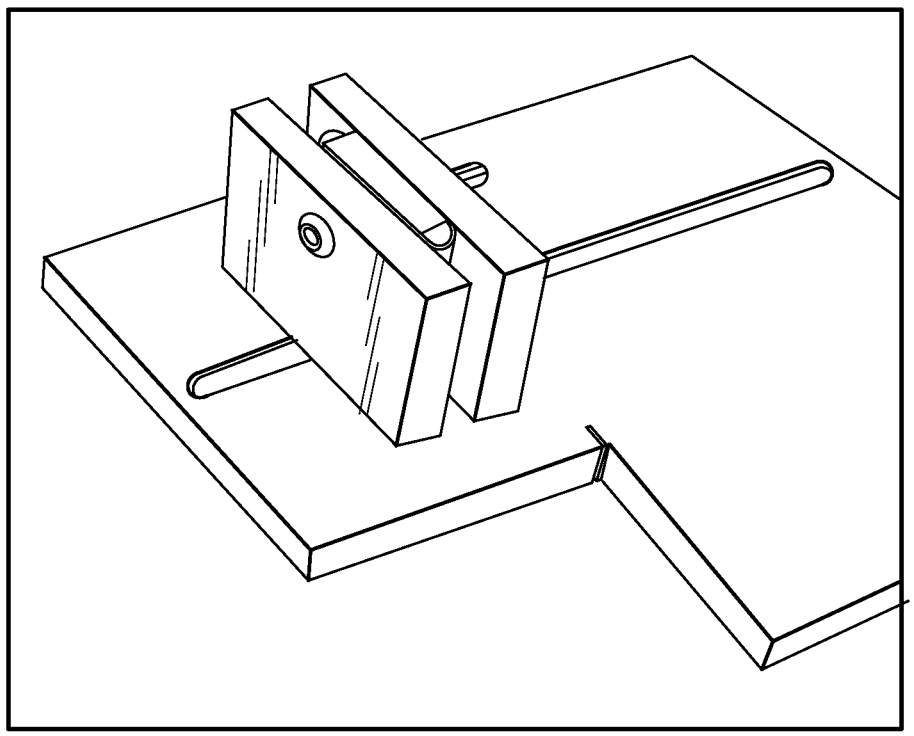
FIG. 32 shows the jig used to hold the SMA position during annealing.

A custom jig can be designed and built to hold the SMA element in a desired position and shape during annealing. An exemplary jig is shown in FIG. 32, which is comprised of a precision machined plate sandwiched between two other plates. The SMA material can be curved around the middle plate and the central bolt fastens both ends of the SMA element and all three jig plates together. The element can be annealed for 30 minutes and then quenched. The thickness of the middle piece can be used to set the SMA bend diameter. The outside plates ensure the element cannot bow out. The width of the middle plate can also be designed such that the bend is placed at the correct position along the element without creasing around the plate's corner.

The annealing temperature selection can be based on experiments by Sadiq et al. Higher annealing temperatures can cause greater hysteresis, but can also decrease the difference in the start and finish temperatures of each transformation. Annealing between 400° C. and 450° C. can yield the most recovery stress. The temperature should be kept below 450° C. to avoid a large increase in $M_f$. Pre-straining the element above 2.5-4.0% did not appreciable increase the recovery stress. Better recovery performance can occur for SMA elements annealed closer to 400° C. In some implementations, the temperature for the annealing process can be 420° C. to yield sufficient recovery performance and a sufficiently narrow hysteresis gap.

The jig can be formed from various materials with a sufficiently high melting temperature such that the jig remains substantially solid and rigid at the annealing temperature of the SMA element. Such materials can include, but are not limited to, various alloys of mild steel, which can exhibit a melting temperature of approximately 1300° C.

Figure 33:
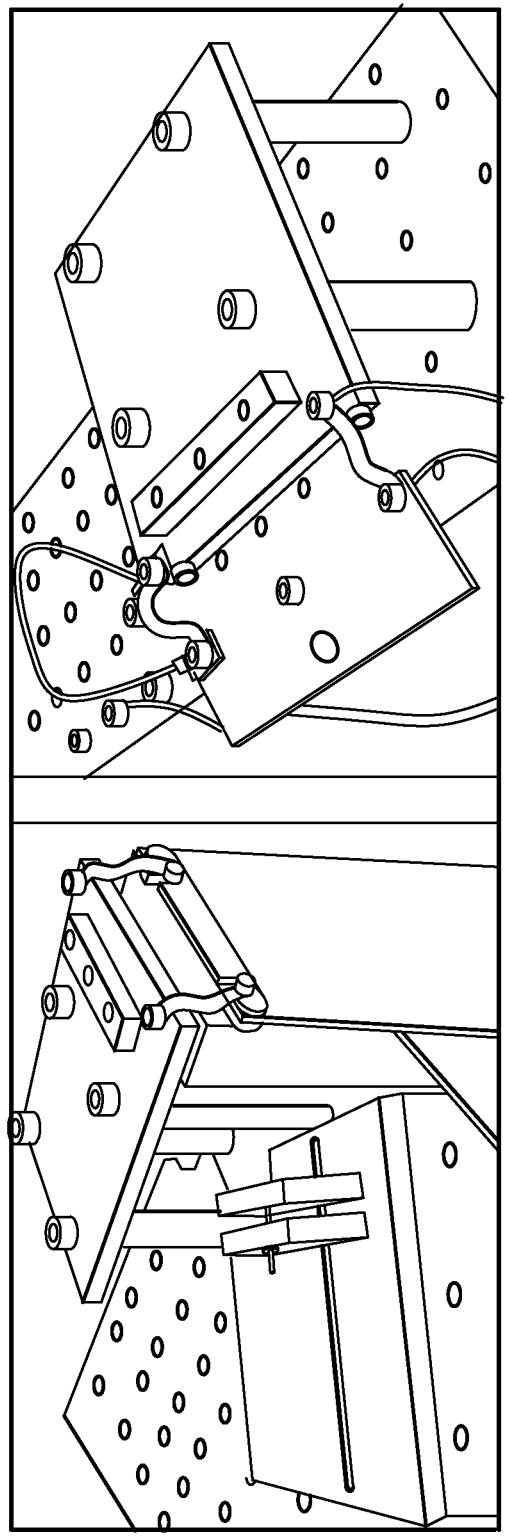
FIG. 33 shows the assembled SMA actuator prototype.

The prototype can be configured to improve ease of assembly based on the manufactured parts. An exemplary prototype is shown in FIG. 33. By using ductile SMA elements, the assembly process can be more robust. Wired connections can be used to transfer current.

The wires can be configured to have a weight and stiffness such that any mechanical resistance from the wires does not affect the motion of the SMA elements. For example, sufficiently thin wires can be used, which exhibit a low bending stiffness. Furthermore, the wires can be dimensioned such that the wires do not thermally affect the SMA elements nor do the wires appreciably heat up due to Joule heating when supplying a current.

The SMA elements can be fastened such that any twisting motion is reduced. The fasteners can be positioned such that the fasteners do not contact other metallic structures. The SMA element may exhibit discoloration when heated to sufficiently high temperatures, which can cause the emissivity to substantially vary. To compensate for such variability, the emissivity can be characterized.

A 3U structure emulating a CubeSat for the FLARE system can be used for testing. However, for ground level testing, gravity may prevent the actuator from being able to actuate a deployable surface. Smaller structures can instead be used for the purposes of verifying the motion and static performance of the prototype.

Ground Considerations

The shape memory material used in the prototype can be a nickel-titanium alloy. The alloy $Ni_{55}Ti$ can be purchased commercially off-the-shelf with an activation temperature of about 50° C. and a thickness of 0.1 mm. While the transformation temperature of this alloy would be too low for use in a mechanism configured for operation in space, such SMAs can be used for ground testing of the prototype.

Previous work was done to characterize the properties of $Ni_{55}Ti$ alloy by Dye, Liang, and Malafeew et al., which is summarized in FIG. 34. These properties can be used to design and validate the mechanism prototype. Some error can occur between the literature sources and the actual material used.

The start and finish activation temperatures for martensite are denoted as $M_s$, $M_f$ respectively. Similarly, the start and finish activation temperatures for austenite are denoted as $A_s$, and $A_f$ respectively. $\sigma_s^{cr}$ of is the critical stress to begin conversion of the martensite or austenite variants into detwinned martensite. $\sigma_f^{cr}$ of is the stress reached when no more recoverable strain is possible. A martensite or austenite variant at higher temperature can require a greater stress to detwin. $C_m$ and $C_a$ are constants that describe how the critical stresses increase with temperature.

Loading from Earth's Gravity

Loading from gravity can impair the performance of the SMA hinge apparatus prototype on the ground. Due to gravity, the mass of the fasteners, insulation, and wires can exert a non-negligible gravitational force that impedes the SMA element's movement. However, gravity can be utilized to analyze the performance of the mechanism and provide an estimate for the recovery bending moment. The assumptions used during the mechanism validation process can include the following. (1) The active element can substantially exert a bending moment about the x-axis. Thus, forces can only be transmitted in the y- and z-directions, not the x-direction. (2) All connections can be simply supported, thus the connections can transfer forces, but not moments. For example, the mass of the CubeSat can be sufficiently large such that the CubeSat-mechanism interface is approximately fixed. The CubeSat can resist torques and moments using integrated reaction wheels to prevent rotation. (3) The mechanism's center of rotation can be assumed to be fixed at the CubeSat edge, which is collinear with the x-axis.

Figure 35:
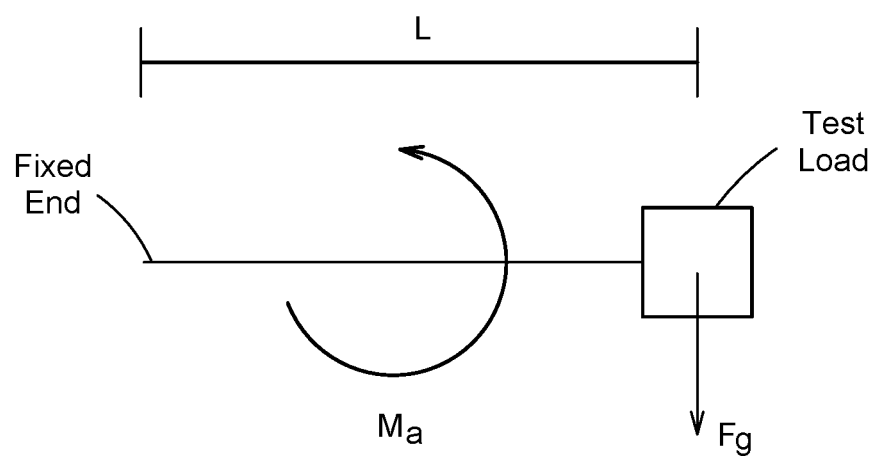
FIG. 35 is an illustration detailing the test used to evaluate the actuator recovery moment. The SMA element is in a horizontal position with one end fixed and the other being loaded by the test mass.

The mechanism can be considered to be under quasi-static loading from gravity in the $\theta=0$ position, as shown in FIG. 35. Upon summing the moments about the fixed end, the total actuation moment, $M_a$, can be related to the test mass:

$$\sum M_x = 0 = M_a - F_g L \qquad (54)$$

$$M_a = \frac{(E_a - E_m)wt^3}{6D} = m_{test}gL$$

$$m_{test} = \frac{(E_a - E_m)wt^3}{6DgL} =$$

$$\frac{(67{,}000 \text{ MPa} - 26{,}300 \text{ MPa})(6 \text{ mm})(0.1 \text{ mm})^3}{6(4.5 \text{ mm})\left(9.8\frac{m}{s^2}\right)(20 \text{ mm})}$$

$$m = 0.046 \times 10^{-3} \text{ kg} = 46 \text{ g}$$

where the simple bending model from the trade study is used for the recovery moment and $M_a$ incorporates the recovery moment from the active element and the resistance from the passive partner. $m_{test}$ is the test mass at the actuator's free end and the mass of the SMA element has been neglected. The actuator can support a test mass of 46 grams when in the horizontal $\theta=0$ position under these conditions. The total bending moment is predicted to be 9.0 mNm during recovery for these conditions.

Deployable Structure Twisting

The forces from the SMA elements can be equal and opposite, creating moment couples about the y- and z-axes. The SMA elements and structure can be much wider in the x-direction than they are thick in the y-direction such that an asymmetry of stiffness is created. The entire actuator mechanism can be configured to be resistant to twisting about the y-axis, thus only rotations about the x-axis and z-axis need to be considered. Deflection about the x-axis due to atmospheric drag was discussed earlier. Twisting of the deployable structure about the z-axis will now be discussed.

Figure 36:
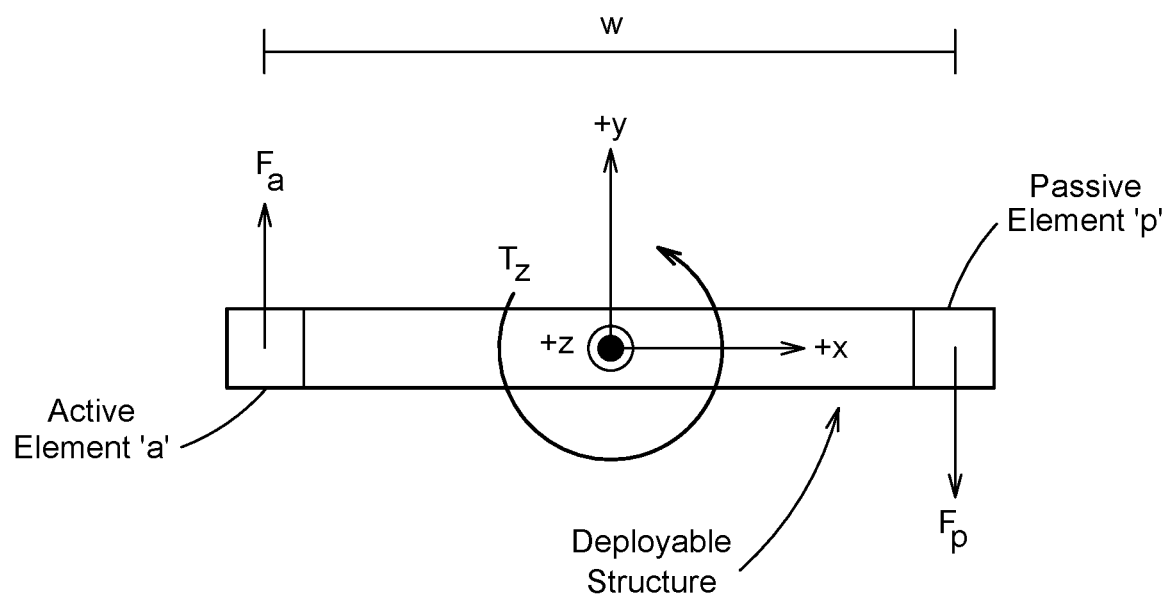
FIG. 36 is an illustration of a free body diagram of the deployable structure during actuation to evaluate twisting. One SMA element activates and imparts a force that is counteracted by the passive element, creating a moment couple.

FIG. 36 shows an end-on view of the deployable structure, which can be a thin panel in some implementations. The quasi-static torque, $T_z$, represents the moment couple caused by the forces $F_a$ and $F_p$. The forces can be equal and opposite in the quasi-static case, resulting in a larger moment couple. The actuator mechanism can be assumed to be at the $\theta=0$ position such that the forces act only in the y-direction. The largest force can be generated when the actuator is blocked from moving, e.g., when the forces are equal to $F_{test}=m_{test}g$. The sum of moments about the z-axis is then:

$$\sum M_z = T_z = F_{y,a}\frac{w}{2} - F_{y,p}\frac{w}{2} \quad (55)$$

$$F_{y,a} = -F_{y,p} = F_{test}$$

$$T_z = F_{est}w = (0.046 \times 10^{-3} \text{ kg})\left(9.8\frac{\text{m}}{\text{s}^2}\right)(88 \text{ mm}) = 40 \text{ mNm}$$

where w is the width of the structure, which is approximately equal to the spacing between the SMA elements.

A torque can create shear stresses in the SMA material that cause it to twist. The largest shear stress, $\tau_{max}$, and angular twist, $\vartheta$, are equal to:

$$\tau_{max} = \frac{3T_z}{wt^2} \quad (56)$$

$$\vartheta = \frac{\tau_{max}w}{Gt}$$

$$G = \frac{E}{2(1+v)}$$

$$\vartheta = \frac{3T_z}{wt^2}\frac{2(1+v)}{E}\frac{w}{t}$$

$$\vartheta = \frac{6T_z(1+v)}{Et^3} = \frac{6(40 \text{ N mm})(1+(0.33))}{(69,000 \text{ MPa})(1 \text{ mm})^3} = 4.6 \times 10^{-3} \text{ rad} = 0.27°$$

where an aluminum structure with a 88×1 mm² cross-section is assumed. $\vartheta$ is the angular twist in radians, G is the shear modulus of the material, and v is its Poisson's ratio. Since the aluminum structure is thick, twisting is negligible. However, twisting should be considered if a thinner or nonmetallic deployable structure is used.

Thermal Environment

The environment used for ground testing, e.g., a laboratory environment, can include natural convection in air and radiation to the surrounding environment. Due to the small temperature difference between the room and the activation temperature of the ground testing SMA, a modified radiation heat coefficient can be calculated with respect to the room temperature:

$$h_{r,gt} = 4\sigma_{sb}T_M^3 \quad (57)$$

$$h_{r,gt} = 4\left(5.67 \times 10^{-14} \frac{\text{W}}{\text{mm}^2 \text{ K}^4}\right)(308 \text{ K})^3$$

$$h_{r,gt} = 6.6 \times 10^{-6} \frac{\text{W}}{\text{mm}^2 \text{ K}} = 6.6 \frac{\text{W}}{\text{m}^2 \text{ K}}$$

where $T_M$ is the mean temperature between the ground testing SMA activation temperature, $T_{gt}$, which is approximately 323 K, and the temperature of the laboratory, $T_\infty$, which is approximately 293 K.

To calculate the convection heat coefficient, $h_c$, a Nusselt number correlation for natural convection can be used. A correlation for the top side of a horizontal flat plate and another correlation for the bottom side can be used since gravity and buoyancy drive the free convection. The Nusselt number is generally a function of the Prandtl number and the Grashof number for natural convection.

The Prandtl number is a dimensionless number that compares the viscosity of the convection medium to the conduction of heat through it. The properties are taken at the temperature $T_{gt}$ and the Prandtl number is:

$$Pr = \frac{c_p\mu}{k} \quad (58)$$

$$Pr = \frac{\left(1.0\frac{\text{J}}{\text{g K}}\right)\left(2.0 \times 10^{-2}\frac{\text{g}}{\text{m s}}\right)}{28 \times 10^{-3}\frac{\text{W}}{\text{m K}}}$$

$$Pr = 0.71$$

The Grashof number is a dimensionless number that compares the buoyancy force to the viscosity of the convective medium. The Grashof number along the SMA element's length is:

$$Gr_L = \frac{g\beta(T_{gt} - T_\infty)L^3}{v^2} \quad (59)$$

$$Gr_L = \frac{\left(9.81\frac{\text{m}}{\text{s}^2}\right)\left(\frac{1}{323 \text{ K}}\right)(323 \text{ K} - 293 \text{ K})(0.020 \text{ m})^3}{\left(1.8 \times 10^{-5}\frac{\text{m}^2}{\text{s}}\right)^2}$$

$$Gr_L = 22,000$$

where g is the gravitational constant, β is the volumetric thermal expansion coefficient, which can be approximated as $1/T_{gt}$, and v is the kinematic viscosity.

Correlations for the Nusselt number are typically given for either laminar or turbulent conditions. The Rayleigh number, which is the product of the Grashof and Prandtl numbers, is used to distinguish between the two flow conditions and can be calculated as:

$$Ra_L = Gr_L Pr = (22,000)(0.71) = 16,000 \quad (60)$$

For upward convection on the top surface, the Nusselt number can be expressed as:

$$Nu_{L,up} = 0.54Ra_L^{1/4} = 0.54(16,000)^{1/4} = 6.1 \quad (61)$$

which is valid for $10^4 < Ra_L < 10^7$. The Nusselt number for the downward facing surface is:

$$Nu_{down} = 0.52Ra_L^{1/5} = 0.52(16,000)^{1/5} = 3.6 \quad (62)$$

which is also valid for $10^4 < Ra_L < 10^7$.

The Nusselt number can then be related to the heat transfer coefficient:

$$Nu_L = \frac{h_c L^*}{k} = \frac{h_c(A_s/P)}{k} \quad (63)$$

$$h_{c,up} = \frac{Nu_{L,up}k_{air}}{(wL/2w)} = \frac{(6.1)\left(28 \times 10^{-3}\frac{\text{W}}{\text{m K}}\right)}{(0.020 \text{ m})/2}$$

$$h_{c,up} = 17\frac{\text{W}}{\text{m}^2 \text{ K}} = 17 \times 10^{-6}\frac{\text{W}}{\text{mm}^2 \text{ K}}$$

$$h_{c,down} = \frac{Nu_{L,down}k_{air}}{(wL/2w)} = \frac{(3.6)\left(28 \times 10^{-3}\frac{\text{W}}{\text{m K}}\right)}{(0.020 \text{ m})/2}$$

$$h_{c,down} = 10\frac{\text{W}}{\text{m}^2 \text{ K}} = 10 \times 10^{-6}\frac{\text{W}}{\text{mm}^2 \text{ K}}$$

where L* is the characteristic length used for the correlation. $A_s$ is the surface area of one side, P is the wetted perimeter, and the thermal conductivity of the air is used.

These heat transfer coefficients for natural convection can then be used in a heat equation describing the heat up case in the environment. The convective and radiation losses are both related to the same reference temperature, allowing the heat equation to be simplified by adding:

$$\dot{U} = \dot{Q}_{Joule} + \dot{Q}_{cond} + \dot{Q}_{conv} + \dot{Q}_{rad} \tag{64}$$

$$5\text{ mm}(\rho_d A dl)c_a \frac{dT}{dt} = \frac{I^2 \rho_e dl}{A} + \frac{d}{dl}\left(kA\frac{dT}{dl}\right)dl - (Pdl)(T - T_\infty)$$

$$\frac{dT}{dt} = \frac{I^2 \rho_e}{A^2 \rho_d c_a} + \frac{k}{\rho_d c_a}\frac{d}{dl}\left(\frac{dT}{dl}\right) - \frac{w(h_{c,up} + h_{c,down} + 2h_{r,gt})}{A\rho_d c_a}(T - T_\infty)$$

$$\frac{dT}{dt} = \frac{I^2 \rho_e}{A^2 \rho_d c_a} + \alpha \frac{d}{dl}\left(\frac{dT}{dl}\right) - \frac{h_{c,up} + h_{c,down} + 2h_{r,gt}}{t\rho_d c_a}(T - T_\infty)$$

and the dimensionless variables are selected as:

$$\bar{\Theta} = \frac{T - T_\infty}{T_{max} - T_\infty} \ldots d\bar{\Theta} = (T_{max} - T_\infty)dT \tag{65}$$

$$\bar{t} = \frac{\alpha t}{L^2} = Fo \ldots d\bar{t} = \frac{\alpha}{L^2}dt$$

$$\bar{l} = \frac{l}{L} \ldots d\bar{l} = \frac{1}{L}dl$$

so that the dimensionless equation can be rewritten as:

$$\frac{dT}{dt} = \frac{I^2 \rho_e}{A^2 \rho_d c_a} + \alpha \frac{d}{dl}\left(\frac{dT}{dl}\right) - \frac{h_{c,up} + h_{c,down} + 2h_{r,gt}}{t\rho_d c_a}(T - T_\infty) \tag{66}$$

$$\frac{(T_{max} - T_\infty)d\bar{\Theta}}{\left(\frac{L^2}{\alpha}d\bar{t}\right)} = \frac{I^2 \rho_e}{A^2 \rho_d c_a} + \alpha \frac{d}{(Ld\bar{l})}\left(\frac{(T_{max} - T_\infty)d\bar{\Theta}}{Ld\bar{l}}\right) -$$

$$\frac{h_{c,up} + h_{c,down} + 2h_{r,gt}}{t\rho_d c_a}(T_{max} - T_\infty)\bar{\Theta}$$

$$\frac{d\bar{\Theta}}{d\bar{t}} = \frac{d^2\bar{\Theta}}{d\bar{l}^2} - \frac{L^2}{\alpha}\frac{h_{c,up} + h_{c,down} + 2h_{r,gt}}{t\rho_d c_a}\bar{\Theta} + \frac{L^2}{\alpha(T_{max} - T_\infty)}\frac{I^2\rho_e}{A^2\rho_d c_a}$$

$$\frac{d\bar{\Theta}}{d\bar{t}} = \frac{d^2\bar{\Theta}}{d\bar{l}^2} - \delta\bar{\Theta} + j$$

The constants are:

$$\alpha = \frac{k_a}{\rho_d c_a} = \frac{\left(18 \times 10^{-3}\frac{W}{mm\,K}\right)}{\left(6.45 \times 10^{-3}\frac{g}{mm^3}\right)\left(1.0\frac{J}{g\,K}\right)} = 2.8\frac{mm^2}{s} \tag{67}$$

$$j = \frac{L^2}{\alpha(T_{max} - T_\infty)}\frac{I_{lab}^2 \rho_{e,m}}{A^2 \rho_d c_a}$$

$$j = \frac{(20\text{ mm})^2}{\left(2.8\frac{mm^2}{s}\right)(500\text{ K} - 293\text{ K})}$$

$$\frac{(6.0\text{ A})^2(80 \times 10^{-5}\,\Omega\text{ mm})}{(0.6\text{ mm}^2)^2\left(6.45 \times 10^{-3}\frac{g}{mm^3}\right)\left(1.0\frac{J}{g\,K}\right)} = 8.6$$

$$\delta = \frac{L^2}{\alpha}\frac{h_{c,up} + h_{c,down} + 2h_{r,gt}}{t\rho_d c_a}$$

$$\delta = \frac{(20\text{ mm})^2}{2.8\frac{mm^2}{s}} \frac{[17 \times 10^{-6} + 10 \times 10^{-6} + 2(6.6 \times 10^{-6})]\frac{W}{mm^2\,K}}{(0.1\text{ mm})\left(6.45 \times 10^{-3}\frac{g}{mm^3}\right)\left(1.0\frac{J}{g\,K}\right)} = 8.9$$

and the ICs and BCs are:

$$IC:\ \bar{\Theta}(\bar{t} = 0, \bar{l} = l) = \frac{T_0 - T_\infty}{T_{max} - T_\infty} = \frac{293\text{ K} - 293\text{ K}}{500\text{ K} - 293\text{ K}} = 0 \tag{68}$$

$$BC:\ \bar{T}(\bar{t} = t, \bar{l} = 0) = \frac{T_\infty - T_\infty}{T_{max} - T_\infty} = 0$$

$$BC:\ \bar{T}(\bar{t} = t, \bar{l} = 1) = \frac{T_\infty - T_\infty}{T_{max} - T_\infty} = 0$$

Figure 37A:
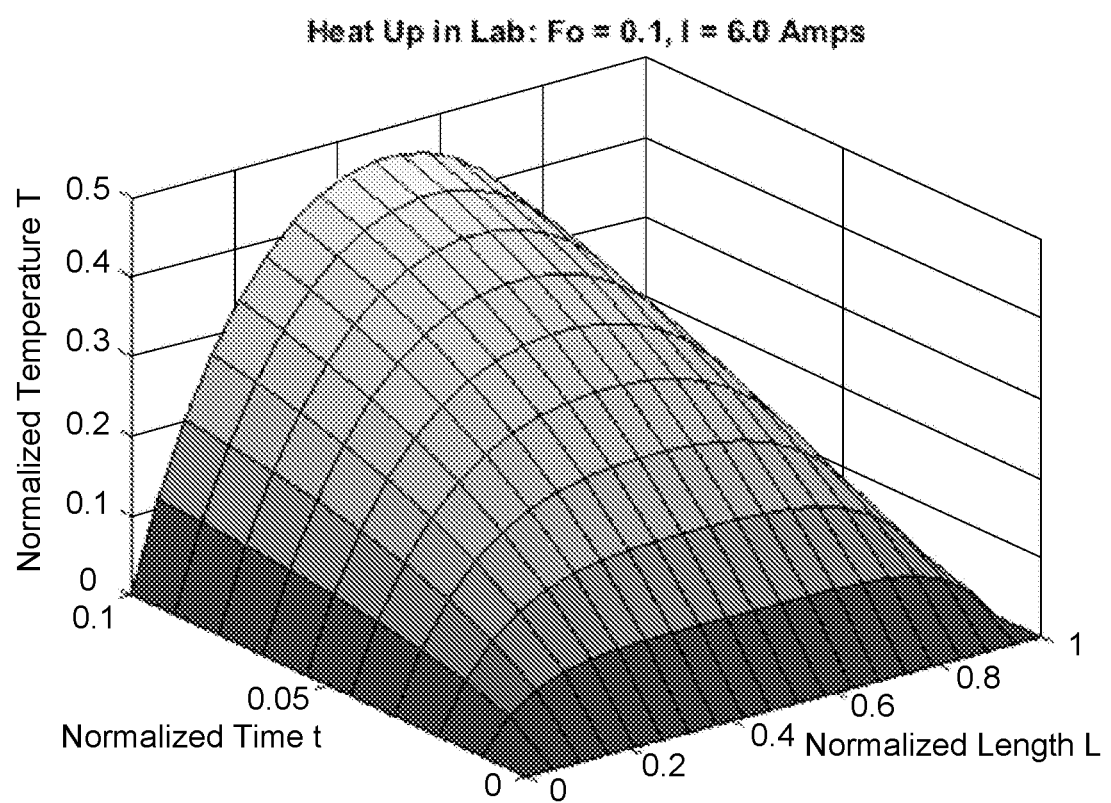
FIG. 37A shows a transient solution to the heat equation during SMA activation for ground testing with a current of 6 A. A dimensionless temperature of 0.15 implies the element will activate.
Figure 37B:
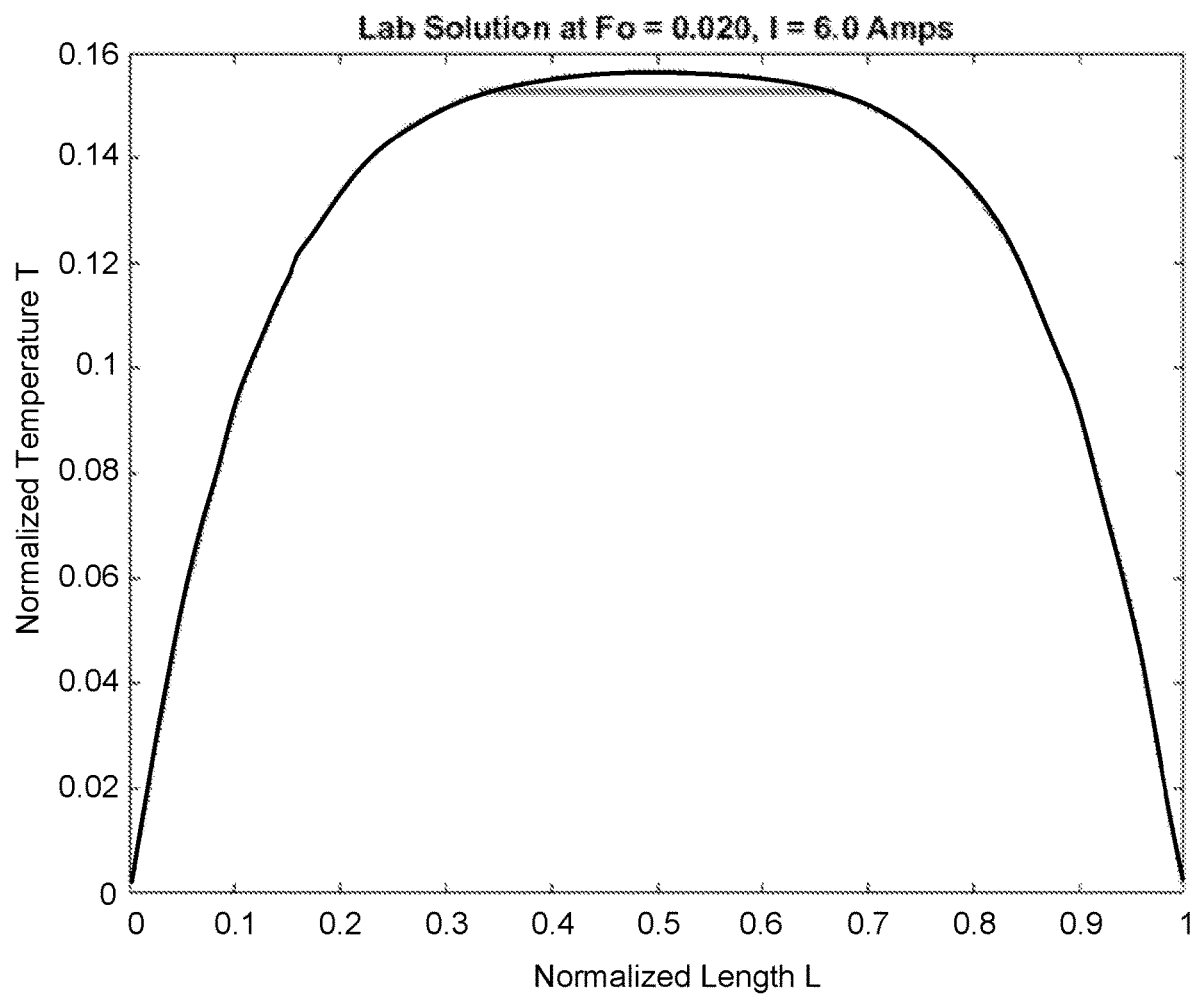
FIG. 37B shows the predicted temperature distribution along the SMA element during activation with a current of 6 A. The portion of the SMA that has been trained to bend is highlighted. The low Fourier number implies actuation is almost immediate.

The heat equation with radiation and free convection in the environment can then be solved numerically. FIG. 37A illustrates the temperature rise for an exemplary current input of 6 A. For these conditions, the dimensionless temperature at the center can reach a value as high as 0.45, which equals 386 K or 113° C. This is above the activation temperature of 50° C. The temperature distribution for a Fourier number of 0.020, which corresponds to when the center of the element is activating with a dimensionless temperature of 0.15, is shown in FIG. 37B. The Fourier number can be used to estimate the activation time in the environment, $t_{lab}$, which is equal to 2.9 seconds. The activation time under these conditions is an upper limit.

Testing

Ground testing can be conducted to assess whether the prototype SMA actuator can satisfy the requirements in FIG. 4 for the exemplary case of the SMA hinge apparatus. Requirements 1 through 4 can be validated by activating the mechanism between the θ=0 and θ=π/2 positions and measuring the performance of the actuator. Requirements 5 and 6 can be validated by measuring the mass and stowage height of the mechanism. Finally, the power draw and temperature of the mechanism can be measured to validate presented theoretical designs for Requirements 7 and 9.

Performance

Figure 38B:
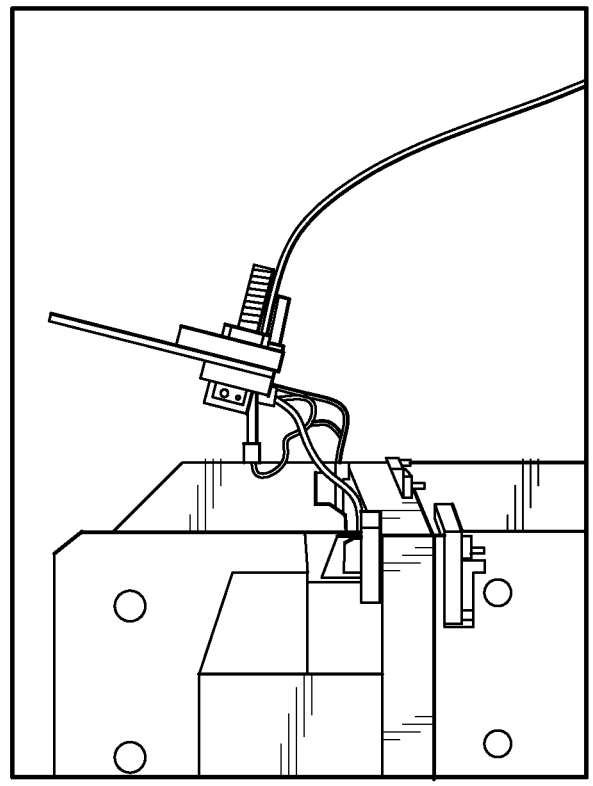
FIG. 38B shows the SMA actuator from FIG. 38A moved to the θ=π/2 position.
Figure 38A:
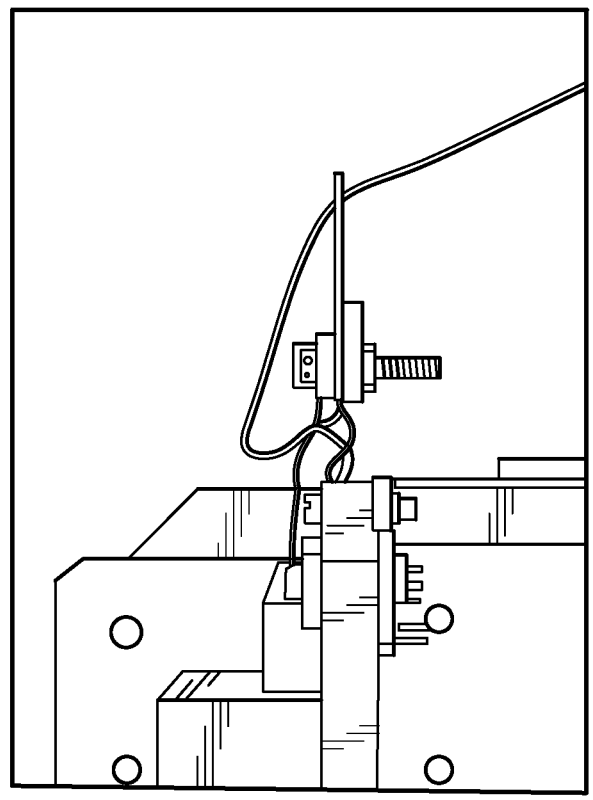
FIG. 38A shows the SMA actuator in the θ=0 position. The bottom element is activated and is in its bent shape. The top element provides a resisting force and can be used to drive motion in the other direction, as implied by its opposite curvature.

Requirements 1 and 2 can be validated by actuating the mechanism from its closed configuration to its open configuration. As shown in FIGS. 38A and 38B, the exemplary prototype SMA actuator can move the deployable structure in the gravity environment. Since there is negligible frictional contact in the actuator mechanism, the actuator is expected to move the deployable structure in a space environment. However, the elements did not yield as intended and the position of the deployable structure was not maintained passively. This can be attributed to the passive element acting as a bias spring instead of as an antagonistic partner. This can occur due to the increased length of the SMA element, as suggested by the transient thermal analyses, which provides additional compliance to the SMA element. The activation time was measured to be roughly 2 seconds, which is similar with the upper estimate of 2.9 seconds.

To measure the recovery moment of the SMA actuator, the actuator mechanism can be loaded under the force of gravity. A test mass comprised of metal fasteners can be hung from the deployable structure. The SMA element can then be heated with 1 to 6 A of current. The experiment can thus be used to determine the highest test mass that can be supported in a completely horizontal position. The highest test mass can then be measured on a scale. The SMA element was cooled with ice water prior to each measurement to ensure the SMA element was a substantially martensitic phase prior to activation.

An image of the experiment for an exemplary prototype SMA actuator is shown in FIGS. 39A and 39B and the results are given in FIG. 40. Note that the masses of the mechanism fasteners, insulation, and deployable structure, which are about 3.3 g total, are included in the test mass column. Equation 54 can be used to calculate the recovery moment from the test mass. Using Equation 25 and the properties in FIG. 34, the bending moment is predicted to be 4.5 mNm for a full transformation.

The measured bending moments from FIG. 40 match the predicted value when the SMA element is fully activated. This shows that the simplified bending model is an adequate first-order estimate. Uncertainties in the material properties and SMA element geometries can contribute to the error between the two values.

The temperatures listed in FIG. 40 correspond to the highest temperatures measured with an infrared thermometer at the center of the stowage element. Note that these temperatures cannot be correlated to the thermal model because they were measured when the mounting interfaces had an elevated temperature due to prolonged testing of the mechanism. Nonetheless, the measurements show that no activation occurs below the austenite start temperature, which is around 30° C. to 35° C. As the material is heated through the transformation regime, the recovery moment increases until the element is completely austenite. At this point, the highest recovery moment can be generated. Continued heating of the SMA element has no further effect. These results show that an infinitesimally small torque can be generated if the temperature of the element is well controlled.

Figure 41:
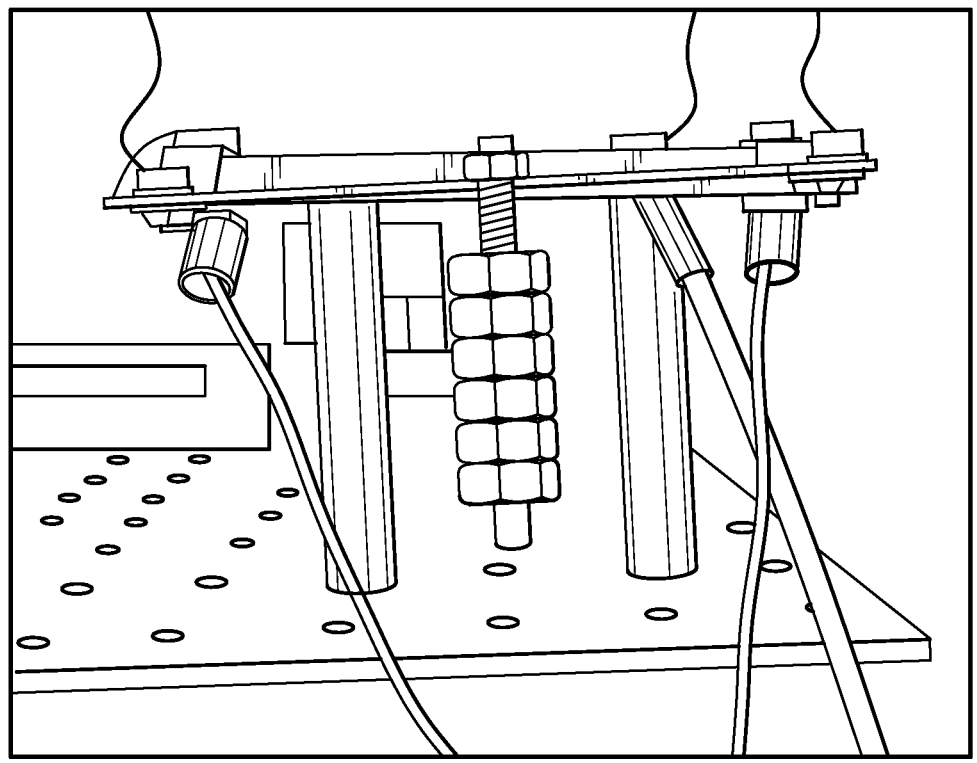
FIG. 41 shows that the twisting of the deployable member can be observed during activation. The element on the right, the stowage SMA element, is actuated while the element on the left, the deployment element, provides a resisting force.

Twisting of the deployable structure was observed as shown in FIG. 41. The prototype SMA elements were used to perform the moment measurements and were then observed end-on. As predicted, a small twisting of the structure was observable. If the SMA elements are designed to exert more force, or the structure is made less stiff, twisting should be re-evaluated.

Size and Weight

Figure 42:
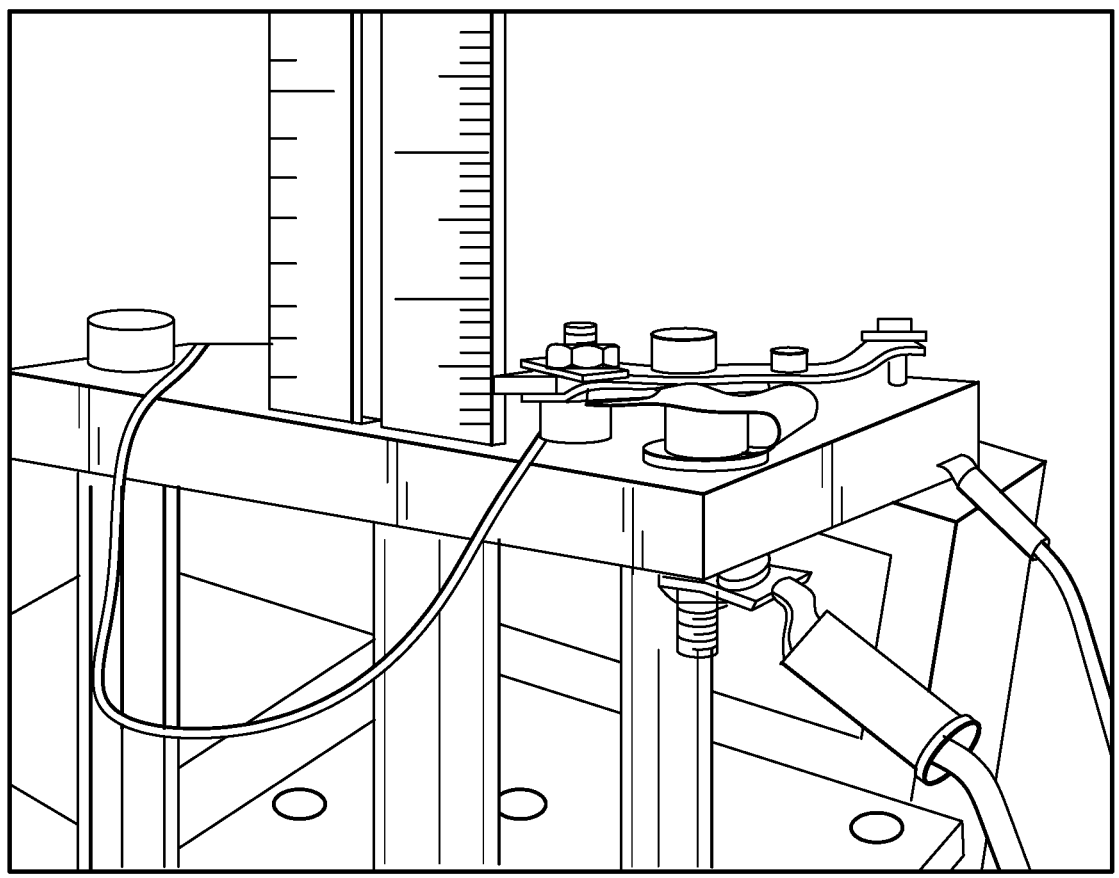
FIG. 42 shows the stowage height of the SMA actuator mechanism as measured with a ruler.

The stowage height of the mechanism can be measured as shown in FIG. 42. The prototype was able to stow within 8.5 mm normal to the CubeSat base member. 3 mm of height is attributed to the bolt head, 0.75 mm to each washer, 1 mm to the deployable structure, 2 mm to the nut, and 1 mm to the extra length on the end of the bolt. Although this is above the 6.5 mm height set by Requirement 5, it can be reduced. Utilization of ultra-low bolt heads will save 2 mm of height, and 1 mm can be saved by sizing the bolt length correctly. This pushes the theoretical stowage height down to 5.5 mm, which can satisfy the requirement. If additional clearance is necessary, the SMA element mounting location can be offset onto the CubeSat main body.

Figure 43:
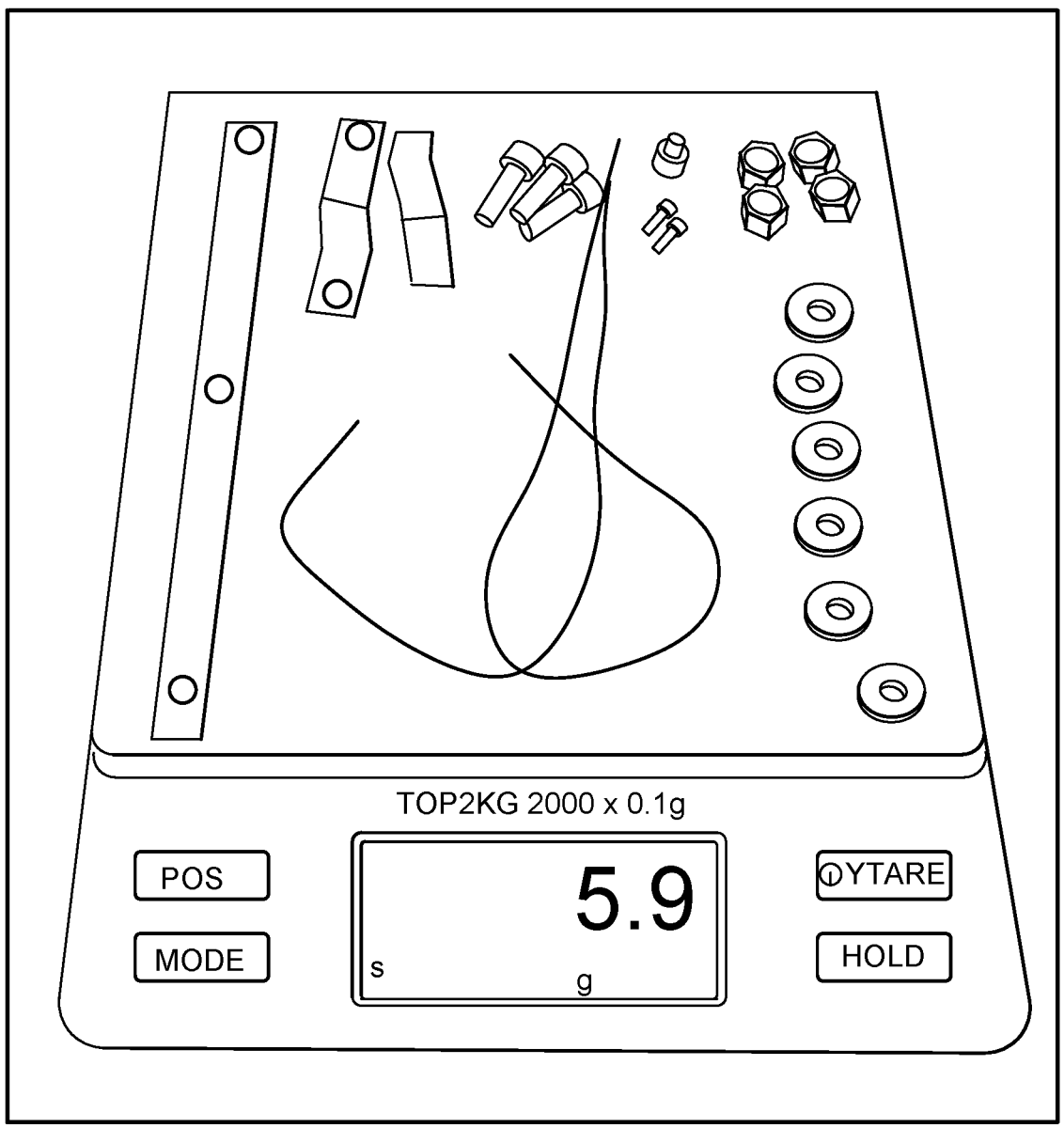
FIG. 43 shows the mass of the mechanism as measured on a scale. The difference in SMA element size was due to manufacturing errors.

The mass of the mechanism is measured to be 5.9 grams, as shown in FIG. 43, which validates Requirement 6. The mass of each SMA element is about 50 mg, the mass of the fasteners is about 4 g, and the deployable structure pictured is 1.5 g. Alternative methods to fasten the SMA elements, such as adhesives and press fits, can greatly reduce the mass of the mechanism. Only six insulating washers are shown because the mechanism can be mounted directly to an electrical contact on a PCB.

Power and Temperature

Figures 44, 45:
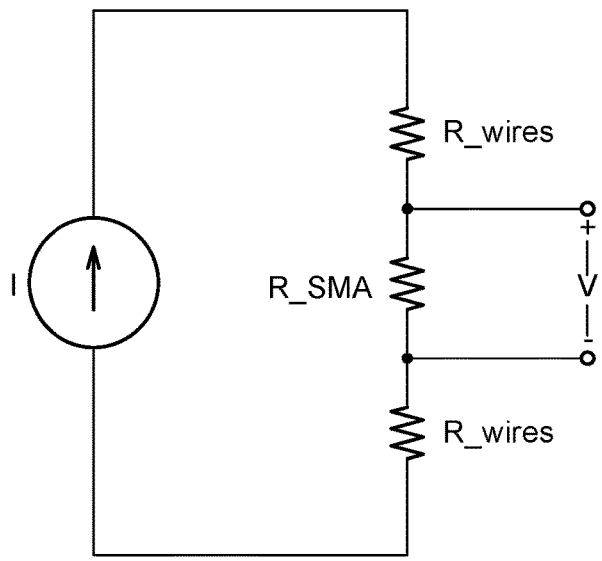
FIG. 44 shows an exemplary circuit diagram used to measure the electrical resistance and Joule heating of the SMA element.
FIG. 45 is a table detailing the predictions and results of power measurements during activation with 3 A.

The SMA element, while still integrated with the actuator mechanism, is connected directly in series with an electrical power supply using 1 mm thick copper wiring such that the wires do not affect the electrical circuit. A current input of 3 A, measured by the power supply, is applied and the voltage across the element is measured by a multimeter placed in parallel to the circuit. An exemplary circuit diagram to test the SMA element is shown in FIG. 44. By multiplying the voltage applied across the SMA element to the current passing through the SMA element, the thermal power for Joule heating can be calculated. Ohm's law is used to calculate the electrical resistance. Integrating the power draw by the activation time yields the energy consumption of an activation cycle. The results are tabulated in FIG. 45.

The current through the prototype SMA element can be as large as 8 A for the exemplary SMA hinge apparatus. However, the power supply only needs to provide about 1 V due the SMA element's low electrical resistance. In this manner, various electrical hazards can be reduced, thus the prototype SMA actuator can be operated and handled without special precautions. For this exemplary SMA actuator prototype, the only hazard that may arise is the high temperatures of the SMA elements.

The austenite electrical resistivity can be used to predict the resistance and power draw. The test results yield resistance and power draw values that are approximately twice as large as the predictions. This may suggest additional characterization of the nitinol electrical resistivity is needed, or a different circuit, such as a Wheatstone bridge, can be used for the electrical measurements. The thermal model can be evaluated and verified based on temperature measurements to assess the Joule heating provided to the SMA elements.

Temperatures at three different points along the SMA element can be measured. First, the SMA element was allowed to cool to room temperature. Then the SMA element was activated with 6 A of current. The temperature was measured with an infrared thermometer at the center and at both ends of the SMA element. The results are tabulated in FIG. 46, with the '1' position being near the CubeSat mount, the '2' position in the middle of the SMA element, and the '3' position at the deployable structure mount.

The difference in temperatures at the SMA element center can be due to a difference in the SMA element geometry, which can be caused by manufacturing errors. The larger deployment element exhibits a lower peak temperature as expected. The SMA ends nearest the point of attachment to the deployable structure were higher in temperature than the ends near the CubeSat base plate. This occurred because heat could not be readily conducted through the small structure, creating an elevated temperature at one boundary. To compensate for this effect, the mechanism was cooled to room temperature prior to testing and then the temperature was quickly measured shortly after steady state activation was reached.

The measurements at the center of the elements were less than the 113° C. predicted by the model. This can be explained for the following reasons: (1) The temperature was measured with an IR thermometer, which works best when the component being measured is a black body. The emissive properties of the nitinol element are not well known and the element changed colors slightly during activation, so there may have been measurement errors due to variations in emissivity. A black paint can be applied to the element to raise its emissivity, but special care must be taken to use a temperature-resistant coating. (2) The radiation heat transfer coefficient used in the model was normalized at a temperature lower than the peak temperature reached by the SMA element. This means that the radiation in the model underestimated actual radiative losses during ground testing. This can lead to a higher prediction of the temperature in the model. (3) The SMA elements were small so it was difficult to maintain pointing of the IR thermometer onto one spot. The temperatures measured are thus approximate.

Given these effects, the measured temperature of 95° C. can be considered sufficiently close to the predicted temperature of 113° C., thus validating the thermal model. This suggests the various theoretical models to predict the performance of the SMA actuator is verified and the actuator mechanism meets Requirement 9. Since the thermal model has been validated, the energy consumption of 0.01 Whr per activation predicted can be accepted, which satisfies Requirement 7.

Active Cooling

The control bandwidth can be limited by the cool down time needed to transform the SMA element from austenite to martensite, which can thus reset the actuation mechanism. Implementing active cooling, e.g., using a thermoelectric cooler, can be used to reduce the cool down time and thus increase the activation frequency. For the exemplary SMA hinge apparatus, the activation frequency is predicted to be on the order of once per minute. Active cooling can be used to improve the precise positional control of the SMA actuator to track an object. Active cooling can also provide a better means to control the temperature of the SMA element. Many applications of thermoelectric coolers to SMA actuators are discussed in the literature.

Extension to Smaller Satellites

The SMA actuator can be used in various actuation systems, including satellites smaller than a CubeSat, e.g., ChipSats and FemtoSats. For such satellites, the smallest electromagnetic actuators can be prohibitively large for such systems. An SMA actuator can be manufactured to have sufficiently small geometries using various micromachining techniques. A press-fit or adhesive can be used in lieu of fasteners to reduce the form factor of such SMA actuators.

For such small platforms, the performance of the SMA actuator can be affected by the thermal environment. For example, the mass of the satellite may be sufficiently small such that the temperature of the satellite can substantially vary during orbit. Therefore, a combined satellite-SMA system can be used in a thermal model to properly capture the thermal performance for such systems.

Extension to Bigger Satellites

The SMA actuator can be used in various actuation systems, e.g., FLAPS, including satellites larger than a CubeSat. For example, larger satellite platforms, such as small sats, can have a total mass on the order of tens or hundreds of kilograms. Such large satellites have already reached technological maturity and can use electromagnetic actuators to drive their solar array assemblies. These motors can be geared to provide very high stiffness and have positional control implemented, either via a stepper motor or an encoder. Although the SMA actuator in the SMA hinge apparatus may not provide benefit in terms of a reduced volume, small sats can still benefit from the decreased mass, faster manufacturing, and robust assembly of SMA actuators. The SMA actuator in the SMA hinge apparatus can be dimensioned and shaped to provide sufficient actuator stiffness and improved control by implementing a control feedback system. The SMA elements can be activated using external heaters as the cross-section of the SMA elements may be too large for Joule heating to be used unless the electrical power system onboard the satellite can supply sufficiently high current.

Summary of Example Performance Metrics and Specifications

In view of the foregoing disclosure, it may be readily appreciated that an SMA hinge apparatus accomplishes a variety of performance goals with a variety of desirable performance metrics and specification. For example, the SMA hinge apparatus can rotate to objects relative to one another by 90 degrees ($\pi/2$ radians) using Joule heating and without significant frictional contact, with the SMA elements of the hinge apparatus providing relatively small moments on the order of 1-5 mNm (e.g., 4 mNm); thus, the SMA hinge apparatus can deliver less torque during activation than the reaction wheels of a satellite can provide, thus allowing the reaction wheels to counteract the SMA hinge apparatus and keep the bus stable. Additionally, deflection of a deployable structure upon actuation is significantly mitigated, with deployed structures modeled to deflect about 4.4 degrees (due to the molecular drag force on-orbit) and twist by about 0.27 degrees (due to the SMA force couples). A stowage height of an example SMA hinge apparatus prototype was 8.5 mm with a mass of about 6 grams. An SMA hinge apparatus prototype also is modeled to require 0.01 Whr of energy per actuation, and can operate with a CubeSat bus temperature from −30° C. to +70° C. Power draw to activate the hinge apparatus is estimated at 1 W, with heat up and cool down times of approximately 30 and 60 seconds respectively. Furthermore, by limiting the maximum strain of an SMA element to 2.2% during annealing and 1.1% during operation, it is estimated that at least 100,000 open and close cycles can be effected by the SMA hinge apparatus.

Differential Drag Management and Constellation Phasing

As noted earlier, one or more SMA hinge apparatus according to the inventive concepts disclosed herein may be coupled to a spacecraft and one or more deployable structures, and respective SMA hinge apparatus may be actuated individually or in tandem to open (deploy) and close (stow) one or more of the deployable structures, which creates a difference in drag force on the two satellites and allows them to control their relative orbits. In various aspects, the open configuration allows for high drag and good power generation at low sun-Earth Beta angles. It is also used for deorbit. The half-open configuration allows for good power generation at all Beta angles. It is used for nominal cruising. The closed configuration allows for low drag and good power generation at high Beta angles. It is also used to extend mission lifetime.

Thus, one or more SMA hinge apparatus may be operated to close and open the drag surfaces on one of the CubeSats to allow it to separate from the other satellite. Then the other satellite matches these actions to stabilize the separation distance. The concept of operations is:

The satellites are deployed together, and then separate via differential drag. They both enter the half-open configuration.

A first satellite enters the open configuration (high drag) while a second satellite enters the closed configuration (low drag). This causes the first satellite to decay into a lower orbit. It begins to drift from the second satellite and achieves some in-track separation.

After the desired separation is achieved, the second satellite enters the open configuration (high drag) and first satellite enters the closed configuration (low drag). This causes second satellite's orbit to decay until it matches that of the first satellite. Then the first satellite and the second satellite both assume the half-open configuration to match drift speeds and stabilize the separation distance.

The process is repeated again to increase or decrease the separation distance.

In the foregoing manner, for a 3U CubeSat equipped with four deployable structures (equaling a drag contrast ratio of 13:1), 100 such maneuvers can move the respective satellites to a 500 km separation in under half a year with <0.3% range stability error. This model assumes the Jacchia-Roberts Atmospheric Density model with a conservative estimate for the 2021-2022 solar cycle. An orbit propagator is used in STK and includes third body effects from the sun and moon, as well as solar radiation pressure. The mission's minimum 25 km separation is easily achievable within a month, and a 1000 km separation can be achieved in 7 months before the satellites fall out of orbit.

Increased Power Generation

Figure 47:
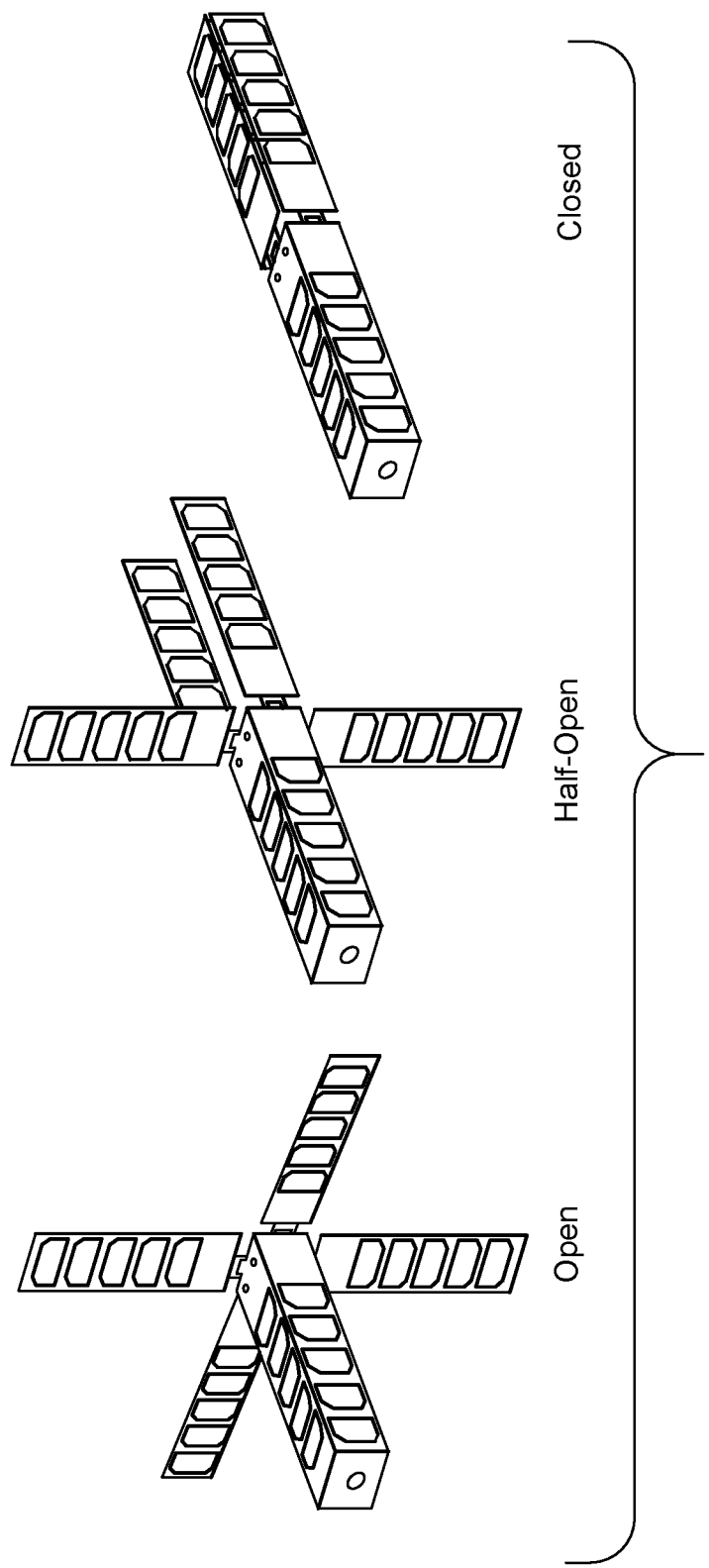
FIG. 47 illustrates a satellite with four deployable solar panels coupled to the satellite via respective SMA hinge apparatus according to the present disclosure, in open, half-open and closed configurations.

FIG. 47 illustrates a satellite with four deployable solar panels coupled to the satellite via respective SMA hinge apparatus as described above. In some examples, such a configuration of deployable solar panels (e.g., deployed along the short-edge on the same side of the CubeSat) provide for both effective drag management and improved power generation from the solar panels.

As known in the relevant art, the "beta angle" determines the percentage of time an object such as a spacecraft in LEO spends in direct sunlight, absorbing; solar energy. Beta angle is defined as the angle between the orbital plane of the spacecraft and the vector to the sun (i.e., which direction the Sun is shining from). In one implementation, the solar panels shown in FIG. 47 can generate sufficient power for the satellite in the half-open configuration for all Beta angles. The use of the closed configuration at low Beta angles will result in decreased performance, but increased mission lifetime. Using the open configuration at high Beta angles reduces performance and decreases orbit lifetime.

Attitude Control and Momentum Desaturation

Since the SMA hinge apparatus disclosed herein is able to rotate the deployable structure and create torque, it can be used for attitude control and momentum desaturation, even beyond low earth orbit (e.g., it can impart both low and high torques to control the satellite). This could allow for both finer pointing than the reaction wheels when in a low torque mode, and higher slewing rates when in a high torque mode. Two deployable structures coupled to a satellite via respective SMA hinge apparatus mounted opposite each other can work in tandem to unload the reaction wheels, but will become saturated after they reach their extreme positions. However, this may be adequate for short duration missions if the deployable structure mass is comparable to that of the satellite.

Reconfigurable Deployable Structures

The SMA hinge apparatus disclosed herein can also be adapted to reconfigurable deployable structures that would allow enhanced CubeSat capabilities beyond what is currently proposed. Potential benefits include deployable radiators that allow for fine temperature control, steerable antennas for higher gains, robotic arms to enable CubeSat planetary exploration, and apertures, mirrors, and shades to study the Earth and solar system.

Multiple SMA Elements for Respective Rotation Angles

Figure 48:
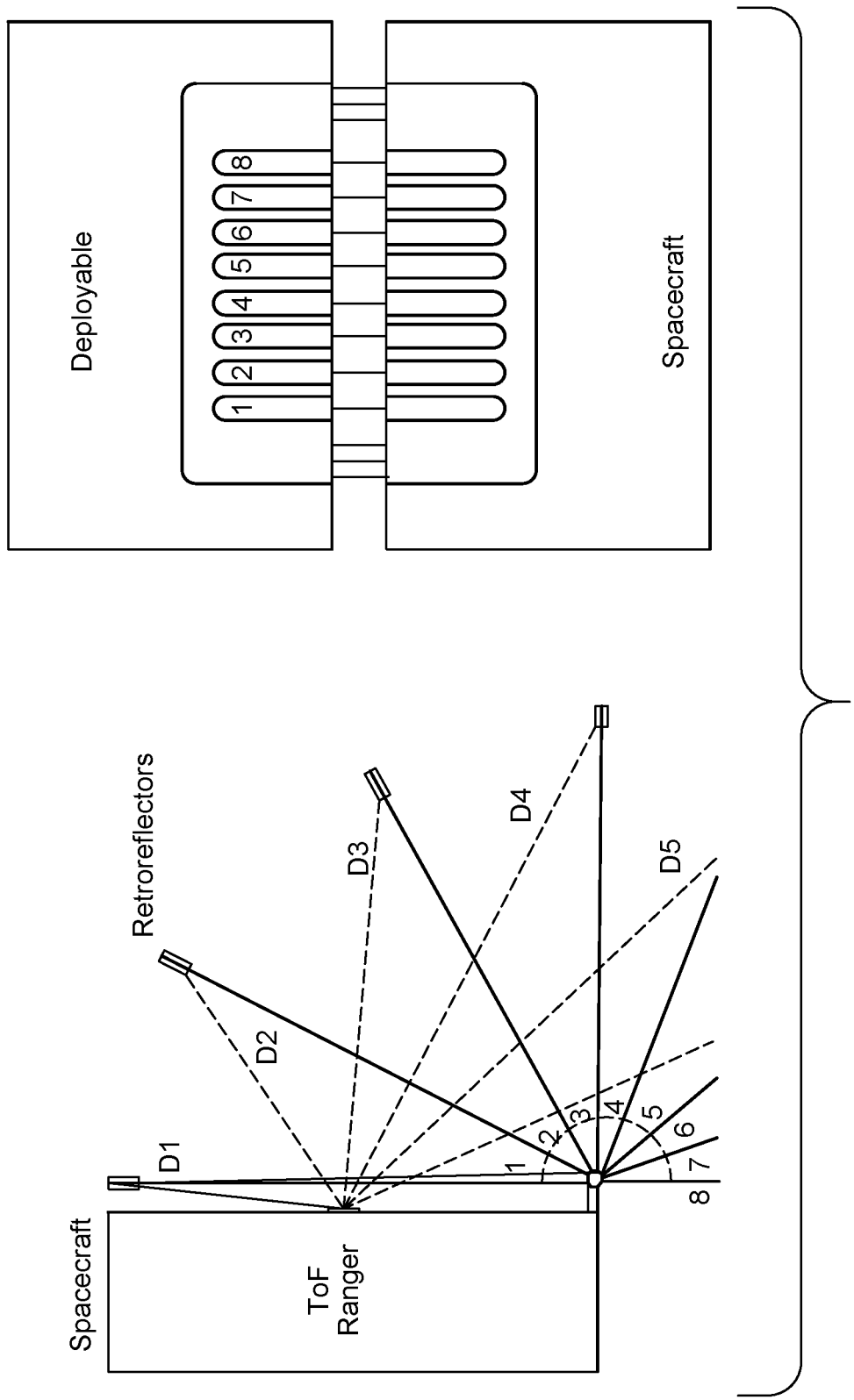
FIG. 48 illustrates an SMA hinge apparatus according to the present disclosure including a plurality of SMA elements trained for respective different angles of rotation upon activation.

FIG. 48 illustrates an SMA hinge apparatus according to the present disclosure including a plurality of SMA elements trained for respective different angles of rotation upon activation. In particular, FIG. 48 shows eight SMA elements that are trained to provide for different angles of rotation between a first object (e.g., spacecraft) and a second object (e.g., a deployable structure) when independently activated (e.g., via Joule heating resulting from a current flowing through a given SMA element). FIG. 48 also illustrates a time of flight (ToF) ranger that may be resident on the spacecraft to determine respective deployment angles of the deployable structure via one or more retroreflectors positioned on the deployable structure.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising"

can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of" and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A controllable shape memory alloy (SMA) hinge apparatus, comprising:
a plurality of SMA elements to effect at least a first angle of rotation and a second angle of rotation, about an axis of rotation, between a first object and a second object, the plurality of elements comprising:
a first SMA element, activated by first Joule heating individually heating the first SMA element, to adjust at least one of the first object and the second object to the first angle of rotation about the axis of rotation; and
a second SMA element, activated by second Joule heating individually heating the second SMA element independently of the first Joule heating, to adjust the at least one of the first object and the second object to the second angle of rotation about the axis of rotation different from the first angle of rotation about the axis of rotation.

2. The hinge apparatus of claim 1, further comprising:
a third SMA element, activated by third Joule heating, to adjust the at least one of the first object and the second object to a third angle of rotation about the axis of rotation, wherein the third angle of rotation is different from the first angle of rotation and the second angle of rotation.

3. The hinge apparatus of claim 1, wherein:
the first SMA element, when activated by the first Joule heating, undergoes a first three-dimensional transformation to adjust the at least one of the first object and the second object to the first angle of rotation about the axis of rotation; and
the second SMA element, when activated by the second Joule heating, undergoes a second three-dimensional transformation to adjust the at least one of the first object and the second object to the second angle of rotation about the axis of rotation.

4. The hinge apparatus of claim 3, wherein the first three-dimensional transformation and the second three-dimensional transformation are antagonistic transformations.

5. The hinge apparatus of claim 3, wherein at least one of the first three-dimensional transformation and the second three-dimensional transformation includes a bending transformation.

6. The hinge apparatus of claim 3, wherein at least one of the first three-dimensional transformation and the second three-dimensional transformation includes a torsion transformation.

7. The hinge apparatus of claim 1, wherein the hinge apparatus is a multiple-use bidirectional non-continuous rotary actuator.

8. The hinge apparatus of claim 7, wherein the multiple-use bidirectional non-continuous rotary actuator does not include a bearing.

9. The hinge apparatus of claim 1, wherein:
the first SMA element is trained such that the first angle of rotation is zero degrees; and
the second SMA element is trained such that the second angle of rotation is approximately 90 degrees.

10. The hinge apparatus of claim 1, wherein the first SMA element and the second SMA element are SMA wires.

11. The hinge apparatus of claim 1, wherein the first SMA element and the second SMA element are rectangular sheets.

12. The hinge apparatus of claim 1, further comprising:
a first electrical energy source, coupled to the first SMA element, to provide a first current to the first SMA element and thereby provide the first Joule heating to the first SMA element based on the first current; and
a second electrical energy source, coupled to the second SMA element, to provide a second current to the second SMA element, independently of the first current provided to the first SMA element, and thereby provide the second Joule heating to the second SMA element based on the second current.

13. The hinge apparatus of claim 1, in combination with the first object and the second object.

14. The combination of claim 13, wherein the first object and the second object respectively serve as heat sinks during at least a martensite phase of each of the first SMA element and the second SMA element.

15. The combination of claim 13, wherein:
the first object is a spacecraft; and
the second object is a deployable structure.

16. The combination of claim 15, wherein:
the spacecraft is a satellite; and
the deployable structure comprises one of a deployable solar panel, a deployable aperture, a deployable mirror, a deployable radiator, and at least one actuator to steer an antenna dish.

17. The combination of claim 16, wherein the satellite is a CubeSat.

18. The combination of claim 15, wherein the deployable structure is a robotic appendage.

19. The hinge apparatus of claim 1, wherein:
the hinge apparatus is a multiple-use bidirectional non-continuous rotary actuator;
the first SMA element, when activated by the first Joule heating, undergoes a first three-dimensional transformation to adjust the at least one of the first object and the second object to the first angle of rotation about the axis of rotation;
the second SMA element, when activated by the second Joule heating, undergoes a second three-dimensional transformation to adjust the at least one of the first object and the second object to the second angle of rotation about the axis of rotation; and
the first three-dimensional transformation and the second three-dimensional transformation are antagonistic bending transformations.

20. The hinge apparatus of claim 19, wherein the first SMA element and the second SMA element are rectangular sheets.

21. The hinge apparatus of claim 20, further comprising:
a first electrical energy source, coupled to the first SMA element, to provide a first current to the first SMA element and thereby provide the first Joule heating to the first SMA element based on the first current; and
a second electrical energy source, coupled to the second SMA element, to provide a second current to the second SMA element, independently of the first current provided to the first SMA element, and thereby provide the second Joule heating to the second SMA element based on the second current.

22. The hinge apparatus of claim 21, wherein:
the first SMA element is trained such that the first angle of rotation is zero degrees; and
the second SMA element is trained such that the second angle of rotation is approximately 90 degrees.

23. The hinge apparatus of claim 22, in combination with the first object and the second object, wherein:
the first object is a spacecraft; and
the second object is a deployable structure.

24. The combination of claim 23, wherein:
the spacecraft is a satellite; and
the deployable structure comprises one of a deployable solar panel, a deployable aperture, a deployable mirror, a deployable radiator, and at least one actuator to steer an antenna dish.

25. The hinge apparatus of claim 1, wherein each of the first SMA element and the second SMA element comprises nitinol.

26. A method for rotating a first object relative to a second object, about an axis of rotation, to have at least a first angle of rotation between the first object and the second object and a second angle of rotation between the first object and the second object, the method comprising:
A) passing a first current through a first shape memory alloy (SMA) element coupled to the first object and the second object to individually activate the first SMA element and thereby rotate at least one of the first object and the second object about the axis of rotation to the first angle of rotation; and
B) passing a second current through a second SMA element coupled to the first object and the second object to individually activate the second SMA element independently of activating the first SMA element and thereby rotate the at least one of the first object and the second object about the axis of rotation to the second angle of rotation different from the first angle of rotation.

27. The method of claim 26, wherein:
in A), the first SMA element undergoes a first three-dimensional transformation to rotate the at least one of the first object and the second object to the first angle of rotation about the axis of rotation; and
in B), the second SMA element undergoes a second three-dimensional transformation to rotate the at least one of the first object and the second object to the second angle of rotation about the axis of rotation.

28. The method of claim 27, wherein the first three-dimensional transformation and the second three-dimensional transformation are antagonistic transformations.

29. The method of claim 27, wherein at least one of the first three-dimensional transformation and the second three-dimensional transformation includes a bending transformation.

30. The method of claim 27, wherein at least one of the first three-dimensional transformation and the second three-dimensional transformation includes a torsion transformation.

31. The method of claim 26, further comprising:
independently passing the first current through the first SMA element and the second current through the second SMA element so as to bi-directionally rotate the at least one of the first object and the second object multiple times about the axis of rotation.

32. The method of claim 26, wherein prior to A), the method comprises:
training the first SMA element to attain the first angle of rotation in A); and
training the second SMA element to attain the second angle of rotation in B).

33. The method of claim 26, wherein each of the first SMA element and the second SMA element comprises nitinol.

34. The method of claim 26, wherein the first object is a spacecraft, the second object is a deployable structure, and the method further comprises:
C) independently passing the first current through the first SMA element and the second current through the second SMA element so as to bi-directionally rotate the deployable structure with respect to the spacecraft about the axis of rotation.

35. The method of claim 34, wherein the deployable structure comprises one of a robotic appendage, a deployable solar panel, a deployable aperture, a deployable mirror, and a deployable radiator.

36. The method of claim 34, wherein the deployable structure is a drag surface, and wherein C) comprises:
deploying and stowing the drag surface so as to adjust a ram area of the spacecraft.

37. The method of claim 34, wherein the deployable structure includes at least one solar panel, and wherein C) comprises:
rotating the at least one solar panel with respect to the spacecraft about the axis of rotation so as to facilitate power generation by the at least one solar panel.

38. A spacecraft hinge assembly, comprising:
at least a first shape memory alloy (SMA) element and a second SMA element, each SMA element programmed to a different deployment angle of rotation between a spacecraft and a deployable structure;
a first step-down converter, coupled to the first SMA element, to provide a first current to the first SMA element and thereby heat the first SMA element based on the first current; and
a second step-down converter, coupled to the second SMA element, to provide a second current to the second SMA element, independently of the first current provided to the first SMA element, and thereby heat the second SMA element based on the second current.

39. The hinge assembly of claim 38, wherein:
the first step-down converter measures the first current and a first voltage across the first SMA element to thereby reveal a first temperature of the first SMA element; and
the second step-down converter measures the second current and a second voltage across the second SMA element to thereby reveal a second temperature of the second SMA element.

40. The hinge assembly of claim 38, wherein each of the first SMA element and the second SMA element comprises nitinol.

41. The hinge assembly of claim 38, in combination with the spacecraft and the deployable structure.

42. The combination of claim 41, wherein:
the spacecraft is a satellite; and
the deployable structure comprises one of a deployable solar panel, a deployable aperture, a deployable mirror, a deployable radiator, and at least one actuator to steer an antenna dish.

43. The combination of claim 42, wherein the satellite is a CubeSat.

44. The combination of claim 41, wherein the deployable structure is a robotic appendage.

* * * * *